United States Patent
Singh et al.

(10) Patent No.: US 10,923,821 B2
(45) Date of Patent: Feb. 16, 2021

(54) MULTI-MODE WIRELESS ANTENNA CONFIGURATIONS

(71) Applicant: NuCurrent, Inc., Chicago, IL (US)

(72) Inventors: Vinit Singh, Austin, TX (US); Ajit Rajagopalan, Chicago, IL (US); Alberto Peralta, Chicago, IL (US); Md. Nazmul Alam, Lombard, IL (US); Christine A. Frysz, Orchard Park, NY (US); Jason Luzinski, Chicago, IL (US); Glenn Riese, McHenry, IL (US); Jacob Babcock, Chicago, IL (US); Pavel Shostak, Chicago, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

(21) Appl. No.: 15/240,637

(22) Filed: Aug. 18, 2016

(65) Prior Publication Data
US 2017/0054213 A1    Feb. 23, 2017

Related U.S. Application Data

(60) Provisional application No. 62/206,981, filed on Aug. 19, 2015, provisional application No. 62/206,988, (Continued)

(51) Int. Cl.
*H01Q 7/06* (2006.01)
*H01Q 1/52* (2006.01)
*H04B 5/00* (2006.01)

(52) U.S. Cl.
CPC .............. *H01Q 7/06* (2013.01); *H01Q 1/526* (2013.01); *H04B 5/0037* (2013.01); *H04B 5/0081* (2013.01); *H04B 5/0087* (2013.01)

(58) Field of Classification Search
CPC .......... H01Q 7/06; H01Q 1/362; H01Q 1/526; H01Q 1/36; H01Q 9/27; H01Q 11/08;
(Continued)

(56) References Cited

U.S. PATENT DOCUMENTS 2,797,393 A    6/1957  Clogston
2,911,605 A    11/1959 Wales, Jr.
(Continued)

FOREIGN PATENT DOCUMENTS

CN    2650300    10/2004
CN    103944196   7/2014
(Continued)

OTHER PUBLICATIONS

European Search Report dated Aug. 7, 2014 for EP Appln. No. 10751119.8.
(Continued)

*Primary Examiner* — Ab Salam Alkassim, Jr.
(74) *Attorney, Agent, or Firm* — Lee Sullivan Shea & Smith LLP

(57) ABSTRACT

Various embodiments of a multi-mode antenna are described. The antenna is preferably constructed having a first inductor coil and a second inductor coil. A plurality of shielding materials are positioned throughout the antenna to minimize interference of the magnetic fields that emanate from the coils from surrounding materials. The antenna comprises a coil control circuit having at least one of an electric filter and an electrical switch configured to modify the electrical impedance of either or both the first and second coils.

16 Claims, 25 Drawing Sheets

Related U.S. Application Data filed on Aug. 19, 2015, provisional application No. 62/207,008, filed on Aug. 19, 2015, provisional application No. 62/207,020, filed on Aug. 19, 2015, provisional application No. 62/207,029, filed on Aug. 19, 2015.

(58) Field of Classification Search
CPC ... H04B 5/0081; H04B 5/0087; H04B 5/0037
See application file for complete search history.

(56) References Cited

U.S. PATENT DOCUMENTS

| | | |
|---|---|---|
| 3,484,731 A | 12/1969 | Rich |
| 4,328,531 A | 5/1982 | Nagashima et al. |
| 4,494,100 A | 1/1985 | Stengel et al. |
| 4,959,631 A | 9/1990 | Hasegawa et al. |
| 4,996,165 A | 2/1991 | Chang et al. |
| 5,137,478 A | 8/1992 | Graf |
| 5,237,165 A | 8/1993 | Tingley, III |
| 5,604,352 A | 2/1997 | Schuetz |
| 5,713,939 A | 2/1998 | Nedungadi et al. |
| 5,748,464 A | 5/1998 | Schuetz |
| 5,767,808 A | 6/1998 | Robbins et al. |
| 5,767,813 A | 6/1998 | Verma et al. |
| 5,777,538 A | 7/1998 | Schuetz |
| 5,801,611 A | 9/1998 | Van Loenen et al. |
| 5,808,587 A | 9/1998 | Shima |
| 5,838,154 A | 11/1998 | Morikawa et al. |
| 5,883,392 A | 3/1999 | Schuetz |
| 5,892,489 A | 4/1999 | Kanba et al. |
| 5,980,773 A | 11/1999 | Takeda |
| 6,005,193 A | 12/1999 | Markel |
| 6,021,337 A | 2/2000 | Remillard et al. |
| 6,028,568 A | 2/2000 | Asakura et al. |
| 6,107,972 A | 8/2000 | Seward et al. |
| 6,137,447 A * | 10/2000 | Saitoh .............. G06K 7/10336 343/742 |
| 6,148,221 A | 11/2000 | Ishikawa et al. |
| 6,163,307 A | 12/2000 | Kim et al. |
| 6,271,803 B1 | 8/2001 | Watanabe et al. |
| 6,503,831 B2 | 1/2003 | Speakman |
| 6,556,101 B1 | 4/2003 | Tada et al. |
| 6,583,769 B2 | 6/2003 | Shiroki et al. |
| 6,664,863 B1 | 12/2003 | Okamoto et al. |
| 6,809,688 B2 | 10/2004 | Yamada |
| 6,897,830 B2 | 5/2005 | Bae et al. |
| 6,924,230 B2 | 8/2005 | Sun et al. |
| 7,046,113 B1 | 5/2006 | Okamoto et al. |
| 7,205,655 B2 | 4/2007 | Sippola |
| 7,355,558 B2 | 4/2008 | Lee |
| 7,563,352 B2 | 7/2009 | Hubel |
| 7,579,835 B2 | 8/2009 | Schnell et al. |
| 7,579,836 B2 | 8/2009 | Schnell et al. |
| 7,713,762 B2 | 5/2010 | Lee et al. |
| 7,786,836 B2 | 8/2010 | Gabara |
| 7,952,365 B2 | 5/2011 | Narita et al. |
| 8,056,819 B2 | 11/2011 | Rowell et al. |
| 8,299,877 B2 | 10/2012 | Hong et al. |
| 8,436,780 B2 * | 5/2013 | Schantz .............. G01S 5/14 343/788 |
| 8,567,048 B2 | 10/2013 | Singh et al. |
| 8,610,530 B2 | 12/2013 | Singh et al. |
| 8,653,927 B2 | 2/2014 | Singh et al. |
| 8,680,960 B2 | 3/2014 | Singh et al. |
| 8,692,641 B2 | 4/2014 | Singh et al. |
| 8,692,642 B2 | 4/2014 | Singh et al. |
| 8,698,590 B2 | 4/2014 | Singh et al. |
| 8,698,591 B2 | 4/2014 | Singh et al. |
| 8,707,546 B2 | 4/2014 | Singh et al. |
| 8,710,948 B2 | 4/2014 | Singh et al. |
| 8,774,712 B2 | 7/2014 | Sato et al. |
| 8,803,649 B2 | 8/2014 | Singh et al. |
| 8,823,481 B2 | 9/2014 | Singh et al. |
| 8,823,482 B2 | 9/2014 | Singh et al. |
| 8,855,786 B2 | 10/2014 | Derbas et al. |
| 8,860,545 B2 | 10/2014 | Singh et al. |
| 8,898,885 B2 | 12/2014 | Singh et al. |
| 9,178,369 B2 * | 11/2015 | Partovi .................. H02J 7/025 |
| 9,208,942 B2 | 12/2015 | Singh et al. |
| 9,559,526 B2 | 1/2017 | Von Novak, III et al. |
| 9,912,173 B2 | 3/2018 | Tseng |
| 9,941,590 B2 * | 4/2018 | Luzinski ................ H01Q 7/005 |
| 9,941,729 B2 * | 4/2018 | Peralta ................... H02J 5/005 |
| 9,941,743 B2 * | 4/2018 | Peralta ................... H01F 38/14 |
| 9,948,129 B2 * | 4/2018 | Singh ..................... H02J 7/025 |
| 9,960,628 B2 * | 5/2018 | Peralta ................... H02J 5/005 |
| 9,960,629 B2 * | 5/2018 | Rajagopalan .......... H02J 7/025 |
| 10,063,100 B2 * | 8/2018 | Singh ..................... H01F 27/38 |
| 2002/0020554 A1 | 2/2002 | Sakamoto et al. |
| 2002/0053992 A1 | 5/2002 | Kawakami et al. |
| 2002/0071003 A1 | 6/2002 | Kimura |
| 2002/0075191 A1 | 6/2002 | Yokoshima |
| 2002/0101383 A1 | 8/2002 | Junod |
| 2002/0105080 A1 | 8/2002 | Speakman |
| 2003/0006069 A1 | 1/2003 | Watanabe |
| 2003/0058180 A1 | 3/2003 | Forster |
| 2003/0119677 A1 | 6/2003 | Qiyan et al. |
| 2004/0000974 A1 | 1/2004 | Odenaal et al. |
| 2004/0085247 A1 | 5/2004 | Mickle et al. |
| 2004/0108311 A1 | 6/2004 | de Rooij |
| 2004/0118920 A1 | 6/2004 | He |
| 2004/0140528 A1 | 7/2004 | Kim et al. |
| 2004/0159460 A1 | 8/2004 | Passiopoulos et al. |
| 2004/0189528 A1 | 9/2004 | Killen et al. |
| 2004/0217488 A1 | 11/2004 | Luechinger |
| 2004/0227608 A1 | 11/2004 | Nakatani et al. |
| 2005/0121229 A1 | 6/2005 | Takai et al. |
| 2005/0174628 A1 | 8/2005 | Kelly et al. |
| 2006/0022772 A1 | 2/2006 | Kanno et al. |
| 2006/0040628 A1 | 2/2006 | Porret |
| 2006/0192645 A1 | 8/2006 | Lee et al. |
| 2006/0284718 A1 * | 12/2006 | Baumgartner ...... H01F 17/0006 336/223 |
| 2007/0018767 A1 | 1/2007 | Gabara |
| 2007/0020969 A1 | 1/2007 | Yungers |
| 2007/0023424 A1 | 2/2007 | Weber |
| 2007/0045773 A1 * | 3/2007 | Mi ....................... H01F 17/0006 257/531 |
| 2007/0046544 A1 | 3/2007 | Murofushi et al. |
| 2007/0095913 A1 | 5/2007 | Takahashi |
| 2007/0120629 A1 | 5/2007 | Schnell et al. |
| 2007/0179570 A1 | 8/2007 | De Taboada |
| 2007/0182367 A1 | 8/2007 | Partovi |
| 2007/0267718 A1 | 11/2007 | Lee |
| 2007/0279287 A1 | 12/2007 | Castaneda |
| 2008/0039332 A1 | 2/2008 | Bernstein et al. |
| 2008/0055178 A1 | 3/2008 | Kim |
| 2008/0062066 A1 * | 3/2008 | Arai ...................... H01Q 1/2208 343/867 |
| 2008/0067874 A1 | 3/2008 | Tseng |
| 2008/0150693 A1 | 6/2008 | You |
| 2008/0164840 A1 | 7/2008 | Kato et al. |
| 2008/0164844 A1 | 7/2008 | Kato et al. |
| 2008/0164960 A1 | 7/2008 | Schnell et al. |
| 2008/0211320 A1 | 9/2008 | Cook et al. |
| 2008/0277386 A1 | 11/2008 | Haimer |
| 2008/0283277 A1 | 11/2008 | Muramatsu et al. |
| 2008/0303735 A1 * | 12/2008 | Fujimoto ................ H01Q 1/22 343/787 |
| 2009/0015266 A1 | 1/2009 | Narita et al. |
| 2009/0079628 A1 | 3/2009 | Rofougaran |
| 2009/0085706 A1 | 4/2009 | Baarman et al. |
| 2009/0096413 A1 | 4/2009 | Partovi et al. |
| 2009/0108974 A1 * | 4/2009 | Raggam ........... G06K 19/07749 336/105 |
| 2009/0134875 A1 | 5/2009 | Tomiha et al. |
| 2009/0140691 A1 | 6/2009 | Jung |
| 2009/0152542 A1 | 6/2009 | Lee et al. |
| 2009/0230777 A1 | 9/2009 | Baarman et al. |
| 2009/0261778 A1 | 10/2009 | Kook |
| 2009/0261936 A1 | 10/2009 | Widjaja et al. |
| 2010/0033290 A1 | 2/2010 | Liu |
| 2010/0072588 A1 | 3/2010 | Yang |

(56) References Cited

U.S. PATENT DOCUMENTS

| | | |
|---|---|---|
| 2010/0127660 A1 | 5/2010 | Cook et al. |
| 2010/0141042 A1 | 6/2010 | Kesler |
| 2010/0164296 A1 | 7/2010 | Kurs |
| 2010/0219694 A1 | 9/2010 | Kurs et al. |
| 2010/0289599 A1 | 11/2010 | Vangala |
| 2010/0289709 A1 | 11/2010 | Guan |
| 2010/0295701 A1 | 11/2010 | Denis |
| 2011/0084656 A1 | 4/2011 | Gao |
| 2011/0101788 A1 | 5/2011 | Sun et al. |
| 2011/0137379 A1 | 6/2011 | Wosmek |
| 2011/0024510 A1 | 10/2011 | Kato et al. |
| 2011/0241437 A1* | 10/2011 | Kanno .............. H01F 38/14 307/104 |
| 2011/0248891 A1 | 10/2011 | Han et al. |
| 2011/0279198 A1 | 11/2011 | Haner |
| 2012/0062345 A1 | 3/2012 | Kurs et al. |
| 2012/0095531 A1 | 4/2012 | Derbas et al. |
| 2012/0169434 A1 | 7/2012 | Masuda et al. |
| 2012/0217819 A1 | 8/2012 | Yamakawa et al. |
| 2012/0235500 A1 | 9/2012 | Ganem et al. |
| 2012/0235634 A1 | 9/2012 | Hall et al. |
| 2012/0235636 A1 | 9/2012 | Partovi |
| 2012/0249396 A1 | 10/2012 | Parsche |
| 2012/0274148 A1 | 11/2012 | Sung et al. |
| 2012/0280765 A1 | 11/2012 | Kurs et al. |
| 2012/0326931 A1 | 12/2012 | Murayama et al. |
| 2013/0067737 A1 | 3/2013 | Singh |
| 2013/0067738 A1 | 3/2013 | Singh |
| 2013/0068499 A1 | 3/2013 | Singh et al. |
| 2013/0068507 A1 | 3/2013 | Singh et al. |
| 2013/0069748 A1 | 3/2013 | Frysz |
| 2013/0069749 A1 | 3/2013 | Singh |
| 2013/0069750 A1 | 3/2013 | Singh |
| 2013/0069843 A1 | 3/2013 | Singh et al. |
| 2013/0076154 A1 | 3/2013 | Baarman |
| 2013/0146671 A1* | 6/2013 | Grieshofer ....... G06K 19/07794 235/492 |
| 2013/0199027 A1 | 8/2013 | Singh et al. |
| 2013/0199028 A1 | 8/2013 | Singh et al. |
| 2013/0200070 A1 | 8/2013 | Singh |
| 2013/0200722 A1 | 8/2013 | Singh |
| 2013/0200968 A1 | 8/2013 | Singh |
| 2013/0200969 A1* | 8/2013 | Singh .................. A61N 1/0553 336/30 |
| 2013/0200976 A1 | 8/2013 | Singh |
| 2013/0201589 A1 | 8/2013 | Singh |
| 2013/0205582 A1* | 8/2013 | Singh .................. H01F 41/00 29/602.1 |
| 2013/0207744 A1 | 8/2013 | Singh |
| 2013/0208389 A1 | 8/2013 | Singh |
| 2013/0208390 A1 | 8/2013 | Singh |
| 2013/0257362 A1 | 10/2013 | Lim |
| 2013/0300207 A1 | 11/2013 | Wang |
| 2013/0335284 A1 | 12/2013 | Hsu et al. |
| 2014/0008974 A1 | 1/2014 | Miyamoto |
| 2014/0028111 A1 | 1/2014 | Hansen |
| 2014/0035383 A1 | 2/2014 | Riehl |
| 2014/0035793 A1* | 2/2014 | Kato .................. H01Q 1/243 343/867 |
| 2014/0041218 A1 | 2/2014 | Singh et al. |
| 2014/0047713 A1 | 2/2014 | Singh et al. |
| 2014/0084946 A1* | 3/2014 | Clark .................. G01N 27/02 324/654 |
| 2014/0168019 A1* | 6/2014 | Hirobe .................. H01Q 5/40 343/720 |
| 2014/0183971 A1 | 7/2014 | Endo |
| 2014/0197694 A1 | 7/2014 | Asanuma et al. |
| 2014/0231518 A1* | 8/2014 | Yosui .................. H01Q 1/2216 235/439 |
| 2014/0266019 A1 | 9/2014 | Pigott |
| 2014/0320369 A1* | 10/2014 | Azenui .................. H01Q 1/526 343/841 |
| 2014/0361628 A1 | 12/2014 | Keeling |
| 2015/0054455 A1* | 2/2015 | Kim .................. H02J 17/00 320/108 |
| 2015/0076922 A1 | 3/2015 | Kato et al. |
| 2015/0091502 A1 | 4/2015 | Mukherjee et al. |
| 2015/0115727 A1* | 4/2015 | Carobolante ........... H02J 5/005 307/104 |
| 2015/0136858 A1 | 5/2015 | Finn |
| 2015/0137746 A1 | 5/2015 | Lee et al. |
| 2015/0140807 A1 | 5/2015 | Mohammed |
| 2015/0145634 A1* | 5/2015 | Kurz .................. H01F 38/14 336/232 |
| 2015/0145635 A1* | 5/2015 | Kurz .................. H01F 38/14 336/232 |
| 2015/0180440 A1 | 6/2015 | Ishizuka |
| 2015/0207541 A1 | 7/2015 | Kuroda |
| 2015/0236545 A1 | 8/2015 | Song |
| 2015/0236550 A1 | 8/2015 | Yang et al. |
| 2015/0280322 A1* | 10/2015 | Saito .................. H01Q 7/06 343/788 |
| 2015/0318710 A1 | 11/2015 | Lee et al. |
| 2015/0357827 A1 | 12/2015 | Muratov et al. |
| 2016/0056664 A1* | 2/2016 | Partovi .................. H02J 7/025 307/104 |
| 2016/0072192 A1* | 3/2016 | Radi .................. H01Q 17/004 342/1 |
| 2016/0111889 A1 | 4/2016 | Jeong |
| 2016/0118711 A1* | 4/2016 | Finn ................ G06K 19/07773 343/867 |
| 2016/0126002 A1* | 5/2016 | Chien ................ H01F 27/2804 320/108 |
| 2016/0149416 A1 | 5/2016 | Ha et al. |
| 2016/0156103 A1* | 6/2016 | Bae .................. H02J 50/20 320/108 |
| 2016/0156215 A1* | 6/2016 | Bae .................. H01Q 7/00 320/108 |
| 2016/0224975 A1 | 8/2016 | Na |
| 2016/0292669 A1 | 10/2016 | Tunnell |
| 2017/0040105 A1* | 2/2017 | Peralta ............... G06K 19/07773 |
| 2017/0040107 A1* | 2/2017 | Peralta .................. H01Q 7/00 |
| 2017/0040692 A1* | 2/2017 | Peralta .................. H02J 5/005 |
| 2017/0040693 A1* | 2/2017 | Luzinski ............... H01Q 7/005 |
| 2017/0040694 A1* | 2/2017 | Singh .................. H01F 27/38 |
| 2017/0040696 A1* | 2/2017 | Peralta .................. H01F 38/14 |
| 2017/0054213 A1* | 2/2017 | Singh .................. H01Q 7/06 |
| 2017/0126544 A1 | 5/2017 | Vigneras et al. |
| 2018/0166921 A1 | 6/2018 | Peralta |
| 2018/0167107 A1 | 6/2018 | Peralta |
| 2018/0167108 A1 | 6/2018 | Peralta |
| 2018/0167109 A1 | 6/2018 | Peralta |
| 2018/0167110 A1 | 6/2018 | Peralta |
| 2018/0168057 A1 | 6/2018 | Peralta |
| 2018/0212649 A1 | 7/2018 | Tenno |
| 2018/0366828 A1* | 12/2018 | Yajima .................. H02J 50/12 |
| 2019/0027302 A1* | 1/2019 | Noh .................. H02J 50/70 |
| 2019/0393604 A1* | 12/2019 | Ichikawa .............. H01Q 9/04 |

FOREIGN PATENT DOCUMENTS

| | | |
|---|---|---|
| CN | 104037493 A | 9/2014 |
| CN | 104037494 A | 9/2014 |
| EP | 0310396 | 4/1989 |
| EP | 1609503 | 12/2005 |
| EP | 2031729 | 3/2009 |
| EP | 2557630 | 2/2013 |
| EP | 2775564 A1 | 9/2014 |
| EP | 2775565 A1 | 9/2014 |
| JP | 1-310518 | 12/1989 |
| JP | 5-83249 | 4/1993 |
| JP | A 09-093005 | 4/1997 |
| JP | 10-255629 | 9/1998 |
| JP | 2007-7042569 | 2/2007 |
| JP | 2008-160781 | 7/2008 |
| JP | 2008-160781 A | 7/2008 |
| JP | 2008-205215 | 9/2008 |
| JP | 2008-294285 | 12/2008 |
| JP | 2008-307114 | 12/2008 |
| JP | 2001344574 | 12/2011 |
| JP | 2012-147408 | 8/2012 |

(56) References Cited

FOREIGN PATENT DOCUMENTS

| | | |
|---|---|---|
| JP | 2013-93429 | 5/2013 |
| JP | 2014-175864 A | 9/2014 |
| JP | 2014-175865 A | 9/2014 |
| KR | 10-2010-0092741 | 8/2010 |
| KR | 10-1216946 B1 | 1/2013 |
| KR | 10-2013-0015618 | 2/2013 |
| KR | 10-2014-0111554 A | 9/2014 |
| KR | 10-2014-0111794 A | 9/2014 |
| KR | 2014-0135357 | 11/2014 |
| KR | 10-1559939 B1 | 10/2015 |
| TW | 201436494 A | 9/2014 |
| TW | 2014436495 A | 9/2014 |
| WO | 2008/050917 | 5/2008 |
| WO | WO 2010/104569 | 9/2010 |
| WO | 2010/129369 | 11/2010 |

OTHER PUBLICATIONS

European Search Report dated Aug. 1, 2013 for EP Appln. No. 13001121.6.
European Search Report dated Aug. 1, 2013 for EP Appln. No. 13001130.7.
European Search Report dated Nov. 4, 2014 for EP Appln. No. 14000885.5.
Relative Permittivity—Dielectric Constant—Jul. 2011 (3 pages).
International Search Report and Written Opinion dated Oct. 14, 2016 for PCT/US2016/045588 (10 pages).
International Search Report and Written Opinion dated Oct. 28, 2016 for PCT/US2016/047607 (9 pages).
Office Action issued in corresponding EP Patent Application No. 14000885.5 dated Jun. 29, 2017 (4 pages).
Office Action issued in corresponding Taiwanese Patent Application No. 102108342 dated Feb. 21, 2017 (10 pages).
Office Action issued in corresponding Japanese Patent Application No. 2013-047048 dated Mar. 21, 2017 (12 pages).
Office Action dated Sep. 27, 2016 in corresponding EP Application No. 13 001 130.7 (6 pages).
Office Action dated Sep. 27, 2016 in corresponding EP Application No. 13 001 121.6 (6 pages).
Office Action dated Jan. 31, 2017 in corresponding JP Application No. 2013-047049 (5 pages).
International Search Report and Written Opinion dated issued in PCT/US2017/048708 dated Nov. 8, 2017 (10 pages).
Office Action dated Mar. 30, 2018 in corresponding CN Application No. 201310074946.8 (10 pages).
Office Action dated Mar. 27, 2018 in corresponding CN Application No. 201310075086.X (10 pages).
Office Action issued in corresponding Japanese Patent Application No. 2013-047048 dated May 8, 2018 (2 pages).
Decision of Dismissal of Amendment issued in corresponding Japanese Patent Application No. 2013-047048 dated May 8, 2018 (7 pages).
Office Action dated Apr. 27, 2018 in corresponding TW Application No. 102108345 (11 pages).
Office Action dated Nov. 28, 2017 in corresponding JP Application No. 2013-047049 (5 pages).
Office Action dated Aug. 25, 2017 in corresponding CN Application No. 201310075086.X (10 pages).
Office Action dated Aug. 23, 2017 in corresponding CN Application No. 201310074946.8 (10 pages).
Office Action dated Sep. 12, 2018 in corresponding CN Application No. 201310074946.8 (9 pages).
Office Action dated Sep. 12, 2018 in corresponding CN Application No. 201310075086.X (10 pages).
Office Action dated Oct. 29, 2018 in corresponding KR Application No. 10-2013-0026135 (12 pages).
Office Action dated Oct. 29, 2018 in corresponding KR Application No. 10-2013-0025858 (12 pages).
Written Opinion and International Search Report issued in corresponding International Application No. PCT/US2017/065329 dated Feb. 21, 2018 (7 pages).
Office Action issued in corresponding Japanese Patent Application No. 2013-047048 dated Dec. 12, 2017 (11 pages).
EP Office Communication Pursuant to Article 94(3) dated Jan. 17, 2019 for EP App. No. 13001121.6-1216.
EP Communication pursuant to Rule 164(1) EPC regarding partial supplementary European Search Report for EP App. No. 16835665.7-1212 dated Feb. 14, 2019, 20 pages.
Muratov, V., Multi-Mode Wireless Power Systems can be a bridge to the Promised Land of Universal Contactless charging, Mediatek, Inc., Nov. 20, 2014, 15 pages.
Qi 2010, "System Description Wireless Power Transfer", vol. 1, Low Power, Part 1: Interface Definition, Version 1.0.1, Oct. 2010, Wireless Power Consortium, 86 pages.
Narayanan, R., "Wireless Power Charging Coil Changing Considerations", Wurth Elektronik, Feb. 23, 2015, 9 pages.
Barcelo, T., "Wireless Power User Guide", Linear Technology, Application Note 138, Oct. 2013, 8 pages.
Yoon, Y., "Embedded conductor technology for micromachined RF elements", Journal of Micromechanics and Microengineering, Jun. 2005, 11 pages.
Burghartz, J., "On the Design of RF Spiral Inductors on Silicon", IEEE Transactions on Electron Devices, vol. 50, No. 3, Mar. 2003, pp. 718-729.
Qi 2009, "System Description Wireless Power Transfer", vol. 1, Low Power, Version 0.95, Jul. 2009, 76 pages.
Lee, Y., "Antenna Circuit Design for RFID Applications", 2003 Microchip Technology, AN710, 50 pages.
Sun, M., et al., "Apparatus for Wireless Power and Data Transfer Over a Distance", University of Pittsburgh, Jun. 2009, 30 pages.
IPR2019-00858—Petition for Inter Partes Review of U.S. Pat. No. 8,680,960, *Samsung Electronics Co., Ltd.* v. *NuCurrent, Inc.*, 90 pages.
IPR2019-00858—Ex. 1001 U.S. Pat. No. 8,680,960.
IPR2019-00858—Ex 1004—File History for U.S. Pat. No. 8,680,960 in two parts due to length.
Ex. 1002 Declaration of Dr. Steven Leeb, 115 pages.
Ex. 1003—CV of Dr. Steven B. Leeb, 7 pages.
Ex. 1005—US20070267718A1 to Lee, 13 pages.
Ex. 1006—Semat—Physics Chapters 29-32, 81 pages, (1958).
Ex 1009—US20090096413 to Partovi, 88 pages.
Ex 1010—IEEE Dictionary 1996 (excerpt), 9 pages.
Ex. 1011—US20070089773A1 to Koester et al., 26 pages.
Ex. 1012—US20120280765 to Kurs, 122 pages.
Ex. 1013—U.S. Pat. No. 6,432,497 to Bunyan, 12 pages.
Ex. 1014 U.S. Pat. No. 6,083,842 to Cheung et al., 8 pages.
Ex. 1015 Reinhold—Efficient Antenna Design of Inductive Coupled RFID—Systems with High Power Demand, Journal of Communication vol. 2, No. 6, Nov. 2007, 10 pages.
Ex. 1016 U.S. Pat. No. 4,549,042 to Akiba et al., 8 pages.
Ex. 1017—U.S. Pat. No. 5,812,344 to Balakrishnan, 12 pages.
Ex. 1018—Wheeler, Formulas for the Skin (1942), 13 pages.
Ex. 1019—Kyriazidou —U.S. Pat. No. 7,236,080, 12 pages.
Ex. 1020 Alldred et al., "A 1.2 V, 60 Ghz radio receiver with onchip transformers and inductors in 90 nm CMOS," Proc. IEEE Compound Semiconductor Integrated Circuits SYmp., pp. 51-54, Nov. 2006 ("Alldred"), 12 pages.
Ex. 1022 U.S. Pat. No. 9,912,173 to Tseng, 31 pages.
Ex. 1023 U.S. Pat. No. 7,248,138 to Chiang, 18 pages.
Ex. 1024 U.S. Pat. No. 5,084,958 to Yerman et al., 20 pages.
Ex. 1025—US20070126544 —Wotherspoon, 6 pages.
Ex. 1028—U.S. Pat. No. 9,820,374 to Bois et al., 9 pages.
Ex. 1029 U.S. Pat. No. 7,601,919 to Phan et al., 14 pages.
Ex. 1030 U.S. Pat. No. 5,108,825 to Wojnarowski et al., 10 pages.
Ex. 1031 Ahn 7305725, 9 pages.
Ex. 1032—U.S. Pat. No. 5,745,331 to Shamouilian et al., 23 pages.
Ex. 1033—Hu, et al., "AC Resistance to Planar Power Inductors and the Quasidistributed Gap Technique," IEEE Transactions on Power Electronics, vol. 16, No. 4, Jul. 2001 ("Hu"), 13 pages.
Ex. 1034—U.S. Pat. No. 6,608,363 to Fazelpour, 8 pages.
Ex. 1035—IEEE Xplore web page, 2 pages.

(56) References Cited

OTHER PUBLICATIONS

Ex. 1036 Kraemer et al., "Architecture Considerations for 60 GhzPulse Transceiver Front-Ends," CAS 2007 Proceedings vol. 2, 2007, Int'Semiconductor Conference (2007), 26 pages.
Ex. 1037—Varonen et al., "V-band Balanced Resistive Mixer in 65-nm CMOS," Proceedings of the 33rd European Solid-State Circuits Conference (2007), 22 pages.
Ex. 1038—IEEE Xplore web page, 2 pages.
Ex. 1039—Lopera et al., "A Multiwinding Modeling Method for High Frequency Transformers and Inductors", IEEE Transactions on Power Electronics, vol. 18, No. 3, May 2003, 14 pages.
Ex. 1040—Leonavicius et al., "Comparison of Realization Techniques for PFC Inductor Operating in Discontinuous Conduction Mode," IEEE Transactions on Power Electronics, vol. 19, No. 2, Mar. 2004, 14 pages.
Ex. 1041—Roshen, W.A., "Fringing Field Formulas and Winding Loss Due to an Air Gap," IEEE Transactions on Magnetics, vol. 43, No. 8, Aug. 2007, 12 pages.
IPR2019-00859—Petition for Inter Partes Review of U.S. Pat. No. 9,300,046, 87 pages.
Ex. 1001 U.S. Pat. No. 9,300,046 to Singh et al., 50 pages.
Ex. 1004—Prosecution History of U.S. Pat. No. 9,300,046, 322 pages (in two attachments A and B) due to size.
IPR2019-00860—Petition for Inter Partes Review of U.S. Pat. No. 8,680,960, 86 pages.
Ex. 1001—US868960 to Singh et al., 50 pages.
Ex 1004—File History for U.S. Pat. No. 8,680,960, 201 pages (in two attachments due to size).
IPR2019-00861—Petition for Inter Partes Review of U.S. Pat. No. 9,300,046, 89 pages.
IPR2019-00862—Petition for Inter Partes Review of U.S. Pat. No. 8,710,948, 88 pages.
Ex. 1001 U.S. Pat. No. 8,710,948 to Singh et al., 50 pages.
Ex. 1004 File History of U.S. Pat. No. 8,710,948 to Singh et al., 213 pages.
IPR2019-0863 Petition for Inter Partes Review of U.S. Pat. No. 8,698,591, 89 pages.
Ex. 1001 U.S. Pat. No. 8,698,591, 49 pages.
Ex. 1004—Prosecution History of U.S. Pat. No. 8,698,591, 180 pages.
EP Communication pursuant to Rule 62 EPC regarding extended European Search Report for EP App. No. 16835665.7-1212 dated May 15, 2019, 16 pages.
Notification of Decision of Rejection for KR App. No. 10-2013-0025858 dated May 14, 2019, with English Translation, 8 pages.
Notification of Decision of Rejection for KR 10-2013-0026135 dated May 14, 2019, 8 pages with.
EP Communication of extended European Search Report for EP 19154162.2 dated Jun. 12, 2019, 9 pages.
First Office Action for Chinese App. No. 201680058731.9 dated Aug. 5, 2019, English Translation, 6 pages.
Extended Search Report for EP 19188841.1-1216 dated Sep. 10, 2019, 11 pages.
Exhibit A-01: Invalidity Contentions: '960 Patent in View Jitsuo, *NuCurrent v. Samsung Electronics America, Inc. et al.*, Case No. 1:19-cv-00798-DLC (S.D.N.Y.), Invalidity of U.S. Pat. No. 8,680,960 ("the '960 Patent") by Japanese Patent Application Publication JP05082349A ("Jitsuo"), 56 pages.
ExhibitA-02: Invalidity Contentions: '960Patent in View of KURS '694, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2010/0219694 A1 ("Kurs '694"), 59 pages.
Exhibit A-03: Invalidity Contentions: '960 Patent in View of Sheng-Yuan, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2007/267718 A1 ("Sheng-Yuan"). 86 pages.
Exhibit A-04: Invalidity Contentions: '960 Patent in View of Wotherspoon, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2007/0126544 A1 ("Wotherspoon"), 51 pages.
Exhibit A-05: Invalidity Contentions: '960 Patent in View of Baarman '777, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2009/0230777A1 ("Baarman '777"), 50 pages.
Exhibit A-06: Invalidity Contentions: '960 Patent in View of Bae, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Granted Publication 6897830 B2 ("Bae"), 80 pages.
Exhibit A-07: Invalidity Contentions: '960 Patent in View of Ganem, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2012/0235500 A1 ("Steven J. Ganem"), 82 pages.
Exhibit A-08: Invalidity Contentions: '960 Patent in View of Gao, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2011/084656 A1 ("Gao"), 39 pages.
Exhibit A-09: Invalidity Contentions: '960 Patent in View of Burghartz & Rejaei, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by on the Design of RF Spiral Inductors on Silicon ("Burghartz & Rejaei"), 53 pages.
Exhibit A-10: Invalidity Contentions: '960 Patent in View of Hasegawa '215, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by Japanese Patent Application Publication 2008-205215 A ("Hasegawa Minoru"), 46 pages.
Exhibit A-11: Invalidity Contentions: '960 Patent in View of Hasegawa '518, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by J.P. Patent Application Publication 01310518 A ("Hasegawa Michio '518"), 82 pages.
Exhibit A-12: Invalidity Contentions: '960 Patent in View of Hasegawa Michio '631, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Granted Publication 4959631 A ("Hasegawa Michio '631"), 43 pages.
Exhibit A-13: Invalidity Contentions: '960 Patent in View of Ishihara, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by JP Patent Application Publication 2008/294285 A ("Ishihara Keien"), 37 pages.
Exhibit A-14: Invalidity Contentions: '960 Patent in View of Kato, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2008/164840 A1 ("Hiroshi Kato"), 35 pages.
Exhibit A-15: Invalidity Contentions: '960 Patent in View of Kato, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2008/164844 A1 ("Hiroshi Kato"), 40 pages.
Exhibit A-16: Invalidity Contentions: '960 Patent in View of Kimura, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2002/071003 A1 ("Isao Kimura"), 59 pages.
Exhibit A-17: Invalidity Contentions: '960 Patent in View of Kurs '765, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2012/0280765 A1 ("Kurs '765"), 57 pages.
Exhibit A-18: Invalidity Contentions: '960 Patent in View of Misumi, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by Japanese Patent Application Publication JP 10255629 A ("Misumi Shuichi"), 37 pages.

(56) References Cited

OTHER PUBLICATIONS

Exhibit A-19: Invalidity Contentions: '960 Patent in View of Nakatani, *NuCurrent v. Samsung Electronics America, Inc. et al.*, Case No. 1:19-cv-00798-DLC (S.D.N.Y.) Invalidity of U.S. Pat. No. 8,680,960 ("The '960 Patent") by U.S. Patent Application Publication 2004/227608 A1 ("Toshifumi Nakatani"), 58 pages.

Exhibit A-20: Invalidity Contentions: '960 Patent in View of Partovi '367, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2007/0182367 A1 ("Partovi '367"), 49 pages.

Exhibit A-21: Invalidity Contentions: '960 Patent in View of Inventor Partovi '413, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2009/0096413 A1 ("Afshin Partovi '413"), 45 pages.

Exhibit A-22: Invalidity Contentions: '960 Patent in View of Partovi '636, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2012/0235636 A1 ("Afshin Partovi '636"), 64 pages.

Exhibit A-23: Invalidity Contentions: '960 Patent in View of Qi 0.95, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by Qi System Description, Wireless Power Transfer, vol. 1: Low Power, Version 0.95 ("Qi 0.95"), 26 pages.

Exhibit A-24: Invalidity Contentions: '960 Patent in View of Qi 1.0.1, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by Qi System Description, Wireless Power Transfer, vol. 1: Low Power, Part 1: Interface Definition, Version 1.0.1 ("Qi 1.0.1"), 49 pages.

Exhibit A-25: Invalidity Contentions: '960 Patent in View of Shima, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 5,808,587 A ("Hiroshi Shima"), 87 pages.

Exhibit A-26: Invalidity Contentions: '960 Patent in View of Sun, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2011/0101788 A1 ("Sun"), 65 pages.

Exhibit A-27: Invalidity Contentions: '960 Patent in View of Tseng, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 9,912,173 B2 ("Ryan Tseng"), 67 pages.

Exhibit A-28: Invalidity Contentions: '960 Patent in View of Von Novak, III, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 9,559,526 B2 ("William H. Von Novak, III"), 57 pages.

Exhibit A-29: Invalidity Contentions: '960 Patent in View of Yamakawa, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2012/0217819 A1 ("Yamakawa"), 40 pages.

Exhibit A-30: Invalidity Contentions: '960 Patent in View of Yoon & Allen, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by Embedded Conductor Technology for Micromachined Rf Elements ("Yoon & Allen"), 43 pages.

Exhibit A-31: Invalidity Contentions: '960 Patent in View of the Blackberry Z30, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by the Blackberry Z30, 154 pages.

Exhibit A-32: Invalidity Contentions: '960 Patent in View of the LG G2, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by the LG G2, 462 pages.

Exhibit A-33: Invalidity Contentions: '960 Patent in View of the LG G3, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by the LG G3, 228 pages.

Exhibit A-34: Invalidity Contentions: '960 Patent in View of the LG Nexus 5, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by the LG Nexus 5, 391 pages.

Exhibit B-01: Invalidity Contentions: '046Patent in View of Jitsuo, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by Japanese Patent Application Publication JP05082349A ("Jitsuo"), 50 pages.

Exhibit B-02: Invalidity Contentions: '046Patent in View of Kurs '694, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2010/0219694 A1 ("Kurs '694"), 51 pages.

Exhibit B-03: Invalidity Contentions: '046 Patent in View of Sheng-Yuan, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2007/267718 A1 ("Sheng-Yuan"), 76 pages.

Exhibit B-04: Invalidity Contentions: '046 Patent in View of Wotherspoon, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2007/0126544 A1 ("Wotherspoon"), 44 pages.

Exhibit B-05: Invalidity Contentions: '046Patent in View of Baarman '777, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2009/0230777A1 ("Baarman '777"), 42 pages.

Exhibit B-06: Invalidity Contentions: '046Patent in View of Bae, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Granted Publication 6897830 B2 ("Bae"), 71 pages.

Exhibit B-07: Invalidity Contentions: '046 Patent in View of Burghartz & Rejaei, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by on the Design of RF Spiral Inductors on Silicon ("Burghartz & Rejaei"), 45 pages.

Exhibit B-08: Invalidity Contentions: '046 Patent in View of Ganem, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2012/0235500 A1 ("Steven J. Ganem"), 75 pages.

Exhibit B-09: Invalidity Contentions: '046Patent in View of Gao, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2011/084656 A1 ("Gao"), 33 pages.

Exhibit B-10: Invalidity Contentions: '046 Patent in View of Hasegawa '215, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by Japanese Patent Application Publication 2008-205215 A ("Hasegawa Minoru"), 42 pages.

Exhibit B-11: Invalidity Contentions: '046 Patent in View of Hasegawa '518, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by J.P. Patent Application Publication 01310518 A ("Hasegawa Michio '518"), 69 pages.

Exhibit B-12: Invalidity Contentions: '046 Patent in View of Hasegawa Michio '631, *NuCurrent v. Samsung Electronics America, Inc. et al.*, Case No. Case No. 1:19-cv-00798-DLC (S.D.N.Y.) Invalidity of U.S. Patent No. 9,300,046 ("the '046 Patent") by U.S. Patent Granted Publication 4959631 A ("Hasegawa Michio '631"), 37 pages.

(56) References Cited

OTHER PUBLICATIONS

Exhibit B-13: Invalidity Contentions: '046 Patent in View of Ishihara, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by JP Patent Application Publication 2008/294285 A ("Ishihara Keien"), 33 pages.
Exhibit B-14: Invalidity Contentions: '046 Patent in View of Kato '840, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2008/164840 A1 ("Hiroshi Kato"), 32 pages.
Exhibit B-15: Invalidity Contentions: '046 Patent in View of Kato '844, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2008/164844 A1 ("Hiroshi Kato"), 37 pages.
Exhibit B-16: Invalidity Contentions: '046 Patent in View of Inventor Kimura, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2002/071003 A1 ("Isao Kimura"), 53 pages.
Exhibit B-17: Invalidity Contentions: '046Patent in View of Kurs '765, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2012/0280765 A1 ("Kurs '765"), 50 pages.
Exhibit B-18: Invalidity Contentions: '046 Patent in View of Misumi, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by Japanese. Patent Application Publication JP 10255629 A ("Misumi Shuichi"), 33 pages.
Exhibit B-19: Invalidity Contentions: '046 Patent in View of Nakatani, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2004/227608 A1 ("Toshifumi Nakatani"), 51 pages.
Exhibit B-20: Invalidity Contentions: '046Patent in View of Partovi '367, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2007/0182367 A1 ("Partovi '367"), 37 pages.
Exhibit B-21: Invalidity Contentions '046 Patent in View of Inventor Partovi '413, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2009/0096413 A1 ("Afshin Partovi '413"), 39 pages.
Exhibit B-22: Invalidity Contentions: '046 Patent in View of Partovi '636, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2012/0235636 A1 ("Afshin Partovi '636"), 55 pages.
Exhibit B-23: Invalidity Contentions: '046 Patent in View of Qi 0.95, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by Qi System Description, Wireless Power Transfer, vol. 1: Low Power, Version 0.95 ("Qi 0.95"), 23 pages.
Exhibit B-24: Invalidity Contentions: '046 Patent in View of Qi 1.0.1, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by Qi System Description, Wireless Power Transfer, vol. 1: Low Power, Part 1: Interface Definition, Version 1.0.1 ("Qi 1.0.1"), 44 pages.
Exhibit B-25: Invalidity Contentions: '046 Patent in View of Shima, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 5,808,587 A ("Hiroshi Shima"), 76 pages.
Exhibit B-26: Invalidity Contentions: '046 Patent in View of Sun, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2011/0101788 A1 ("Sun"), 55 pages.
Exhibit B-27: Invalidity Contentions: '046 Patent in View of Tseng, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Pat. No. 9,912,173 B2 ("Ryan Tseng"), 62 pages.
Exhibit B-28: Invalidity Contentions: '046 Patent in View of Von Novak, III, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 9,559,526 B2 ("William H. Von Novak, III"), 50 pages.
Exhibit B-29: Invalidity Contentions: '046Patent in View of Yamakawa, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2012/0217819 A1 ("Yamakawa"), 36 pages.
Exhibit B-30: Invalidity Contentions: '046 Patent in View of Yoon & Allen, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by Embedded Conductor Technology for Micromachined Rf Elements ("Yoon & Allen"), 39 pages.
Exhibit B-31: Invalidity Contentions: '046 Patent in View of the Blackberry Z30, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by the Blackberry Z30, 135 pages.
Exhibit B-32: Invalidity Contentions: '046 Patent in View of the LG G2, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by the LG G2, 401 pages.
Exhibit B-33: Invalidity Contentions: '046 Patent in View of the LG G3, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by the LG G3, 200 pages.
Exhibit B-34: Invalidity Contentions: '046 Patent in View of the LG Nexus 5, *NuCurrent v. Samsung Electronics America, Inc. et al.*, Case No. 1:19-cv-00798-DLC (S.D.N.Y.) Invalidity of U.S. Pat. No. 9,300,046 ("the '046 Patent") by the LG Nexus 5, 340 pages.
Exhibit C-01: Invalidity Contentions: '591 Patent in View of Jitsuo, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by Japanese Patent Application Publication JP05082349A ("Jitsuo"), 59 pages.
Exhibit C-02: Invalidity Contentions: '591 Patent in View of Kurs '694, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2010/0219694 A1 ("Kurs '694"), 61 pages.
Exhibit C-03: Invalidity Contentions: '591 Patent in View of Sheng-Yuan, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2007/267718 A1 ("Sheng-Yuan"), 84 pages.
Exhibit C-04: Invalidity Contentions: '591 Patent in View of Wotherspoon, *NuCurrent v. Samsung Electronics America, Inc. et al.*, Case No. 1:19-cv-00798-DLC (S.D.N.Y.) Invalidity of U.S. Pat. No. 8,698,591 ("The '591 Patent") by U.S. Patent Application Publication 2007/0126544 A1 ("Wotherspoon"), 58 pages.
Exhibit C-05: Invalidity Contentions: '591 Patent in View of Baarman '777, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2009/0230777A1 ("Baarman '777"), 57 pages.
Exhibit C-06: Invalidity Contentions: '591 Patent in View of Burghartz & Rejaei, *NuCurrent v. Samsung Electronics America, Inc. et al.*, Case No. 1:19-cv-00798-DLC (S.D.N.Y.) Invalidity of U.S. Pat. No. 8,698,591 ("the '591 Patent") by on the Design of RF Spiral Inductors on Silicon ("Burghartz & Rejaei"), 61 pages.
Exhibit C-07:Invalidity Contentions: '591 Patent in View of Ganem, *NuCurrent v. Samsung Electronics America, Inc. et al.*, Case No. 1:19-cv-00798-DLC (S.D.N.Y.) Invalidity of U.S. Pat. No. 8,698,591

(56) References Cited

OTHER PUBLICATIONS ("the '591 Patent") by U.S. Patent Application Publication 2012/0235500 A1 ("Steven J. Ganem"), 98 pages.

Exhibit C-08: Invalidity Contentions: '591 Patent in View of Gao, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2011/084656 A1 ("Gao"), 49 pages.

Exhibit C-09: Invalidity Contentions: '591 Patent in View of Hasegawa'215, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by Japanese Patent Application Publication 2008-205215 A ("Hasegawa Minoru"), 50 pages.

Exhibit C-10: Invalidity Contentions: '591 Patent in View of Hasegawa '518, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by JP Patent Application Publication 01310518 A ("Hasegawa Michio '518"), 85 pages.

Exhibit C-11: Invalidity Contentions: '591 Patent in View of Hasegawa'631, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Granted Publication 4959631 A ("Hasegawa'631"), 40 pages.

Exhibit C-12: Invalidity Contentions: '591 Patent in View of Ishihara, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by JP Patent Application Publication 2008/294285 A ("Ishihara Keien"), 40 pages.

Exhibit C-13: Invalidity Contentions: '591 Patent in View of Kato '840, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2008/164840 A1 ("Hiroshi Kato"), 35 pages.

Exhibit C-14: Invalidity Contentions: '591 Patent in View of Kato '844, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2008/164844 A1 ("Hiroshi Kato"), 39 pages.

Exhibit C-15: Invalidity Contentions: '591 Patent in View of Kimura, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2002/071003 A1 ("Isao Kimura "), 52 pages.

Exhibit C-16: Invalidity Contentions: '591 Patent in View of Kurs '765, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2012/0280765 A1 ("Kurs '765"), 61 pages.

Exhibit C-17: Invalidity Contentions: '591 Patent in View of Misum, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by Japanese. Patent Application Publication JP 10255629 A ("Misum Shuichi"), 37 pages.

Exhibit C-18: Invalidity Contentions: '591 Patent in View of Nakatani, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2004/227608 A1 ("Toshifumi Nakatani"), 59 pages.

Exhibit C-19: Invalidity Contentions: '591 Patent in View of Partovi '367, *NuCurrent* v. *Samsung Electronics America, Inc. et al.*, Case No. 1:19-cv-00798-DLC (S.D.N.Y.) Invalidity of U.S. Pat. No. 8,698,591 ("the '591 patent") by U.S. Patent Application Publication 2007/0182367 A1 ("Partovi '367"), 55 pages.

Exhibit C-20: Invalidity Contentions: '591 Patent in View of Afshin Partovi '413, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2009/0096413 A1 ("Afshin Partovi '413"), 56 pages.

Exhibit C-21: Invalidity Contentions: '591 Patent in View of Partovi '636, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2012/0235636 A1 ("Afshin Partovi '636"), 77 pages.

Exhibit C-22: Invalidity Contentions: '591 Patent in View of Qi 0.95, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by Qi System Description, Wireless Power Transfer, vol. 1: Low Power, Version 0.95 ("Qi 0.95"), 29 pages.

Exhibit C-23: Invalidity Contentions: '591 Patent in View of 01 1.0.1, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by Qi System Description, Wireless Power Transfer, vol. 1: Low Power, Part 1: Interface Definition, Version 1.0.1 ("Qi 1.0.1"), 57 pages.

Exhibit C-24: Invalidity Contentions: '591 Patent in View of Shima, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 5,808,587 A ("Hiroshi Shima"), 102 pages.

Exhibit C-25: Invalidity Contentions: '591 Patent in View of Sun, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2011/0101788 A1 ("Sun"), 68 pages.

Exhibit C-26: Invalidity Contentions: '591 Patent in View of Tseng, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication U.S. Pat. No. 9,912,173 B2 ("Ryan Tseng"), 84 pages.

Exhibit C-27: Invalidity Contentions: '591 Patent in View of Von Novak, III, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 9,559,526 B2 ("William H. Von Novak, III"), 81 pages.

Exhibit C-28: Invalidity Contentions: '591 Patent in View of Yamakawa, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2012/0217819 A1 ("Yamakawa"), 46 pages.

Exhibit C-29: Invalidity Contentions: '591 Patent in View of Yoon & Allen, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by Embedded Conductor Technology for Micromachined Rf Elements ("Yoon & Allen"), 44 pages.

Exhibit C-30: Invalidity Contentions: '591 Patent in View of Bae, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Granted Publication 6897830 B2 ("Bae"), 88 pages.

Exhibit C-31: Invalidity Contentions: '591 Patent in View of the Blackberry Z30, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by the Blackberry Z30, 180 pages.

Exhibit C-32: Invalidity Contentions: '591 Patent in View of the LG G2, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by the LG G2, 557 pages.

Exhibit C-33: Invalidity Contentions: 'Invalidity Contentions: '591 Patent in View of the LG G3 *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by the LG G3, 266 pages.

Exhibit C-34: Invalidity Contentions: '591 Patent in View of the LG Nexus 5, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by the LG Nexus 5, 468 pages.

Exhibit D-01: Invalidity Contentions: '948 Patent in View of Jitsuo, *NuCurrent* v. *Samsung Electronics America, Inc. et al.*, Case No. 1:19-cv-00798-DLC (S.D.N.Y.) Invalidity of U.S. Pat. No. 8,710,948 ("the '948 Patent") by Japanese Patent Application Publication JP05082349A ("Jitsuo"), 54 pages.

(56) References Cited

OTHER PUBLICATIONS

Exhibit D-02: Invalidity Contentions: '948 Patent in View of Kurs, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2010/0219694 A1 ("Kurs"), 59 pages.

Exhibit D-03: Invalidity Contentions: '948 Patent in View of Sheng-Yuan, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2007/267718 A1 ("Sheng-Yuan"), 77 pages.

Exhibit D-04: Invalidity Contentions: '948 Patent in View of Wotherspoon, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2007/0126544 A1 ("Wotherspoon"), 52 pages.

Exhibit D-05: Invalidity Contentions: '948 Patent in View of Baarman, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2009/0230777A1 ("David W. Baarman"), 52 pages.

Exhibit D-06: Invalidity Contentions: '948 Patent in View of Bae, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Granted Publication 6897830 B2 ("Bae"), 82 pages.

Exhibit D-07: Invalidity Contentions: '948 Patent in View of Burghartz & Rejaei, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by on the Design of RF Spiral Inductors on Silicon ("Burghartz & Rejaei"), 52 pages.

Exhibit D-08: Invalidity Contentions: '948 Patent in View of Ganem, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2012/0235500 A1 ("Steven J. Ganem"), 92 pages.

Exhibit D-09: Invalidity Contentions: '948 Patent in View of Gao, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2011/084656 A1 ("Gao"), 44 pages.

Exhibit D-10: Invalidity Contentions: '948 Patent in View of Hasegawa '215, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by Japanese Patent Application Publication 2008-205215 A ("Hasegawa Minoru '215"), 46 pages.

Exhibit D-11: Invalidity Contentions: '948 Patent in View of Hasegawa Michio '631, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Granted Publication 4959631 A ("Hasegawa Michio '631"), 37 pages.

Exhibit D-12: Invalidity Contentions: '948 Patent in View of Hasegawa '518, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by J.P. Patent Application Publication 01310518 A ("Hasegawa Michio '518"), 78 pages.

Exhibit D-13: Invalidity Contentions: '948 Patent in View of Ishihara, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by JP Patent Application Publication 2008/294285 A ("Ishihara Keien"), 38 pages.

Exhibit D-14: Invalidity Contentions: '948 Patent in View of Kato, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2008/164840 A1 ("Hiroshi Kato"), 34 pages.

Exhibit D-15: Invalidity Contentions: '948 Patent in View of Kato, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2008/164844 A1 ("Hiroshi Kato"), 39 pages.

Exhibit D-16: Invalidity Contentions: '948 Patent in View of Kimura, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2002/071003 A1 ("Isao Kimura"), 50 pages.

Exhibit D-17: Invalidity Contentions: '948 Patent in View of Kurs '765, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2012/0280765 A1 ("Kurs '765"), 57 pages.

Exhibit D-18: Invalidity Contentions: '948 Patent in View of Misumi, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by Japanese. Patent Application Publication JP 10255629 A ("Misumi Shuichi"), 34 pages.

Exhibit D-19: Invalidity Contentions: '948 Patent in View of Nakatani, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2004/227608 A1 ("Toshifumi Nakatani"), 56 pages.

Exhibit D-20: Invalidity Contentions: '948 Patent in View of Partovi '367, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2007/0182367 A1 ("Partovi '367"), 51 pages.

Exhibit D-21: Invalidity Contentions: '948 Patent in View of Partovi '413, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2009/0096413 A1 ("Afshin Partovi '413"), 51 pages.

Exhibit D-22: Invalidity Contentions: '948 Patent in View of Partovi '636, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2012/0235636 A1 ("Afshin Partovi '636"), 67 pages.

Exhibit D-23: Invalidity Contentions: '948 Patent in View of Qi 0.95, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by Qi System Description, Wireless Power Transfer, vol. 1: Low Power, Version 0.95 ("Qi 0.95"), 28 pages.

Exhibit D-24: Invalidity Contentions: '948 Patent in View of Qi 1.0.1, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by Qi System Description, Wireless Power Transfer, vol. 1: Low Power, Part 1: Interface Definition, Version 1.0.1 ("Qi 1.0.1"), 55 pages.

Exhibit D-25: Invalidity Contentions: '948 Patent in View of Shima, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Pat. No. 5,808,587 A ("Hiroshi Shima"), 94 pages.

Exhibit D-26: Invalidity Contentions: '948 Patent in View of Sun, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2011/0101788 A1 ("Sun"), 63 pages.

Exhibit D-27: Invalidity Contentions: '948 Patent in View of Tseng, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Pat. No. 9,912,173 B2 ("Ryan Tseng"), 75 pages.

Exhibit D-28: Invalidity Contentions: '948 Patent in View of Von Novak, III, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by U.S. Pat. No. 9,559,526 B2 ("William H. Von Novak, III"), 73 pages.

Exhibit D-29: Invalidity Contentions: '948 Patent in View of Yamakawa, *NuCurrent v. Samsung Electronics America, Inc. et al.*, Case No. 1:19-cv-00798-DLC (S.D.N.Y.) Invalidity of U.S. Pat. No.

(56) References Cited

OTHER PUBLICATIONS 8,710,948 ("the '948 Patent") by U.S. Patent Application Publication 2012/0217819 A1 ("Yamakawa"), 42 pages.
Exhibit D-30: Invalidity Contentions: '948 Patent in View of Yoon & Allen, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by Embedded Conductor Technology for Micromachined Rf Elements ("Yoon & Allen"), 41 pages.
Exhibit D-31—Invalidity Contentions: '948 Patent in View of the Blackberry Z30, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by the Blackberry Z30, 168 pages.
Exhibit D-32: Invalidity Contentions: '948 Patent in View of the LG G2, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by the LG G2, 511 pages.
Exhibit D-33—Invalidity Contentions: '948 Patent in View of LG G3, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by the LG G3, 249 pages.
Exhibit D-34—Invalidity Contentions: '948 Patent in View of the LG Nexus 5, *NuCurrent v. Samsung Electronics America, Inc. et al.*, Case No. 1:19-cv-00798-DLC (S.D.N.Y.) Invalidity of U.S. Pat. No. 8,710,948 ("the '948 Patent") by the LG Nexus 5, 434 pages.
Exhibit E-01: Invalidity Contentions: '729 Patent in View of HA, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by United States Patent Publication No. 2016/0149416 ("Ha"), 99 pages.
Exhibit E-02: Invalidity Contentions: '729 Patent in View of Riehl, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by United States Patent Application Publication 2014/0035383 ("Riehl"), 50 pages.
Exhibit E-03 : Invalidity Contentions: '729 Patent in View of Baarman '154, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by United States Patent Application Publication No. 2013/0076154 ("Baarman '154"), 42 pages.
Exhibit E-04: Invalidity Contentions: '729Patent in View of Kanno, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by United States Patent Application Publication 2011/0241437 ("Kann"), 30 pages.
Exhibit E-05: Invalidity Contentions: '729 Patent in View of Kazuya, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by Japanese Patent Application Publication 2013093429 ("Kazuya"), 32 pages.
Exhibit E-06: Invalidity Contentions: '729 Patent in View of Muratov, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by United States Patent Application Publication No. 2015/0357827 ("Muratov"), 35 pages.
Exhibit E-07: Invalidity Contentions: '729 Patent in View of Sung, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by United States Patent Publication No. 2012/0274148 ("Sung"), 27 pages.
Exhibit E-08 : Invalidity Contentions: '729 Patent in View of Kurz '635, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by United States Patent Publication No. 2015/0145635 ("Kurz '635"), 133 pages.
Exhibit E-09: Invalidity Contentions: '729 Patent in View of Kurz '634, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by United States Patent Publication No. 2015/0145635 ("Kurz '634"), 122 pages.

Exhibit E-10: Invalidity Contentions: '729 Patent in View of Lee '746, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by United States Patent Application Publication No. 2015/0137746 ("Lee '746"), 34 pages.
Exhibit E-11: Invalidity Contentions: '729 Patent in View of Mukherjee, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by United States Patent Publication No. 2015/0091502 ("Mukherjee"), 32 pages.
Exhibit E-12: Invalidity Contentions: '729 Patent in View of Asanuma, *NuCurrent v. Samsung Electronics America, Inc. et al.*, Case No. 1:19-cv-00798-DLC (S.D.N.Y.) Invalidity of U.S. Patent No. 9,941,729 ("the '729 Patent") by United States Patent Application Publication No. 2014/0197694 ("Asanuma"), 24 pages.
Exhibit E-13: Invalidity Contentions: '729 Patent in View of Takashi, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by United States Patent Publication No. 2014/0008974 ("Takashi"), 77 pages.
Exhibit E-14: Invalidity Contentions: '729 Patent in View of Hoon, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by Korean Patent Publication No. 20130015618 ("Hoon"), 28 pages.
Exhibit E-15 : Invalidity Contentions: '729 Patent in View of Lee '710, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by United States Patent Publication No. 2015/0318710 ("Lee '710"), 42 pages.
Exhibit E-16: Invalidity Contentions: '729 Patent in View of Hisanori, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by Japanese Patent Publication No. 2012-147408 ("Hisanori"), 45 pages.
Exhibit E-17: Invalidity Contentions: '729 Patent in View of Muratov Presentation, *NuCurrent v. Samsung Electronics America, Inc. et al.*, Case No. 1:19-cv-00798-DLC (S.D.N.Y.) Invalidity of U.S. Pat. No. 9,941,729 ("The '729 Patent") by Multi-Mode Wireless Power Systems can be a Bridge to the Promised Land of Universal Contactless Charging, presented by Vladimir Muratov ("Muratov Presentation"), 57 pages.
Exhibit E-18: Invalidity Contentions: '729 Patent in View of Han, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by United States Patent Publication No. 2017/0353055 A1 ("Han"), 46 pages.
Exhibit E-19: Invalidity Contentions: '729 Patent in View of Riehl IEEE, *NuCurrent v. Samsung Electronics America, Inc. et al.*, Case No. 1:19-cv-00798-DLC (S.D.N.Y.) Invalidity of U.S. Pat. No. 9,941,729 ("the '729 Patent") by Wireless Power Systems for Mobile Devices Supporting Inductive and Resonant Operating Modes, by Patrick S. Riehl et al., IEEE Transactions on Microwave Theory and Techniques, vol. 63, No. 3, Mar. 3, 2015 (Riehl IEEE), 56 pages.
Exhibit F-01: Invalidity Contentions: '960 Patent in View of Chung Yeon Ho, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by Korean Patent Application Publication 2010/0092741 A ("Chung Yeon Ho"), 34 pages.
Exhibit F-02: Invalidity Contentions: '960 Patent in View of Jung, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by U.S. Patent Application Publication 2009/0140691 A1 ("Chun-Kil Jung"), 58 pages.
Exhibit F-03: Invalidity Contentions: '960 Patent in View of Kook, *NuCurrent v. Samsung Electronics America, Inc. et al.*, Case No. 1:19-cv-00798-DLC (S.D.N.Y.) Invalidity of U.S. Pat. No. 8,680,960 ("the '960 Patent") by WIPO Patent Application Publication 2008/050917 A1 ("Kook Yoon-Sang"), 30 pages.
Exhibit G-01: Invalidity Contentions: '046 Patent in View of Chung Yeon Ho, *NuCurrent v. Samsung Electronics America, Inc. et al.*, Case No. 1:19-cv-00798-DLC (S.D.N.Y.) Invalidity of U.S. Pat. No.

(56) References Cited

OTHER PUBLICATIONS 9,300,046 ("the '046 Patent") by Korean Patent Application Publication 2010/0092741 A ("Chung Yeon Ho"), 33 pages.
Exhibit G-02: Invalidity Contentions: '046 Patent in View of Jung, *NuCurrent* v. *Samsung Electronics America, Inc. et al.*, Case No. 1:19-cv-00798-DLC (S.D.N.Y.) Invalidity of U.S. Pat. No. 9,300,046 ("the '046 Patent") by U.S. Patent Application Publication 2009/0140691 A1 ("Chun-Kil Jung"), 49 pages.
Exhibit G-03: Invalidity Contentions: '046 Patent in View of Kook, *NuCurrent* v. *Samsung Electronics America, Inc. et al.*, Case No. 1:19-cv-00798-DLC (S.D.N.Y.) Invalidity of U.S. Pat. No. 9,300,046 ("the '046 Patent") by WIPO Patent Application Publication 2008/050917 A1 ("Kook Yoon-Sang"), 26 pages.
Exhibit H-01: Invalidity Contentions: '591 Patent in View of Chung Yeon Ho, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by Korean Patent Application Publication 2010/0092741 A ("Chung Yeon Ho"), 43 pages.
Exhibit H-02: Invalidity Contentions: '591 Patent in View of Jung, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by U.S. Patent Application Publication 2009/0140691 A1 ("Chun-Kil Jung"), 88 pages.
Exhibit H-03: Invalidity Contentions: '591 Patent in View of Kook, *NuCurrent* v. *Samsung Electronics America, Inc. et al.*, Case No. 1:19-cv-00798-DLC (S.D.N.Y.) Invalidity of U.S. Pat. No. 8,698,591 ("the '591 Patent") by WIPO Patent Application Publication 2008/050917 A1 ("Kook Yoon-Sang"), 49 pages.
Exhibit I-01: Invalidity Contentions: '948 Patent in View of Chung Yeon Ho, *NuCurrent* v. *Samsung Electronics America, Inc. et al.*, Case No. 1:19-cv-00798-DLC (S.D.N.Y.) Invalidity of U.S. Pat. No. 8,710,948 ("the '948 Patent") by Korean Patent Application Publication 2010/0092741 A ("Chung Yeon Ho"), 39 pages.
Exhibit I-02: Invalidity Contentions: '948 Patent in View of Jung, *NuCurrent* v. *Samsung Electronics America, Inc. et al.*, Case No. 1:19-cv-00798-DLC (S.D.N.Y.) Invalidity of U.S. Pat. No. 8,710,948 ("the '948 Patent") by U.S. Patent Application Publication 2009/0140691 A1 ("Chun-Kil Jung"), 78 pages.
Exhibit I-03: Invalidity Contentions: '948 Patent in View of Kook, *NuCurrent* v. *Samsung Electronics America, Inc. et al.*, Case No. 1:19-cv-00798-DLC (S.D.N.Y.) Invalidity of U.S. Pat. No. 8,710,948 ("the '948 Patent") by WIPO Patent Application Publication 2008/050917 A1 ("Kook Yoon-Sang"), 43 pages.
Exhibit J-01 : Invalidity Contentions: '729 Patent in View of Satoshi, *NuCurrent* v. *Samsung Electronics America, Inc. et al.*, Case No. 1:19-cv-00798-DLC (S.D.N.Y.) Invalidity of U.S. Pat. No. 9,941,729 ("the '729 Patent") by Japanese Patent Publication No. 2001-344574 ("Satoshi"), 19 pages.
Exhibit J-02: Invalidity Contentions: '729 Patent in View of Takahashi, *NuCurrent* v. *Samsung Electronics America, Inc. et al.*, Case No. 1:19-cv-00798-DLC (S.D.N.Y.) Invalidity of U.S. Pat. No. 9,941,729 ("the '729 Patent") by United States Patent Publication No. 2007/0095913 ("Takahashi"), 23 pages.
Exhibit J-03: Invalidity Contentions: '729 Patent in View of Baarman '953, *NuCurrent* v. *Samsung Electronics America, Inc. et al.*, Case No. 1:19-cv-00798-DLC (S.D.N.Y.) Invalidity of U.S. Pat. No. 9,941,729 ("the '729 Patent") by United States Patent Application Publication No. 2011/0259953 ("Baarman '953"), 31 pages.
Exhibit J-04: Invalidity Contentions: '729 Patent in View of Carobolante, *NuCurrent* v. *Samsung Electronics America, Inc. et al.*, Case No. 1:19-cv-00798-DLC (S.D.N.Y.) Invalidity of U.S. Pat. No. 9,941,729 ("the '729 Patent") by United States Patent Publication No. 2015/0115727 ("Carobolante"), 12 pages.
Exhibit J-05: Invalidity Contentions: '729 Patent in View of Bae, *NuCurrent* v. *Samsung Electronics America, Inc. et al.*, Case No. 1:19-cv-00798-DLC (S.D.N.Y.) Invalidity of U.S. Pat. No. 9,941,729 ("the '729 Patent") by United States Patent Publication No. 2016/0156103 ("Bae"), 6 pages.
Exhibit J-06: Invalidity Contentions: '729 Patent in View of Singh, *NuCurrent* v. *Samsung Electronics America, Inc. et al.*, Case No. 1:19-cv-00798-DLC (S.D.N.Y.) Invalidity of U.S. Pat. No. 9,941,729 ("the '729 Patent") by U.S. Pat. No. 8,680,960 ("Singh"), 3 pages.
Exhibit J-07: Invalidity Contentions: '729 Patent in View of Qi 1.0.1, *NuCurrent* v. *Samsung Electronics America, Inc. et al.*, Case No. 1:19-cv-00798-DLC (S.D.N.Y.) Invalidity of U.S. Pat. No. 9,941,729 ("the '729 Patent") by Qi System Description, Wireless Power Transfer, vol. 1: Low Power, Part 1: Interface Definition, Version 1.0.1 ("Qi 1.0.1"), 14 pages.
Exhibit J-08 : Invalidity Contentions: '729 Patent in View of Narayanan, *NuCurrent* v. *Samsung Electronics America, Inc. et al.*, Case No. 1:19-cv-00798-DLC (S.D.N.Y.) Invalidity of U.S. Pat. No. 9,941,729 ("the '729 Patent") by Application Note: Wireless Power Charging Coil Considerations, by Raghu Narayanan, Würth Elektronik ("Narayanan"), 6 pages.
Exhibit J-09: Invalidity Contentions: '729 Patent in View of Barcelo, *NuCurrent* v. *Samsung Electronics America, Inc. et al.*, Case No. 1:19-cv-00798-DLC (S.D.N.Y.) Invalidity of U.S. Pat. No. 9,941,729 ("the '729 Patent") by Application Note 138: Wireless Power User Guide, by Trevor Barcelo, Linear Technology ("Barcelo"), 4 pages.
Exhibit K: Family Patents Combinations, *NuCurrent* v. *Samsung Electronics America, Inc. et al.*, Case No. 1:19-cv-00798-DLC (S.D.N.Y.), 103 pages.
Exhibit L: '729 Patent Combinations, *NuCurrent* v. *Samsung Electronics America, Inc. et al.*, Case No. 1:19-cv-00798-DLC (S.D.N.Y.), 106 pages.
Decision Granting Institution of Inter Partes Review of IPR2019-0858, 44 pages.
IPR2019-00858, Exhibit 1042—Order Denying [167] Motion for Preliminary Injunction, 15 pages.
IPR2019-00859—Decision Granting Institution of Inter Partes Review for U.S. Pat. No. 9,300,046 B2, 48 pages.
IPR2019-00859—Ex. 1042—Order Denying [167] Motion for Preliminary Injunction, 15 pages.
IPR2019-00860—Decision Denying Institution of Inter Partes Review re U.S. Pat. No. 8,680,960 B2, 6 pages.
IPR2019-00860—Ex. 1042, Order Denying [167] Motion for Preliminary Injunction, 15 pages.
Decision Denying Institution of Inter Partes Review re U.S. Pat. No. 9,300,046 B2, 6 pages.
Decision Granting of Inter Partes Review Case IPR2019-00862 re U.S. Pat. No. 8,710,948 B2, 41 pages.
IPR2019-00862 Exhibit 1042—Order Denying [167] Motion for Preliminary injunction, 15 pages.
IPR2019-00863 Decision Granting Institution of Inter Partes Review re U.S. Pat. No. 8,698,591 B2, 42 pages.
IPR2019-00863—Ex. 1002 Corrected Leeb Declaration, 124 pages.
IPR2019-01217—Petition for Inter Partes Review of U.S. Pat. No. 9,941,729, 90 pages.
IPR2019-01217—Ex. 1001—U.S. Pat. No. 9,941,729, 48 pages.
IPR2019-01217—Ex. 1002—Declaration of R. Jacob Baker, Ph.D., P.E., In Support of Petition for Inter Partes Review of U.S. Pat. No. 9,941,729, 143 pages.
IPR2019-01217—Ex. 1003—CV of R. Jacob Baker, 35 pages.
IPR2019-01217—Ex. 1004—U.S. Appl. No. 14/821,065, part 1, 330 pages.
IPR2019-01217—Ex. 1004—U.S. Appl. No. 14/821,065, part 2, 430 pages.
IPR2019-01217—Ex. 1004—U.S. Appl. No. 14/821,065, part 3, 230 pages.
IPR2019-01217—Ex. 1004—U.S. Appl. No. 14/821,065, part 4, 299 pages.
Ex. 1005—U.S. Publication 2014-0035383 to Riehl, 11 pages.
Ex. 1006—Riehl IEEE Transactions on Microwave Therory and Techniques, Mar. 2015, vol. 63, No. 3, 17 pages.
Ex. 1007 U.S. Publication 2011/0241437 to Kanno, 21 pages.
Ex. 1008—U.S. Publication 2012/0274148 to Sung et al., 13 pages.
Ex. 1009—JP Patent No. 2013-93429 to Kazuya, 27 pages.
Ex. 1010—U.S. Pub. No. 2015/0091502 to Mukherjee et al., 7 pages.
Ex. 1011—KR Patent No. 10-2013-0045307 to Yu, 45 pages.
Ex. 1012—IEE Transactions on microwave theory and techniques, New York, NY 1953, 17 pages.

(56) References Cited

OTHER PUBLICATIONS

Ex. 1013—Asa et al., A Novel Multi-Level Phase-Controlled Resonant Inverter with Common Mode Capacitor for Wireless EV Chargers, 6 pages.
Ex. 1014—Abstract of a Novel Multi-Level Phase-Controlled Resonant Inverter with Common Mode Capacitor for Wireless EV Chargers, IEEE XPlore Digital Library, 2 pages.
IPR2019-01217—Ex.1015—Wotherspoon—US 2007/0126544, 6 pages.
PGR2019-00049—Petition for Post-Grant Review re U.S. Pat. No. 10,063,100, 112 pages.
Ex. 1001—U.S. Pat. No. 10,063,100, 48 pages.
PGR2019-00049—Ex. 1002—Declaration of Jacob Baker, Ph.D., P.E. In support of Petition for Post-Grant Review of U.S. Pat. No. 10,063,100, 141 pages.
Ex. 1003—CV of R. Jacob Baker, Ph.D., P.E., 34 pages.
Ex. 1004—File History of U.S. Appl. No. 14/821,157, Part 1, 475 pages.
Ex. 1004—File History of U.S. Appl. No. 14/821,157, Part 2, 475 pages.
Ex. 1004—File History of U.S. Appl. No. 14/821,157, Part 3, 438 pages.
PGR2019-0050—Petition for Post-Grant Review of U.S. Pat. No. 10,063,100, 73 pages.
PGR2019-0050—Ex. 1002 Declaration of R. Jacob Baker, Ph.D., P.E. In Support of Petition for Post-Grant Review of U.S. Pat. No. 10,063,100, 42 pages.
PGR2019-0050—Ex. 1005 U.S. Pat. No. 9,941,729 to Peralta et al., 48 pages.
PGR2019-0050—Ex. 1006 File History for U.S. Appl. No. 14/821,065, Part 1, 800 pages.
PGR2019-0050—Ex. 1006 File History for U.S. Appl. No. 14/821,065, Part 2, 489 pages.
PGR2019-0050—Ex. 1008—First Amended Complaint for *NuCurrent, Inc. v. Samsung Electronics Co., Ltd.; Samsung Electronics America, Inc.*, Case. No. 6:18-cv-00051-JRG-KNM, 62 pages.
PGR2019-0050—Ex. 1009—NuCurrent's Opening Claim Construction Brief, Case. No. 1:19-CV-00798-DLC, 31 pages.
European Extended Search Report for EP Application No. 17879649.6-1202 dated Dec. 17, 2019.
IPR2019-00858, *Samsung Electronics Co., Ltd. vs. NuCurrent, Inc.*, U.S. Pat. No. 8,680,960, Preliminary Guidance, Patent Owner's Motion to Amend, Paper 48, Aug. 27, 2020, 20 pages.
IPR2019-00859, *Samsung Electronics Co., Ltd. v. NuCurrent, Inc.*, U.S. Pat. No. 9,300,046, Preliminary Guidance, Patent Owner's Motion to Amend, Paper 48, Aug. 27, 2020, 18 pages.
IPR2019-00860, *Samsung Electronics Co., Ltd. vs. NuCurrent, Inc.*, U.S. Pat. No. 8,680,960, Preliminary Guidance, Patent Owner's Motion to Amend, Paper 39, Aug. 27, 2020, 20 pages.
IPR2019-00861, *Samsung Electronics Co. Ltd. vs. NuCurrent, Inc.*, U.S. Pat. No. 9,300,046, Preliminary Guidance, Patent Owner's Motion to Amend, Paper 39, Aug. 27, 2020, 19 pages.
IPR2019-00862, *Samsung Electronics Co., Ltd. vs. NuCurrent, Inc.*, U.S. Pat. No. 8,710,948, Preliminary Guidance, Patent Owner's Motion to Amend, Paper 50, Aug. 27, 2020, 21 pages.
IPR2019-00863, *Samsung Electronics Co., Ltd. vs. NuCurrent, Inc.*, U.S. Pat. No. 8,698,591, Preliminary Guidance, Patent Owner's Motion to Amend, Paper 49, Aug. 27, 2020, 21 pages.
International Bureau, International Preliminary Report on Patentability dated Mar. 1, 2018, issued in connection with International Application No. PCT/US2016/047607, filed Aug. 18, 2016, 7 pages.
PGR2019-00049, Petitioner's Current List of Exhibits, *Samsung Electronics Co. Ltd. v. NuCurrent, Inc.*, Jun. 18, 2020, 4 pages.
PGR2019-00049 Samsung Exhibit 1015, Rebuttal Declaration of R. Jacob Baker, Ph.D., P.E., *Samsung Electronics Co. Ltd. v. Promos Technologies, Inc.*, 25 pages.
PGR2019-00049, Samsung Exhibit 1016, *Samsung Electronics Co. Ltd. v. NuCurrent, Inc.*, Oral Deposition of Dr. David S. Ricketts, May 20, 2020, 104 pages.
PGR2019-00050, Petitioner's Current List of Exhibits, *Samsung Electronics Co. Ltd. v. NuCurrent, Inc.*, Jun. 18, 2020, 3 pages.
PGR2019-00050, *Samsung Electronics Co. Ltd. v. NuCurrent, Inc.*, Petitioner's Reply to Patent Owner's Response, Jun. 18, 2020, 32 pages.
PGR2019-00050, Samsung Exhibit 1010, *Samsung Electronics Co. Ltd. v. NuCurrent, Inc.*, Rebuttal Declaration of R. Jacob Baker, Ph.D., P.E., Jun. 18, 2020, 14 pages.
PGR2019-00050, Samsung Exhibit 1011, *Samsung Electronics Co. Ltd. v. NuCurrent, Inc.*, Deposition of Dr. David S. Ricketts, Mar. 12, 2020, 124 pages.
*Samsung Electronics Co., Ltd. v. NuCurrent, Inc.* Petitioner's Reply to Patent Owner's Response for U.S. Pat. No. 10,063,100, filed Jun. 18, 2020, 37 pages.
PGR2019-00049, *Samsung Electronics Co., Ltd. vs. NuCurrent, Inc.*, U.S. Pat. No. 10,063,100, Judgment, Final Written Decision Determining All Challenged Claims Unpatentable, Paper 28, Nov. 30, 2020, 42 pages.
PGR2019-00050, *Samsung Electronics Co., Ltd. vs. NuCurrent, Inc.*, U.S. Pat. No. 10,063,100, Judgment, Final Written Decision Determining All Challenged Claims Unpatentable, Paper 26, Nov. 30, 2020, 22 pages.

\* cited by examiner

MULTI-MODE WIRELESS ANTENNA CONFIGURATIONS

RELATED APPLICATIONS

This application claims priority to U.S. Provisional Application No. 62/206,981, filed on Aug. 19, 2015, U.S. Provisional Application No. 62/206,988, filed on Aug. 19, 2015, U.S. Provisional Application No. 62/207,008, filed on Aug. 19, 2015, U.S. Provisional Application No. 62/207,020, filed on Aug. 19, 2015, and U.S. Provisional Application No. 62/207,029, filed on Aug. 19, 2015, the disclosures of which are entirely incorporated herein by reference.

TECHNICAL FIELD

The present disclosure relates generally to the wireless transmission of electrical energy and data. More specifically, this application relates to an antenna and system thereof that facilitates the wireless transmission of data and electrical energy at multiple operating frequency bands.

BACKGROUND

Wireless energy transfer is useful in cases where the interconnection of wires may be inconvenient, hazardous or impossible. In recent years, applications employing near-field wireless power and/or data transmission have gained prominence in areas such as consumer electronics, medical systems, military systems and industrial applications. Near field energy transfer utilizes near field coupling between opposed electric fields, magnetic fields or electromagnetic fields to transfer energy therebetween. In this application, the inventive concepts particularly pertain to Near-field magnetic coupling (NFMC). Near-field magnetic coupling enables the transfer of electrical energy and/or data wirelessly through magnetic induction between a transmitting antenna and a corresponding receiving antenna. The NFC standard, based on Near-field communication interface and protocol modes, is defined by ISO/IEC standard 18092.

However, near-field coupling is often not optimal because prior art antennas that facilitate the wireless transfer of electrical power and/or data operate inefficiently. In such cases, the amount of electrical energy received by the corresponding antenna is generally significantly less than the amount of electrical energy initially transmitted. In many cases, the loss of energy often manifests itself as heat in the system. In addition, data that is received may be incomplete or may become corrupted. As defined herein, "loss" means an amount of energy that is lost in the transmission between a transmitting and receiving device. Loss may be energy that is converted to heat or is absorbed elsewhere. Furthermore, near-field coupling generally suffers from reduced wireless transfer distance issues, i.e., transmission range, and physical antenna orientation. These inefficiencies of near field coupling are largely due to the low quality factor of the prior art antennas and, in addition, to electrical and magnetic interferences external and internal of the antenna.

In general, prior art near field coupling antennas are constructed with inadequate or non-optimized materials that do not effectively shield the components of the antenna from adverse interactions with adjacently positioned magnetic and dielectric materials. Specifically, adjacently positioned magnetic and dielectric materials may adversely interact with the magnetic fields that are emanating from the inductive coils of the antenna. As a result, loss of energy occurs during transmission. Such inadequate and non-optimized shielding within the antenna often hinders efficient operation and wireless transmission. For example, the designed inductance generated by an antenna could shift due to adverse interactions with adjacently positioned magnetic or dielectric materials that may reside internal or external of the antenna.

Specifically, magnetic fields generated by the coils of the antenna may be absorbed or blocked by adjacently positioned magnetic or conductive materials. In addition, adjacently positioned dielectric materials with zero or non-zero conductivity may also cause interference issues. Specifically, dielectric materials may cause adverse interferences with the magnetic fields that emanate from the coils of the antenna, particularly high inductance antennas. Proximally positioned dielectric material may undesirably increase parasitic capacitance within an inductive coil of an antenna. Therefore, the antenna of the present disclosure is constructed with various shielding materials that are strategically positioned so that the components of the antenna, particularly the inductive coils, are protected from adverse interferences as a result of these adjacently positioned materials. Certain materials such as magnetic, dielectric or conductive materials may adversely interact with the magnetic fields emanating from the antenna coils. As a result, energy is lost during near field transmission.

Inductive solutions such as NFMC systems, transfer power and/or data between two inductive coils that are placed in close proximity to each other. This technology, for example, facilitates the deployment of inductive charging "hot spots" that enable wireless electrical charging of electronic devices by simply placing them near a charging "hot spot", such as on a surface of a table. However, for these systems to operate efficaciously, the respective transmitter and receiver antennas are required to not only be located in close proximity to each other but, in addition, must also be physically positioned in a specific orientation with respect to one another. Typically, in order to operate efficiently, these prior art antennas require that they are physically positioned in near perfect alignment so that the centers of the respective transmitting and receiving antennas are oriented in perfect opposition to each other.

As defined herein "inductive charging" is a wireless charging technique that utilizes an alternating electromagnetic field to transfer electrical energy between two antennas. "Resonant inductive coupling" is defined herein as the near field wireless transmission of electrical energy between two magnetically coupled coils that are tuned to resonate at a similar frequency.

Various multimode wireless power solutions have been developed to address these antenna positioning and proximity limitations and concomitant reliability and efficiency issues. In some cases, operating frequency bands have been reduced. For example, for an antenna system that has a frequency band ranging from about 150 kHz to about 250 kHz, a higher transmission range could be achieved by resonating the receiving antenna at a frequency that is about the same as the frequency of the transmitting antenna. Another technique is to tune the receiver at a frequency that is about the same as the expected frequency at which the desired power is transferred. For example, assume that the frequency band over which power is transferred is between 150 KHz and 250 KHz, and the transmitter antenna is tuned to about 150 KHz. Assume that the system uses frequency to enable power control wherein a portion of the power is transferred at a frequency of about 250 kHz and another portion of power is transferred at a lower frequency of about 150 KHz. In general, it is possible to perform system analysis using empirical and theoretical studies to determine an optimum frequency band (a subset of 150 KHz-250 KHz) for a specific receiver device. This band, for example could range from about 175 kHz to about 190 kHz. Based on this, the receiver antenna could be tuned closer to the center of the optimum frequency band, in this case, about 182.5 KHz. This would lead to a larger transferred impedance at a relatively lower coupling position and increased transmission range. However, while these solutions offer unique benefits, they do not sufficiently address the need to provide increased efficient wireless transfer with multiple mode operation capability. This is achieved through modification of the antenna structure.

Inductive and resonance interface standards have been developed to create global standards for wireless charging technologies. "Qi" is a wireless inductive power transfer standard/specification. Specifically, the Qi wireless inductive power transfer standard is an interface standard that was developed by the Wireless Power Consortium. The Qi interface standard is a protocol generally intended to facilitate transfer of low electrical power up to about 15 W at frequencies ranging from 100 kHz to about 205 kHz over distances ranging from about 2 mm to about 5 mm.

"Rezence" is a competing interface standard developed by the Alliance for Wireless Power (A4WP). This standard addresses wireless electrical power transfer based on the principles of magnetic resonance. Specifically, the Rezence interface standard currently supports electrical power transfer up to about 50 W, at distances up to about 5 cm. Unlike the Qi interface standard, the Rezence interface standard utilizes an increased frequency of about 6.78 MHz (+/−15 kHz).

Additionally, there exists a third standard developed by the Power Matters Alliance (PMA) that operates in the frequency range of about 100 kHz to about 350 kHz. Unlike prior art multi-band antennas, the multi-band single structure antenna of the present disclosure is capable of receiving and/or transmitting signals and/or electrical energy across all of these standards with one antenna. Currently, the Alliance for Wireless Power and the Power Matters Alliance have merged to form the AirFuel Consortium. The AirFuel Consortium has a resonant specification (based on Rezence from A4WP) and an inductive specification (based on PMA).

Currently, these standards are the preeminent standards for wireless power technology in consumer electronics. Although these standards are relatively new to the market, the surge in development of small portable wireless devices and the proliferation of wireless transmission solutions into other wireless applications increases the need for, and adoption of, these standards. The Qi interface standard, released in 2010, has already been widely adopted. The Qi interface standard is currently incorporated into more than 20 million products world-wide.

Product manufacturers across industries that include wireless power technology may decide to conform to one or more wireless power standards or may decide to develop a proprietary system that does not conform to a standard. Furthermore, a proprietary wireless power system solution may be developed that conforms to one or more wireless power standards. The need to develop multimode solutions is a result of the need to be able to provide interoperability with standards-certified devices.

Antennas are a key building block in the construction of wireless power and/or data transmission systems. As wireless technologies have developed, antennas have advanced from a simple wire dipole to more complex structures. Multi-mode antennas have been designed to take advantage of different wireless interface standards. For example, Qi inductive wireless charging was first demonstrated in an Android smartphone more than four years ago. In 2015, the Samsung® Galaxy S6® supported two wireless charging standards, namely the PMA and WPC Qi. This solution, however, addresses inductive interface standards only. Given the differences in, for example, performance efficiencies, size, transfer range, and positioning freedom between inductive transmission versus resonance-based transmission, what is needed is a single antenna solution that works with all types of wireless charging standards, including, but not limited to, the PMA standard, WPC's Qi standard and A4WP's Rezence standard. In some scenarios, the solution may utilize a proprietary (not standards based) system while still offering interoperability with one or more standards.

Moreover, some wireless transmission applications utilize a combination of standards-based and/or non-standards-based transfer protocols. The multi-band antenna of the present disclosure is capable of receiving and/or transmitting signals and/or electrical energy across any combination of standards-based and/or non-standards-based transfer protocols with one antenna system solution.

In particular, one of the challenges faced by high power wireless power links (~8 W to about 15 W; in some cases going as high as 40 W) using Near Field Magnetic Coupling (NFMC) is achieving a uniform charging rate over a surface area. For example, it is relatively straightforward to design a receiver antenna that, when packaged in a smartphone or other electronic device, can charge wirelessly at 8 W to 15 W when placed at a specific position with minimal x-, y- and z-movement. In other words, a transmitter-receiver topology in which the mutual inductance (or coupling) does not vary significantly as specified. Prior art antennas and systems generally provide negligible spatial flexibility for the placement of the device being charged.

A sufficient amount of power is thus required to be delivered to provide sufficient power to charge or electrically operate a device while still providing spatial flexibility. Technically, from the receiver antenna perspective, this necessitates the design of an antenna that results in a relatively small variation in mutual inductance (or coupling) when placed at different locations with respect to a transmitter antenna. This is a significant challenge for wireless power systems since electronic devices are typically positioned at different locations and orientations than the specifically designed-for position. This challenge is further accentuated by the fact that larger transmitter antennas typically have lower field uniformity at the charging distance. For example, when positioned at a longitudinal and/or lateral (x-y) position other than the ideal position, the charge rate may significantly change. The change could be in the form of a significant drop off in charge rate or, at the other extreme, a halt in charge rate because of the possibility of electronics damage (discussed later in this document).

Furthermore, certain wireless communication interface and/or protocol modes may require a degree of positional flexibility, i.e., x-y positional flexibility to communicate and/or charge an electronic device. In other words, to achieve efficient electrical charge, an electronic device may be required to be specifically positioned at various locations relative to an antenna. For example, standards developed by the Wireless Power Consortium (WPC) and the Power Matters Alliance (PMA) generally require a device to be positioned at a certain location. On the other hand, the ability of an electronic device, such as a smartphone, to be positioned at multiple locations, x, y, z, is not always achievable, hence having device positional flexibility is a key requirement for resonance based approaches like the Rezence Standard (by AirFuel). In addition, for NFMC to work successfully with acceptable operational efficiency and within certain device heating parameters, it is important to be able to realize a sufficient inductance value to generate sufficient voltage, while keeping a sufficiently low ESR (Equivalent Series Resistance). Thus, the present disclosure provides various non-limiting embodiments of antenna device and electronic circuitry design that improve uniform charge rates, enable increased device positional flexibility and, in addition, increase battery charging efficiencies within certain device heating parameters.

SUMMARY

The present disclosure provides various embodiments of an antenna that is capable of wirelessly receiving and/or transmitting electrical power and/or data between different locations. Specifically, the antenna of the present disclosure is designed to enable wireless reception or transmission of electrical power and/or data over multiple frequencies, such as the various frequencies established by the specifications of the Qi and Rezence interface standards. The antenna of the present disclosure is of a novel structure that comprises at least two inductive coils, specifically designed so that one resonates at the Qi interface standard and the other resonates at a frequency of the Rezence interface standard. In an embodiment, the multi-mode antenna of the present disclosure may comprise a composite of at least one substrate on which at least one electrically conductive filar is disposed. Alternatively, in an embodiment, the multi-mode antenna of the present disclosure may comprise a composite of at least one substrate within which at least one electrically conductive filar is disposed. At least one of the substrate layers that comprise the antenna may be composed of a different material.

The antenna of the present disclosure preferably comprises at least two spaced apart inductor coils that are positioned about a substrate. Each of the inductors is preferably composed of an electrically conductive material such as a wire, which may include, but is not limited to, a conductive trace, a filar, a filament, a wire, or combinations thereof. It is noted that throughout this specification the terms, "wire", "trace", "filament" and "filar" may be used interchangeably. As defined herein, the word "wire" is a length of electrically conductive material that may either be of a two dimensional conductive line or track that may extend along a surface or alternatively, a wire may be of a three dimensional conductive line or track that is contactable to a surface. A wire may comprise a trace, a filar, a filament, a ribbon, a dual drawn wire, a drawn filled tube, a clad wire, a woven wire, a braided wire, a mesh wire, a multifilar wire (litz-like), a multifilar twisted wire, a nano-mesh, a nano-thread, a nano-fiber or fibers, submicron threads, wires, or fibers, or combinations thereof. Further, the multitude of wires, traces, filars, and filaments may be woven, twisted or coiled together such as in a cable form. These elements may be a single element or a multitude of elements such as a multifilar element or a multifilament element. The wire as defined herein may comprise a bare metallic surface or alternatively, may comprise a layer of electrically insulating material, such as a dielectric material that contacts and surrounds the metallic surface of the wire. A "trace" is an electrically conductive line or track that may extend along a surface of a substrate. The trace may be of a two dimensional line that may extend along a surface or alternatively, the trace may be of a three dimensional conductive line that is contactable to a surface. Furthermore, a trace may be embedded within the thickness of the substrate. A "filar" is an electrically conductive line or track that extends along a surface of a substrate. A filar may be of a two dimensional line that may extend along a surface or alternatively, the filar may be a three dimensional conductive line that is contactable to a surface. Alternatively, a filar may be embedded within a substrate. A "filament" is an electrically conductive thread or threadlike structure that is contactable to a surface or may be embedded within the substrate thickness.

In an embodiment, at least one of the plurality of inductor coils is disposed on an external surface of one of the plurality of substrates. Alternatively, at least one of the plurality of inductor coils may be disposed within the thickness of at least one substrate that comprise the antenna structure. At least one via may be provided that connects at least two of the conductive materials that comprise the inductors of the antenna. In a preferred embodiment, the at least one via may be provided to create an electrical shunt connection between the coils, or portions thereof. As defined herein the term "shunt" means an electrically conductive pathway that is created by electrically joining two points of a circuit such that an electrical current or an electrical voltage may pass therethrough.

The inductor coils are strategically positioned and electrically connected to facilitate the reception and/or transmission of wirelessly transferred electrical power or data through near field magnetic induction at either, both or all frequency ranges of about 100 kHz to about 200 kHz (Qi interface standard), 100 kHz to about 350 kHz (PMA interface standard), 6.78 MHz (Rezence interface standard), or alternatively at a frequency being employed by the device in a proprietary recharging mode. In addition, the antenna of the present disclosure may be designed to receive or transmit over a wide range of frequencies on the order of about 1 kHz to about 1 GHz or greater in addition to the Qi and Rezence interfaces standards. In addition, a radio frequency (RF) antenna may be incorporated within the antenna system. For example, an RF antenna such as Bluetooth antenna may be incorporated for data transfer within the antenna or to communicate with an adjacent positioned transmitting or receiving antenna. For example, in an embodiment, a Bluetooth Low Energy (BLE) antenna may be incorporated within the antenna. The BLE antenna may be used for diagnostics communication between other antennas or devices or device detection.

The various embodiments of the antenna disclosed in the present application are designed to increase mutual inductance between the transmitting and receiving antennas. In an embodiment, some of the antennas comprise a second coil that is positioned within the space enclosed by a first coil. The embodiments of these antennas are thus designed to increase mutual inductance between the spaced apart first and second antennas such that the emanating magnetic fields are evenly captured across the area encompassed by the receiving antenna. Therefore, variations in the amplitude of energy and data between the antennas caused by orientation variations are minimized. Thus, energy and/or data are transferred efficiently and effectively when the two antennas are positioned at various orientations and locations with respect to each other.

In addition, some of the embodiments of the antenna of the present application are designed to minimize losses due to coupling to unwanted objects and surfaces that are either external or internal to the antenna system. In an embodiment, various materials may be incorporated within the structure of the antenna to prevent the magnetic fields that emanate from the coils of the antenna to couple (interact) with other undesirable objects, thus further enhancing the antenna's electrical performance. Specifically, magnetic field shielding materials, such as a ferrite material, may be positioned about the antenna structure to serve the purpose as stated above. As will be discussed in more detail, these spurious coupling effects generally increase electrical impedance within the antenna which results in a degradation of the quality factor of the antenna and the overall efficiency of the wireless power system. These spurious coupling effects also lead to undesirable heating of the antenna.

In addition, the magnetic field shielding materials may be positioned about the antenna structure to increase inductance and/or act as a heat sink within the antenna structure to minimize over-heating of the antenna. Furthermore, such materials may be utilized to modify the magnetic field profile of the antenna to increase transmission range. Modification of the magnetic field(s) exhibited by the antenna of the present disclosure may be desirable in applications such as wireless charging. For example, the profile and strength of the magnetic field exhibited by the antenna may be modified to facilitate and/or improve the efficiency of wireless power transfer between the antenna and an electric device such as a cellular phone. Thus, modifying the profile and/or strength of the magnetic field about an electronic device being charged minimizes undesirable interferences which may hinder or prevent transfer of data or an electrical charge therebetween. Furthermore, modification of the profile and/or strength of the magnetic field may also increase the separation distance between the antenna of the present invention and an electronic device receiving the transmitted electrical energy.

In one or more of the embodiments of the present disclosure, an antenna includes a substrate having a thickness that extends between proximal and distal substrate surfaces. The antenna also includes a first conductive wire forming a first coil having $N_1$ number of turns, wherein the first coil is disposed on the substrate distal surface, and a second conductive wire forming a second coil having $N_2$ number of turns, wherein the second coil is disposed on the substrate distal surface positioned within an inner perimeter formed by the first coil. The antenna includes a first control unit and a second control unit, wherein the first coil is electrically connected to the first control unit and the second coil is electrically connected to the second control unit. The antenna also includes wherein a first inductance is generatable by the first coil and a second inductance, different than the first inductance, is generatable by the second coil.

One or more of the embodiments include wherein the first conductive wire includes two or more filars electrically connected in parallel. One or more of the embodiments include wherein the second conductive wire include two or more filars electrically connected in parallel. One or more of the embodiments include a central control unit electrically connected to the first and second control units. One or more of the embodiments include a coil selection circuit electrically connected to at least one of the first and second coils, wherein the coil selection circuit includes an electrical filter, an electrical switch, or a combination thereof.

One or more of the embodiments include wherein $N_2$ is greater than $N_1$. One or more of the embodiments include an electromagnet, wherein the electromagnet is positioned adjacent the first or second coils. One or more of the embodiments include wherein the first conductive wire cross a portion of the first coil. One or more of the embodiments include wherein a plurality of first vias are positioned along a right side of a first portion of the first conductive wire and a plurality of second vias are positioned along a left side of the first portion of the first conductive wire, wherein the respective opposing first and second vias are electrically connected to a second portion of the first conductive wire, wherein the second portion of the first conductive wire is disposed above or below the first portion of the first conductive wire, thereby establishing a conductive electrical path therebetween that bypasses the first portion of the first conductive wire. One or more of the embodiments include wherein at least the first conductive wire or the second conductive wire has a variable wire width. One or more of the embodiments include wherein the first and second coils have a quality factor greater than 10.

One or more of the embodiments include wherein an electrical signal selected from the group consisting of a data signal, an electrical voltage, an electrical current, and combinations thereof is receivable by at least one of the first and second coils. One or more of the embodiments include wherein an electrical signal selected from the group consisting of a data signal, an electrical voltage, an electrical current, and combinations thereof is transmittable by at least one of the first and second coils. One or more of the embodiments include wherein the substrate includes a material composed of an electrically insulative material selected from the group consisting of a polyimide, an acrylic, fiberglass, polyester, polyether imide, polytetrafluoroethylene, polyethylene, polyetheretherketone (PEEK), polyethylene napthalate, fluoropolymers, copolymers, a ceramic material, a ferrite material, and combinations thereof. One or more of the embodiments include wherein the antenna is capable of receiving or transmitting within a frequency band selected from the group consisting of about 100 kHz to about 250 kHz, about 250 kHz to about 500 kHz, 6.78 MHz, 13.56 MHz, and combinations thereof. One or more of the embodiments include wherein the antenna is capable of receiving or transmitting at frequencies of at least 100 kHz. One or more of the embodiments include wherein a first ferrite material is positioned spaced apart from the first coil. One or more of the embodiments include wherein the first ferrite material includes manganese-zinc, nickel-zinc, copper-zinc, magnesium-zinc, and combinations thereof. One or more of the embodiments include wherein a second ferrite material, different than the first ferrite material is positioned spaced apart from the second coil. One or more of the embodiments include wherein the second ferrite material includes manganese-zinc, nickel-zinc, copper-zinc, magnesium-zinc, and combinations thereof.

In one or more of the embodiments of the present disclosure, an antenna includes a substrate having a thickness that extends between proximal and distal substrate surfaces. The antenna also includes a first conductive wire forming a first coil having $N_1$ number of turns, the first coil disposed within the substrate thickness. The antenna includes a second conductive wire forming a second coil having $N_2$ number of turns, the second coil disposed within the substrate thickness and positioned within an inner perimeter formed by the first coil. The antenna includes a first control unit and a second control unit, wherein the first coil is electrically connected to the first control unit and the second coil is electrically connected to the second control unit. The antenna also includes wherein a first inductance is generatable by the first coil and a second inductance, different than the first inductance, is generatable by the second coil.

One or more of the embodiments include wherein the first conductive wire includes two or more filars electrically connected in parallel. One or more of the embodiments include wherein the second conductive wire includes two or more filars electrically connected in parallel. One or more of the embodiments include a central control unit electrically connected to the first and second control units. One or more of the embodiments include a coil selection circuit electrically connected to at least one of the first and second coils, wherein the coil selection circuit includes an electrical filter, an electrical switch, or a combination thereof. One or more embodiments include wherein the first conductive wire cross a portion of the first coil.

One or more of the embodiments include wherein $N_2$ is greater than $N_1$. One or more of the embodiments include an electromagnet, wherein the electromagnet is spaced apart from the first or the second coils. One or more of the embodiments include wherein the first coil includes at least two first coil layers disposed within the substrate thickness, and wherein at least one via electrically connects at least two of the first coil layers. One or more of the embodiments include wherein at least the first conductive wire or the second conductive wire has a variable wire width. One or more of the embodiments include wherein the first and second coils have a quality factor greater than 10.

One or more of the embodiments include wherein an electrical signal selected from the group consisting of a data signal, an electrical voltage, an electrical current, and combinations thereof is receivable by at least one of the first and second coils. One or more of the embodiments include wherein an electrical signal selected from the group consisting of a data signal, an electrical voltage, an electrical current, and combinations thereof is transmittable by at least one of the first and second coils. One or more of the embodiments include wherein the substrate includes a material composed of an electrically insulative material selected from the group consisting of a polyimide, an acrylic, fiberglass, polyester, polyether imide, polytetrafluoroethylene, polyethylene, polyetheretherketone (PEEK), polyethylene napthalate, fluoropolymers, copolymers, a ceramic material, a ferrite material, and combinations thereof One or more of the embodiments include wherein the antenna is capable of receiving or transmitting within a frequency band selected from the group consisting of about 100 kHz to about 250 kHz, about 250 kHz to about 500 kHz, 6.78 MHz, 13.56 MHz, and combinations thereof. One or more of the embodiments include wherein the antenna is capable of receiving or transmitting at frequencies of at least 100 kHz. One or more of the embodiments include wherein a first ferrite material is positioned spaced apart from the first coil. One or more of the embodiments include wherein the first ferrite material includes manganese-zinc, nickel-zinc, copper-zinc, magnesium-zinc, and combinations thereof. One or more of the embodiments include wherein a second ferrite material, different than the first ferrite material is positioned spaced apart from the second coil. One or more of the embodiments include wherein the second ferrite material includes manganese-zinc, nickel-zinc, copper-zinc, magnesium-zinc, and combinations thereof.

In one or more of the embodiments of the present disclosure, an antenna includes a substrate having a thickness that extends between proximal and distal substrate surfaces, wherein a cavity extends through the substrate distal surface and part way through the substrate thickness. The antenna also includes a first conductive wire forming a first coil having $N_1$ number of turns, wherein the first coil is disposed on the substrate distal surface. The antenna includes a second conductive wire forming a second coil having $N_2$ number of turns, wherein the second coil is disposed within the substrate cavity and within an inner perimeter formed by the first coil. The antenna includes a first control unit and a second control unit, wherein the first coil is electrically connected to the first control unit and the second coil is electrically connected to the second control unit. The antenna also includes wherein a first inductance is generatable by the first coil and a second inductance, different than the first inductance, is generatable by the second coil.

One or more of the embodiments include wherein the first conductive wire includes two or more filars electrically connected in parallel. One or more of the embodiments include wherein the second conductive wire includes two or more filars electrically connected in parallel. One or more of the embodiments include a central control unit electrically connected to the first and second control units. One or more of the embodiments include a coil selection circuit electrically connected to at least one of the first and second coils, wherein the coil selection circuit includes an electrical filter, an electrical switch, or a combination thereof. One or more embodiments include wherein the first conductive wire cross a portion of the first coil. One or more embodiments include wherein the first conductive wire crosses a portion of the first coil.

One or more of the embodiments include wherein a plurality of first vias are positioned along a right side of a first portion of the first conductive wire and a plurality of second vias are positioned along a left side of the first portion of the first conductive wire, wherein the respective opposing first and second vias are electrically connected to a second portion of the first conductive wire, wherein the second portion of the first conductive wire is disposed above or below the first portion of the first conductive wire, thereby establishing a conductive electrical path therebetween that bypasses the first portion of the first conductive wire. One or more of the embodiments include wherein $N_2$ is greater than $N_1$. One or more of the embodiments include an electromagnet, wherein the electromagnet is spaced apart from the first or the second coils. One or more of the embodiments include wherein at least the first conductive wire or the second conductive wire has a variable wire width. One or more of the embodiments include wherein the first and second coils have a quality factor greater than 10.

One or more of the embodiments include wherein an electrical signal selected from the group consisting of a data signal, an electrical voltage, an electrical current, and combinations thereof is receivable by at least one of the first and second coils. One or more of the embodiments include wherein an electrical signal selected from the group consisting of a data signal, an electrical voltage, an electrical current, and combinations thereof is transmittable by at least one of the first and second coils. One or more of the embodiments include wherein the substrate includes a material composed of an electrically insulative material selected from the group consisting of a polyimide, an acrylic, fiberglass, polyester, polyether imide, polytetrafluoroethylene, polyethylene, polyetheretherketone (PEEK), polyethylene napthalate, fluoropolymers, copolymers, a ceramic material, a ferrite material, and combinations thereof. One or more of the embodiments include wherein the antenna is capable of receiving or transmitting within a frequency band selected from the group consisting of about 100 kHz to about 250 kHz, about 250 kHz to about 500 kHz, 6.78 MHz, 13.56 MHz, and combinations thereof. One or more of the embodiments include wherein the antenna is capable of receiving or transmitting at frequencies of at least 100 kHz. One or more of the embodiments include wherein a first ferrite material is positioned spaced apart from the first coil. One or more of the embodiments include wherein the first ferrite material includes manganese-zinc, nickel-zinc, copper-zinc, magnesium-zinc, and combinations thereof. One or more of the embodiments include wherein a second ferrite material, different than the first ferrite material is positioned spaced apart from the second coil. One or more of the embodiments include wherein the second ferrite material includes manganese-zinc, nickel-zinc, copper-zinc, magnesium-zinc, and combinations thereof.

In one or more of the embodiments of the present disclosure, an antenna includes a substrate having a thickness that extends between proximal and distal substrate surfaces. The antenna also includes a first coil disposed within the substrate thickness capable of resonating at a first operating frequency, wherein the first coil includes a plurality of first coil layers, each layer of the plurality of layers includes a first conductor layer and a second conductor layer, a first insulator positioned between the first and second first conductor layers, wherein each layer in the plurality of first coil layers has at least one turn and wherein at least the first and second conductor layers are electrically connected. The antenna includes a second coil disposed within the substrate thickness capable of resonating at a second operating frequency, wherein the second coil includes a plurality of second coil layers, each layer of the plurality of second coil layers includes a third conductor layer and a fourth conductor layer, a second insulator positioned between the third and fourth conductor layers, wherein each layer in the plurality of second coil layers has at least one turn wherein at least the third and fourth conductor layers are electrically connected. The antenna includes a first control unit and a second control unit, wherein the first coil is electrically connected to the first control unit and the second coil is electrically connected to the second control unit.

One or more of the embodiments include wherein the second coil is positioned within an inner perimeter formed by the first coil. One or more of the embodiments include a plurality of second coils forming a second coil array, wherein each of the plurality of second coils is electrically connected to the second control unit. One or more of the embodiments include wherein the first conductive layers are electrically connected in parallel. One or more of the embodiments include wherein the second conductive layers are electrically connected in parallel. One or more of the embodiments include a central control unit electrically connected to the first and second control units. One or more of the embodiments include a coil selection circuit electrically connected to at least one of the first and second coils, wherein the coil selection circuit includes an electrical filter, an electrical switch, or a combination thereof. One or more of the embodiments include wherein a first via electrically connects at least two of the first coil layers and a second via electrically connects at least two of the second coil layers. One or more of the embodiments include wherein the second coil has a greater number of turns than the first coil. One or more of the embodiments include an electromagnet positioned spaced apart from the first or the second coil.

One or more of the embodiments include wherein at least the first conductive layer or the second conductive layer has a variable layer width. One or more of the embodiments include wherein the first and the second coils have a quality factor greater than 10. One or more of the embodiments include wherein an electrical signal selected from the group consisting of a data signal, an electrical voltage, an electrical current, and combinations thereof is receivable by at least one of the first and second coils. One or more of the embodiments include wherein an electrical signal selected from the group consisting of a data signal, an electrical voltage, an electrical current, and combinations thereof is transmittable by at least one of the first and second coils. One or more of the embodiments include wherein the substrate includes material composed of an electrically insulative material selected from the group consisting of a polyimide, an acrylic, fiberglass, polyester, polyether imide, polytetrafluoroethylene, polyethylene, polyetheretherketone (PEEK), polyethylene napthalate, fluoropolymers, copolymers, a ceramic material, and combinations thereof. One or more of the embodiments include wherein the first or second insulator includes a material composed of an electrically insulative material selected from the group consisting of polystyrene, silicon dioxide, a ceramic material, a dielectric material and combinations thereof. One or more of the embodiments include wherein the antenna is capable of receiving or transmitting within a frequency band selected from the group consisting of about 100 kHz to about 250 kHz, about 250 kHz to about 500 kHz, 6.78 MHz, 13.56 MHz, and combinations thereof. One or more of the embodiments include wherein the antenna is capable of receiving or transmitting at frequencies of at least 100 kHz. One or more of the embodiments include wherein a first ferrite material is positioned spaced apart from the first coil. One or more of the embodiments include wherein a second ferrite material, different from the first ferrite material is positioned spaced apart from the second coil.

In one or more of the embodiments of the present disclosure, a method of manufacturing an antenna. The method of manufacturing the antenna includes providing a substrate having a thickness that extends between proximal and distal substrate surfaces. The method further includes forming a first coil with a first conductive wire having $N_1$ number of turns, wherein the first coil is disposed on the substrate distal surface, and wherein a first inductance is generatable by the first coil. The method also includes forming a second coil with a second conductive wire having $N_2$ number of turns, wherein the second coil is disposed on the substrate distal surface, and wherein a second inductance is generatable by the second coil. The method further includes providing a first control unit and a second control unit. The method also includes electrically connecting the first control unit and the second coil, and electrically connecting the second coil to the second control unit.

One or more of the embodiments include wherein the first conductive wire includes two or more filars electrically connected in parallel. One or more of the embodiments include wherein the second conductive wire includes two or more filars electrically connected in parallel. One or more of the embodiments include providing a central control unit electrically connected to the first and second control units. One or more of the embodiments include providing a coil selection circuit electrically connected to at least one of the first and second coils, wherein the coil selection circuit includes an electrical filter, an electrical switch, or a combination thereof. One or more of the embodiments include wherein $N_2$ is greater than $N_1$. One or more of the embodiments include providing an electromagnet, wherein the electromagnet is positioned spaced apart from the first or second coils. One or more of the embodiments include forming the first conductive wire crossing over a portion of the first coil. One or more of the embodiments include forming a plurality of first vias positioned along a right side of a first portion of the first conductive wire and a plurality of second vias positioned along a left side of the first portion of the first conductive wire, wherein the respective opposing first and second vias are electrically connected to a second portion of the first conductive wire, and wherein the second portion of the first conductive wire is disposed above or below the first portion of the first conductive wire, thereby establishing a conductive electrical path therebetween that bypasses the first portion of the first conductive wire. One or more of the embodiments include forming at least one of the first conductive wire and the second conductive wire with a variable wire width.

One or more of the embodiments include providing the first and second coils having a quality factor greater than 10. One or more of the embodiments include wherein an electrical signal selected from the group consisting of a data signal, an electrical voltage, an electrical current, and combinations thereof is receivable by at least one of the first and second coils. One or more of the embodiments include forming the first coil using a process technique selected from the group consisting of a printed circuit board (PCB) processing technique, a flex circuit processing technique, a physical vapor deposition processing technique, a thin film processing technique, and a thick film processing technique. One or more of the embodiments include forming the substrate from a material composed of an electrically insulative material selected from the group consisting of a polyimide, an acrylic, fiberglass, polyester, polyether imide, polytetrafluoroethylene, polyethylene, polyetheretherketone (PEEK), polyethylene napthalate, fluoropolymers, copolymers, a ceramic material, a ferrite material, and combinations thereof. One or more of the embodiments include forming the second coil using a process technique selected from the group consisting of a printed circuit board (PCB) processing technique, a flex circuit processing technique, a physical vapor deposition processing technique, a thin film processing technique, and a thick film processing technique. One or more of the embodiments include providing a first ferrite material, and positioning the first ferrite material spaced apart from the first coil. One or more of the embodiments include wherein the second ferrite material includes manganese-zinc, nickel-zinc, copper-zinc, magnesium-zinc, and combinations thereof. One or more of the embodiments include providing a second ferrite material, different than the first ferrite material, and positioning the second ferrite material spaced apart from the second coil. One or more of the embodiments include wherein the second ferrite material includes manganese-zinc, nickel-zinc, copper-zinc, magnesium-zinc, and combinations thereof.

Thus, the antenna of the present disclosure is of an efficient design that is capable of operating over multiple frequencies having an optimized inductance, quality factor, and mutual inductance that comprises at least two inductor coils. In addition, the antenna of the present disclosure may be tuned to a multitude of frequencies to facilitate optimized wireless transfer of electrical energy and/or data.

DETAILED DESCRIPTION

Figure 1:
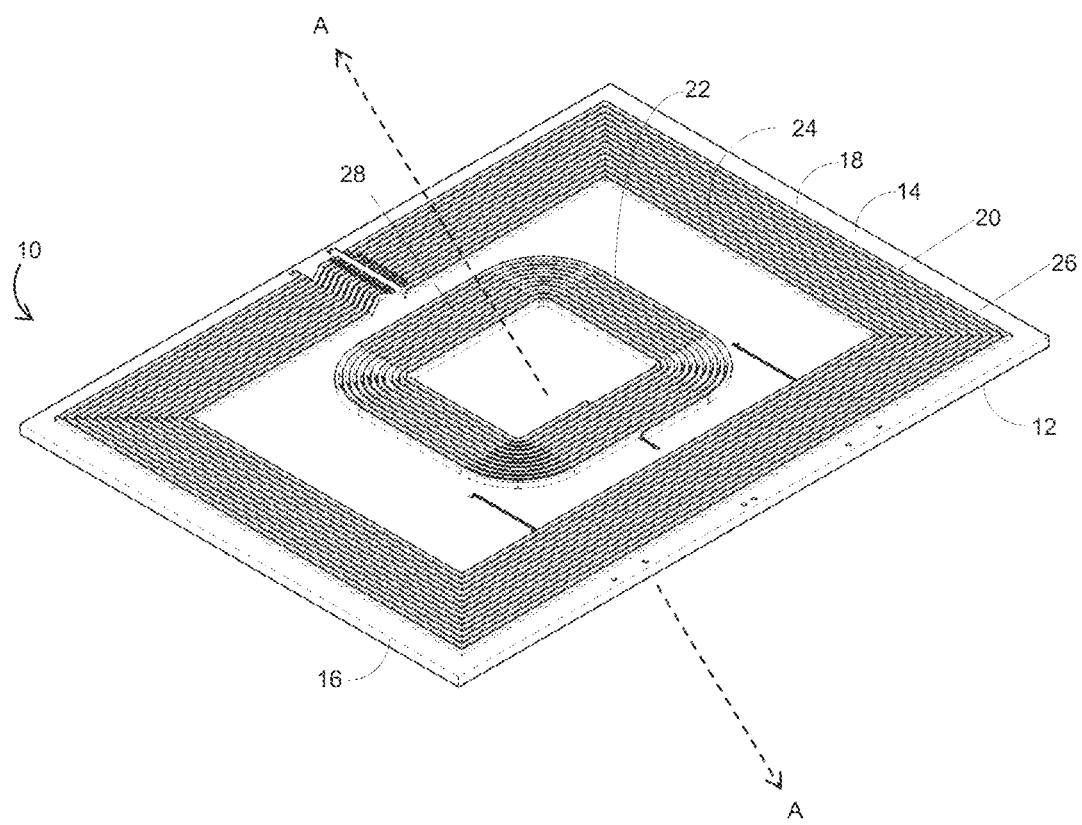
FIG. 1 is a perspective view of an embodiment of an antenna of the present application.

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The multi-mode antenna of the present disclosure enables increased transmission range. As will be discussed in more detail, the structure of the antenna of the present disclosure is less susceptible to changes in the antenna inductance due to interaction of the magnetic fields emanating from the inductive coils with proximally positioned magnetic and/or dielectric materials. Such materials may affect the path and/or magnitude of the electrical or magnetic fields that are generated by the coils of the antenna that facilitate near field coupling. These materials that adversely interfere with the transmission of energy may be located exterior, such as from a nearby electronic device. Alternatively, these materials that interfere with the near field coupling may reside within the antenna structure, such as the antenna control unit or circuit board. As a result of these interferences, the shape and magnitude of the magnetic field that emanates from a respective antenna coil may become "de-tuned" from its ideal operating frequency. Thus, as a result, loss of electrical energy or data during wireless transmission and/or a loss of transmission distance between transmitting and receiving antennas occurs.

The antenna of the present disclosure may comprise a plurality of materials such as various magnetic, e.g. ferrite materials. Such materials are strategically positioned within the overall antenna structure to either block or shield selected parts, such as the antenna coils within the antenna, from undesirable interaction with conductive materials, i.e., circuit boards that are positioned within the antenna. In addition, such shielding materials can be positioned to enhance the transmission or reception of wireless energy or data.

Furthermore, the antenna of the present application may comprise a circuit which is capable of selecting between specific inductive coils of the antenna to minimize undesirable interference between other adjacently positioned coils within the antenna. An example includes modifying the impedance at a certain frequency, $f_o$ of select coils to minimize parasitic current flow at that frequency, $f_o$, through an adjacent coil. Such parasitic current may reduce the mutual inductance of the antenna. In addition, such parasitic current flow may de-tune the antenna, thereby resulting in reduced efficiency and power capability. The aforementioned circuit that provides a relatively high electrical impedance at a frequency, $f_o$, can be implemented in several ways. For example, the electrical impedance of a coil could be increased via a switch. The electrical impedance of the coil may also be implemented using a filter that provides a high impedance to the undesired signals of the frequency, $f_o$. This filter embodiment may be implemented as a low-pass, band-pass or a high pass filter.

In addition, the antenna of the present disclosure enables increased operating frequencies. Operating at a higher frequency range provides for smaller antenna form factors. For example, consider a generic transmitting and receiving antenna combination, both operating at a frequency ($\omega$) that are spaced a distance d apart and have a coupling factor k. The transmitting antenna has a transmitting antenna inductance ($L_{Tx}$) and the receiving antenna has a receiving antenna inductance ($L_{Rx}$). In this scenario, the induced voltage at the receiving antenna is given by the formula:

$$V_{induced} \sim \omega k \sqrt{L_{TX} L_{RX}}$$

Based on the equation above, if the frequency of operation ($\omega$) is increased, the respective transmitting and receiving antenna inductances required to produce a similar induced voltage is reduced, given a similar coupling factor k. Thus, as a result, smaller inductors that require less space can be utilized for the respective antennas. For example, if the form factor, i.e., surface area of the coils, is kept nearly identical having a similar coupling coefficient, a thinner receiver coil or transmitter coil may be possible by designing for a reduced receiving or transmitting inductance because of the increased operating frequency ($\omega$).

Furthermore, the amplitude of the electrical energy, such as a voltage ($V_{induced}$) that is induced between a transmitting and receiving antenna is further governed by the magnitude of the mutual inductance between a transmitting and receiving antenna. As defined herein "mutual inductance" is the production of an electromotive force in a circuit by a change in current in a second circuit magnetically coupled to the first. In near field magnetic coupling, electrical energy and/or data is transmitted wirelessly between a transmitting and receiving antenna by the interaction of the magnetic fields that are emitted by the opposing antennas. Increasing the mutual inductance between the respective antennas increases the magnitude of the voltage that is transmitted between the two antennas. Furthermore, increasing the mutual inductance minimizes the effects of an improper alignment between the two antennas.

The embodiments of the antennas of the present disclosure enable increased mutual inductance. Operating at a higher mutual inductance provides for more efficient transfer of electrical energy between two misaligned antennas. For example, consider a generic transmitting and receiving antenna combination both operating at a frequency ($\omega$) that are spaced a distance d apart and have a mutual inductance M. The transmitting antenna has a transmitting antenna current ($I_{Tx}$). In this scenario, the induced voltage at the receiving antenna is given by the formula:

$$V_{induced} \sim \omega M I_{TX}$$

Based on the equation above, if the frequency of operation (w) is increased, the respective transmitting and receiving antenna inductances required to produce a similar induced voltage is reduced, given a similar coupling factor k. Thus, as a result, smaller inductors that require less space can be utilized for the respective antennas. For example, if the form factor, i.e., surface area of the coils, is kept nearly identical having a similar coupling coefficient, a thinner receiver coil or transmitter coil may be possible by designing for a reduced receiving or transmitting inductance because of the increased operating frequency (w).

In contrast to the prior art antennas, the multi-mode antenna of the present disclosure provides an efficient design that enables the reception and transmission of a multitude of a non-limiting range of frequencies which includes the frequency specification of the Qi and Rezence interface standards, in addition to many other wireless electrical power transfer standards. In addition, the multi-mode antenna of the present disclosure may enable multiple communication based standards such as, but not limited to, near field communication (NFC), and radio frequency identification (RFID, in addition to a host of frequency standards that operate at frequencies greater than about 400 MHz. The physical mechanism of these multiple "power" transfer and/or "communications" modes may be purely magnetic, such as via magnetic fields, electromagnetic, such as via electromagnetic waves, electrical, such as via capacitive interactions or piezoelectric action. Piezoelectric power transfer and/or communication modes would generally require a unique piezoelectric material such as barium titanate, lead zirconate titanate, or potassium niobate that is able to transduce acoustic signals to electrical signals and vice versa.

Specifically, the multi-mode antenna of the present disclosure facilitates either or both the transmission and reception of wirelessly transmitted electrical power and/or data. The unique design and construction of the antenna of the present disclosure, provides an antenna having optimized electrical performance in a reduced form factor.

Figure 2:
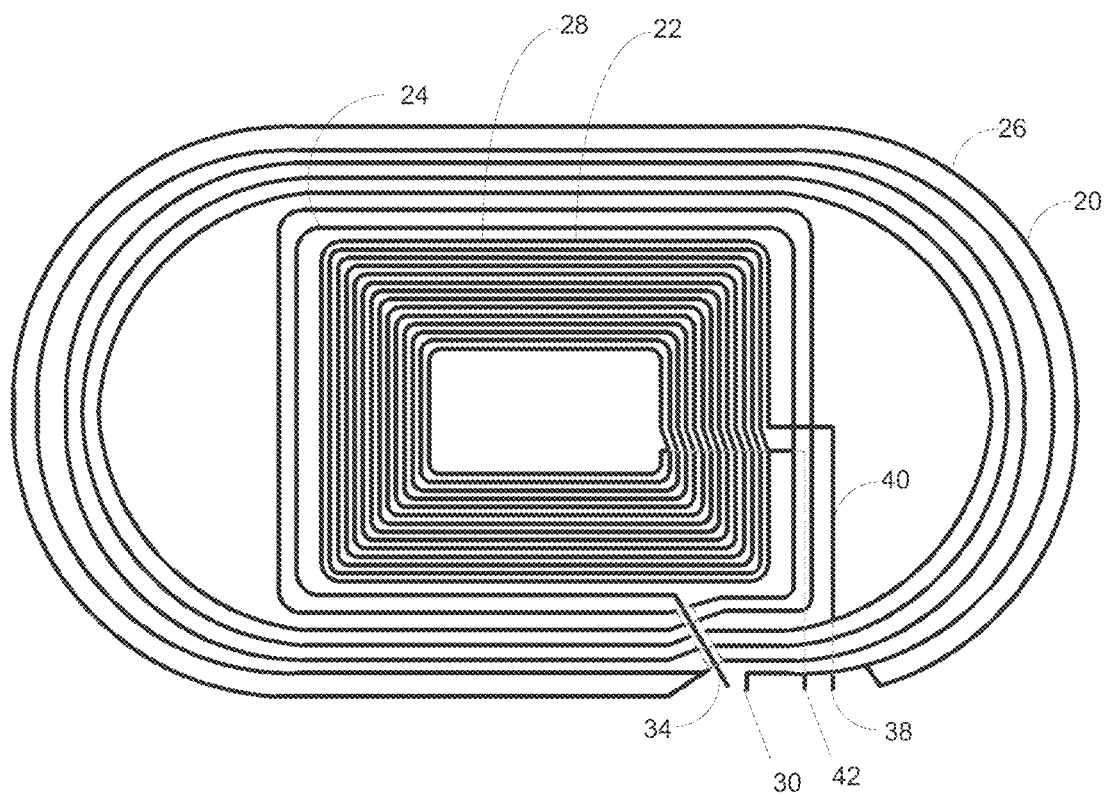
FIG. 2 is a top view of an embodiment of a conductive trace comprising a first and second coil.
Figure 3:
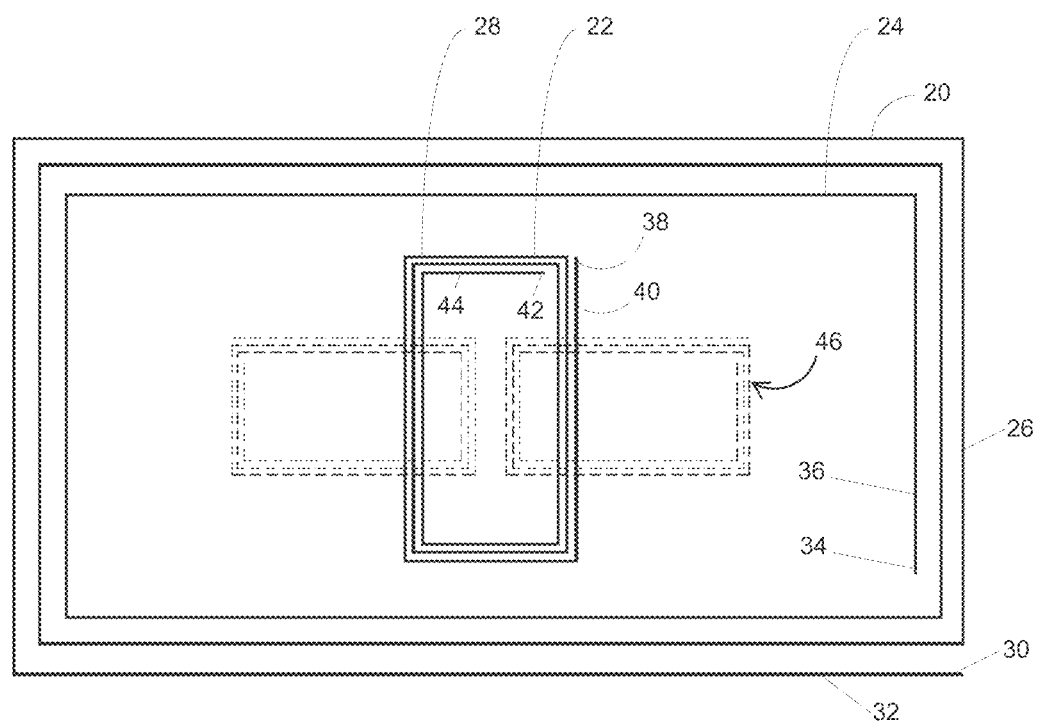
FIG. 3 is a top view of an embodiment of a conductive trace comprising a first and second coil.

In addition, the antenna of the present disclosure may also comprise a plurality of materials, such as various ferrite materials, to reduce the interaction of the fields generated by an adjacent antenna that comprises magnetic, dielectric, or other conductive materials that may interfere with the operation of the antenna and transmission of energy. Turning now to the drawings, FIG. 1 illustrates an embodiment of a multi-mode antenna 10 of the present disclosure. As shown, the multimode antenna 10 extends from a proximal end 12 to a distal end 14 along longitudinal axis A-A. An antenna thickness 16 extends between the antenna proximal end 12 and the antenna distal end 14. In the embodiment shown in FIG. 1, the antenna 10 comprises a substrate 18 on which at least a first coil 20 and a second coil 22 is positioned. Alternatively, the at least one first and second coils 20, 22 may be positioned within the thickness of the substrate 18 (FIG. 3). As shown in FIGS. 1-3, the second coil 22 is positioned within a perimeter 24 formed by the first coil 20.

In an embodiment, the substrate 18 may be of a flexible form, capable of bending and mechanical flexure. The substrate 18 is preferably composed of an electrically insulating material. Examples of such insulative materials may include but are not limited to, paper, a polymeric material such as polyimide, acrylic or Kapton, fiberglass, polyester, polyether imide, polytetrafluoroethylene, polyethylene, polyetheretherketone (PEEK), polyethylene napthalate, fluoropolymers, copolymers, a ceramic material such as alumina, composites thereof, and a combination thereof. In some situations (e.g. when the antenna is constructed using insulated wire, such as magnet wire/litz wire or stamped metal), the substrate may be a shielding material.

The outer first coil 20 comprises a first electrically conductive material 26 such as a trace or filar which is positioned in a curved orientation with respect to the longitudinal axis A-A. In an embodiment, as illustrated in FIGS. 1 and 3, the trace or filar 26 is positioned in a spiral or serpentine orientation with respect to the exterior surface of the substrate 18 having "$N_1$" number of turns. The interior second coil 22 comprises a second electrically conductive material 28 such as a trace or filar positioned in a curved orientation with respect to the exterior surface of the substrate 18. In a preferred embodiment, the second trace or filar 28 is positioned in a spiral or serpentine orientation with respect to the substrate 18 having "$N_2$" number of turns.

In the embodiment shown in FIGS. 1, 2 and 3, the interior second coil 22 is positioned within the inner perimeter 24 formed by the outer first coil 20. As defined herein, a "turn" is a single complete circumferential revolution of the electrically conductive filar with respect to the longitudinal axis A-A. As illustrated in the example antenna shown in FIG. 2, the outer first coil 20 comprises 5 turns ($N_1$) and the interior second coil 22 comprises 16 turns ($N_2$). In a preferred embodiment, the outer first coil 20 may comprise from about 1 to as many as 500 or more "$N_1$" turns and the interior second coil 22 may comprise from about 1 to as many as 1,000 or more "$N_2$" turns. In a preferred embodiment, the number of "$N_2$" turns is greater than the number of "$N_1$" turns. In addition, it is not necessary for the first and second coils 20, 22 to be constructed having a discrete number of turns. The first and second coils 20, 22 may also be constructed having a partial turn or revolution such as a half or quarter of a complete turn.

In addition, the conductive filars 26 that form the outer first inductive coil 20 have a filar width (or diameter) that may range from about 0.01 mm to about 20 mm. In a preferred embodiment, the width of the outer inductor coil filars 26 is constant. However, the width of the outer first inductor conductive filars 26 may vary. The conductive filars 28 that form the interior second inductive coil 22 have a preferred width that ranges from about 0.01 mm to about 20 mm. The second conductive filar 28 may also be constructed having a constant or variable width. In an embodiment, the first electrically conductive filars 26 that form the outer first inductor coil 20, may have a width that is greater than the width of the second electrically conductive filars 28 that form the interior second inductor coil 22. It is contemplated that the width of the first conductive filars 26 may be about equal to or narrower than the width of the second electrically conductive filars 28 that form the interior second coil 22.

In general, the outer first inductor coil 20 contributes to the reception and/or transmission of higher frequencies in the MHz range whereas, the interior second inductor coil 22 contributes to the reception and/or transmission of frequencies in the kHz range. The increased perimeter size and typically fewer number of filar turns that comprise the outer first inductor coil 20 generally create first coil inductances in the 4.4 µH range, which, thus, provides reception and/or transmission in the MHz operating frequency range. In an embodiment, the first coil 20 is designed to resonate at the Rezence interface standard of about 6.78 MHz and the second coil 22 is designed to resonate at the Qi interface standard of about 100 kHz to about 200 kHz. The increased number of filar turns and smaller coil diameter of the interior second inductor coil 22 generally create inductances in the 10 µH range, which provides reception and/or transmission in the kHz operating frequency range.

In an embodiment, the antenna 10 of the present disclosure comprises a plurality of terminal connections that are positioned on the first and second inductor coils 20, 22 respectively. In a preferred embodiment, the first coil comprises a first terminal 30 that resides at a first coil end 32 and a second terminal 34 that resides at a first coil second end 36. In an embodiment, as shown in FIG. 3, the first coil first end 32 is positioned along the outer perimeter of the first coil 20 and the first coil second end 36 is positioned along the inner perimeter of the first coil 20 with respect to the longitudinal axis A-A. In a preferred embodiment, the second coil 22 comprises a first terminal 38 that resides at a second coil first end 40 and a second terminal 42 that resides at a second coil second end 44.

In the embodiment shown in FIG. 3, the second coil first end 40 is positioned along the outer perimeter of the second coil 22 and the second coil second end 44 is positioned along the inner perimeter of the second coil 22 with respect to the longitudinal axis A-A. Either of the first or second terminals 38, 42 of the second coil 22 may be a positive terminal, the other of the first or second terminal 38, 42 then being the negative terminal.

Figure 8:
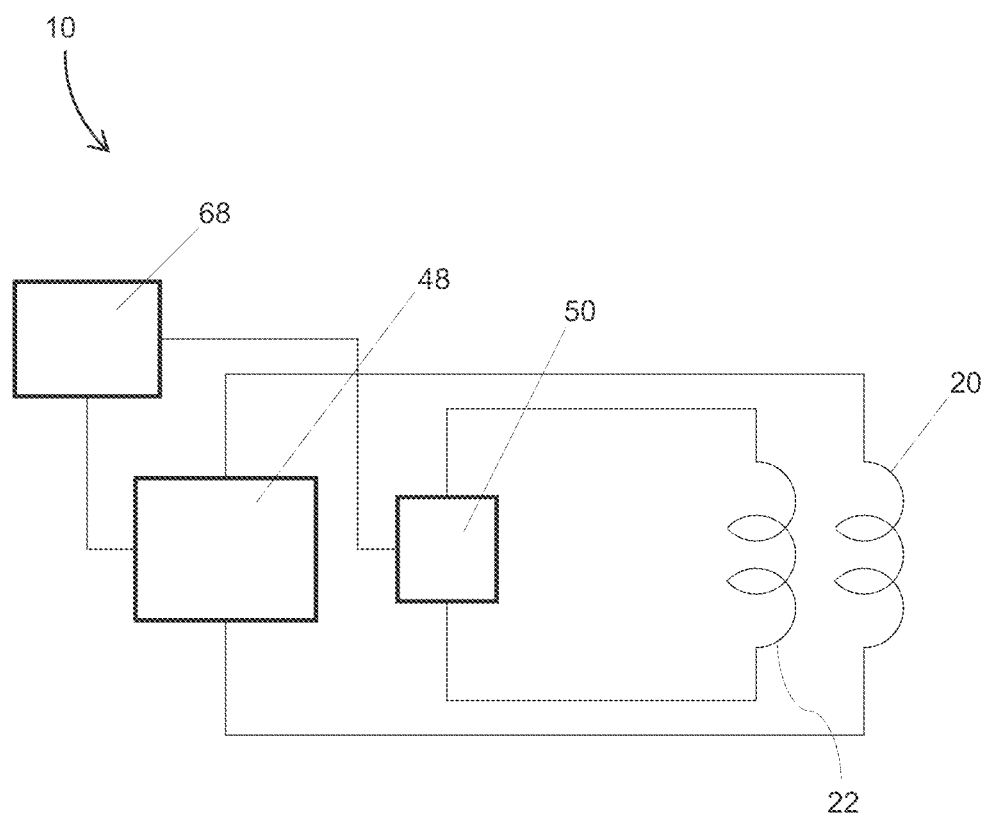
FIG. 8 is a generic schematic view of the antenna system of the present application.

As shown in FIG. 3, the antenna 10 of the present disclosure may comprise a plurality of spaced apart second coils 22. As shown, the antenna 10 comprises three spaced apart second coils 22 that form a second coil array 46. As illustrated, two of the three second coils reside within the thickness of the substrate 18. In addition, each of the three second coils 22 preferably comprises first and second terminals 38, 42. In an embodiment, the respective first and second terminal ends 30, 34 of the first coil 20 are electrically connected to a first control unit 48 (FIG. 8) and the first and second terminals 38, 42 of the second coils 22 are electrically connected to a second control unit 50 (FIG. 8). In an embodiment, the first and second control units 48, 50 comprise electrical components that mat include but are not limited to, a micro control unit (MCU), electrical drivers, capacitors, resistors and inductors. These components are preferably used to control the operation of the coils and tune the frequency of the coils.

Figure 4A:
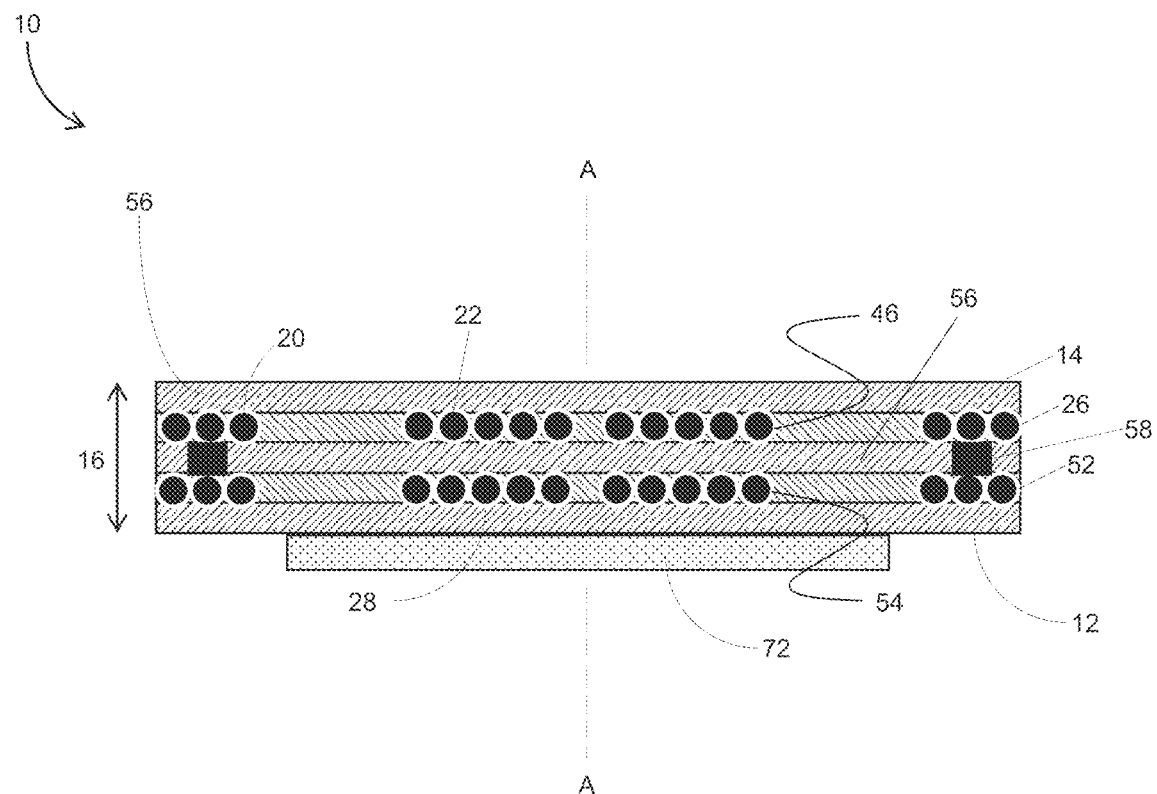
FIGS. 4A-4D are cross-sectional front views of embodiments of the first and second coils of the antenna.
Figure 4B:
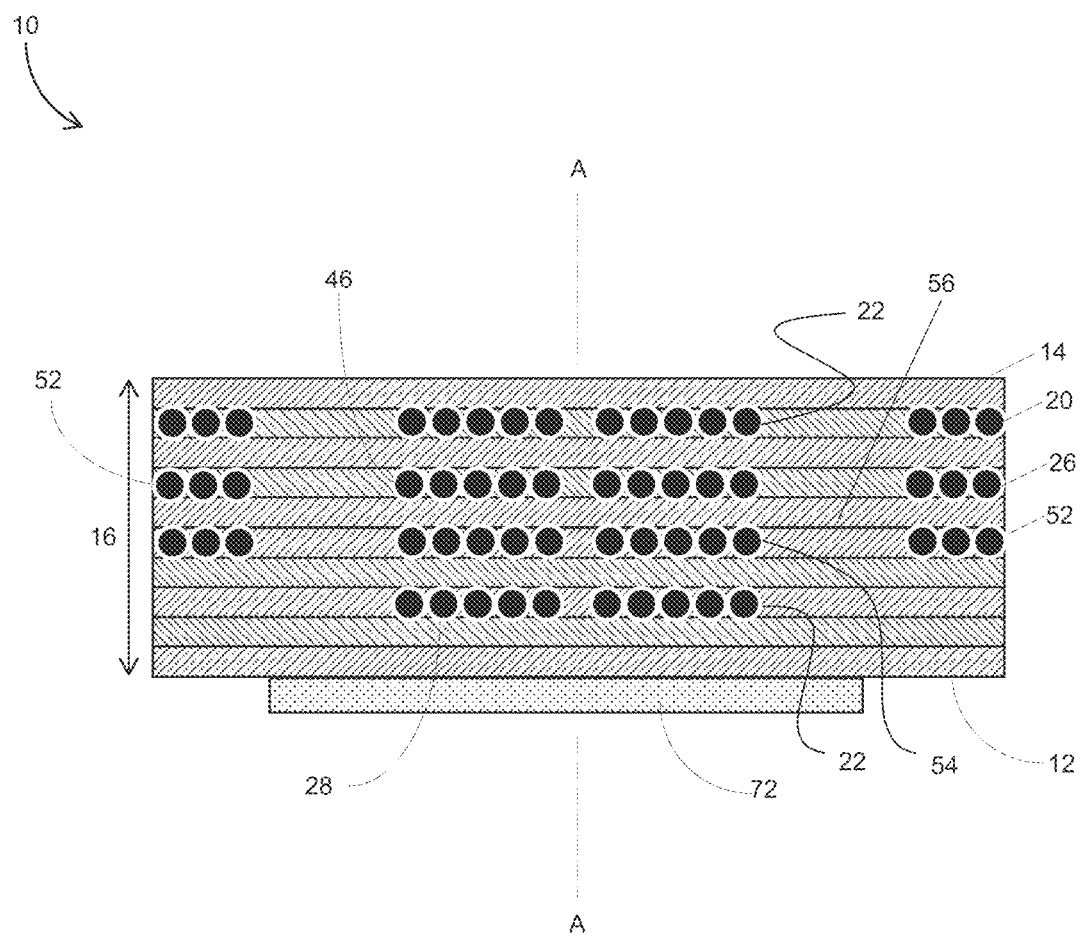
Figure 4C:
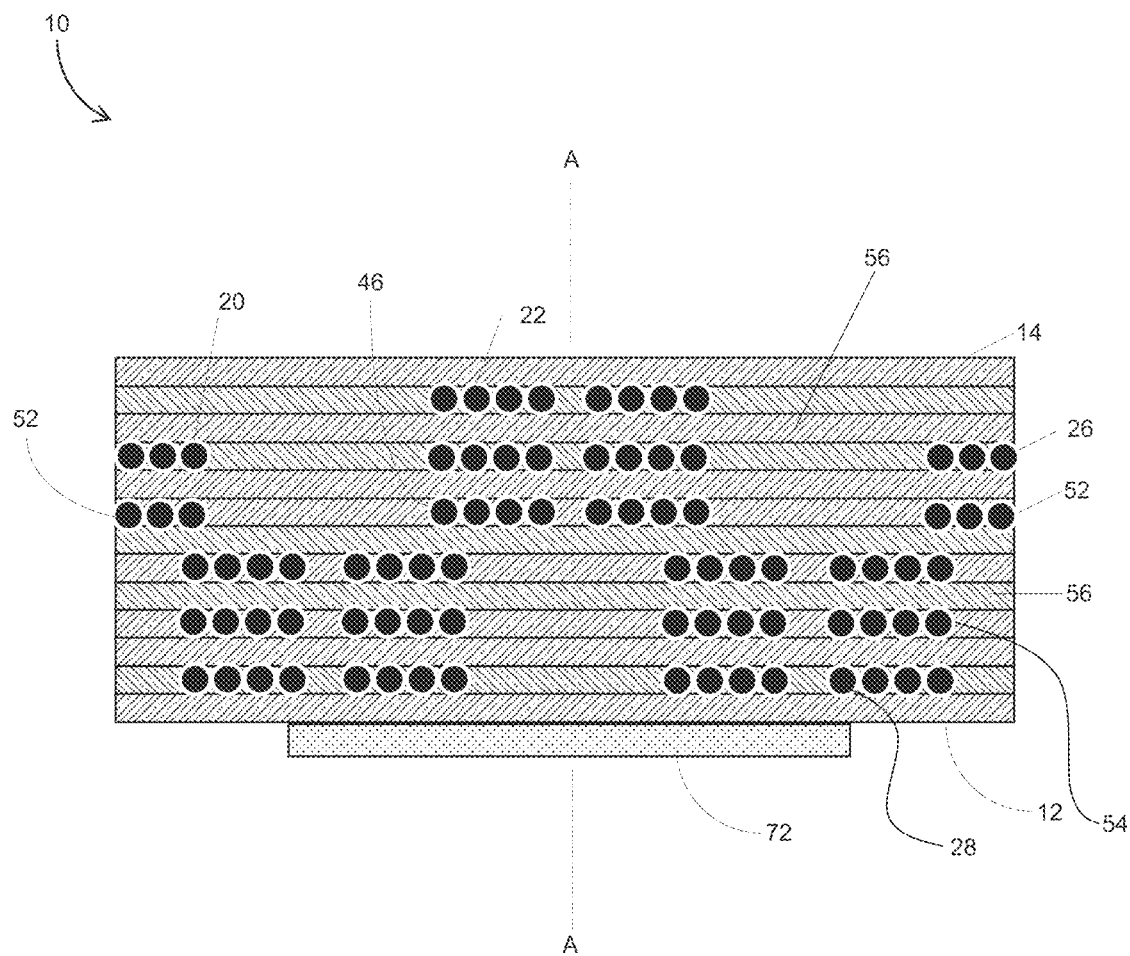
Figure 4D:
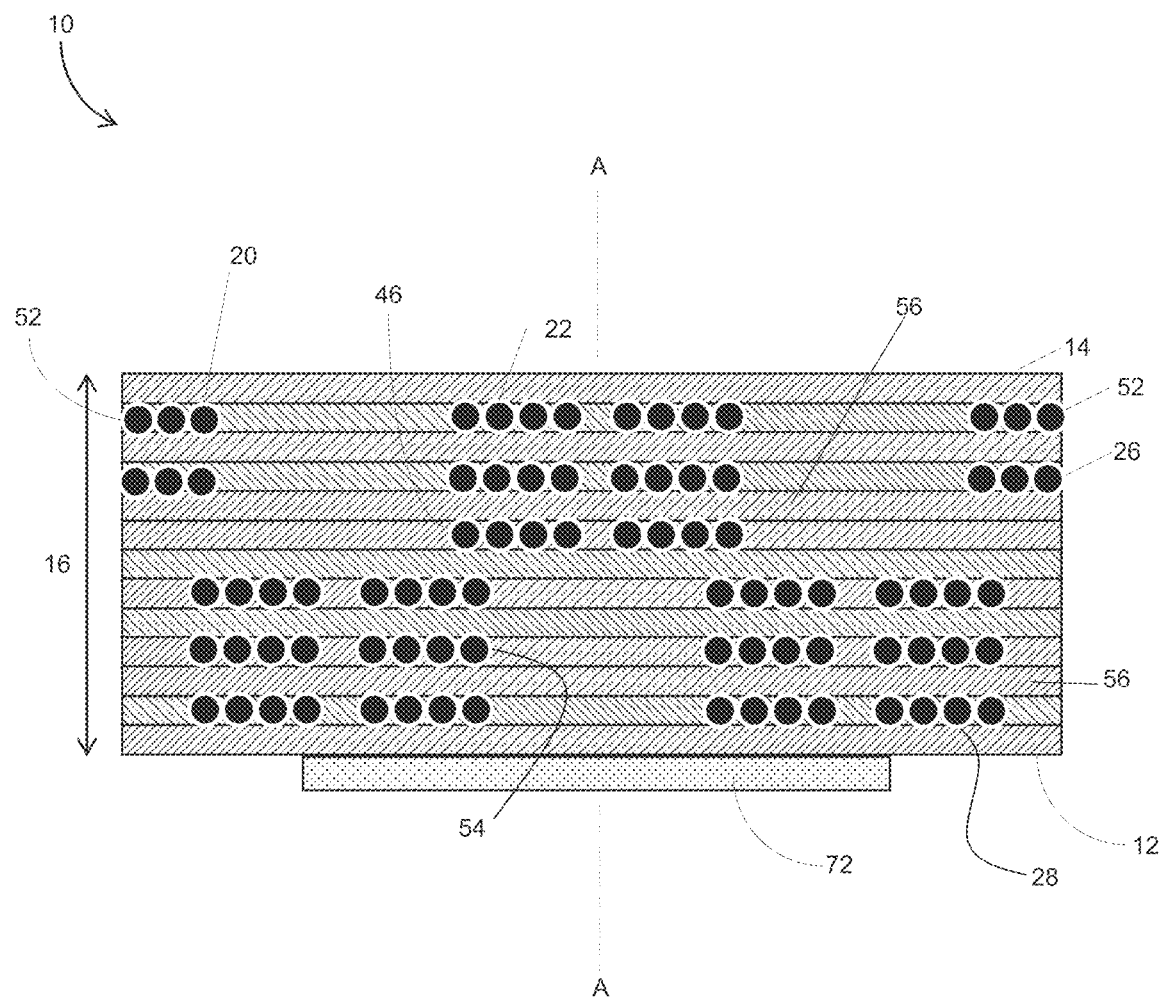
Figure 5:
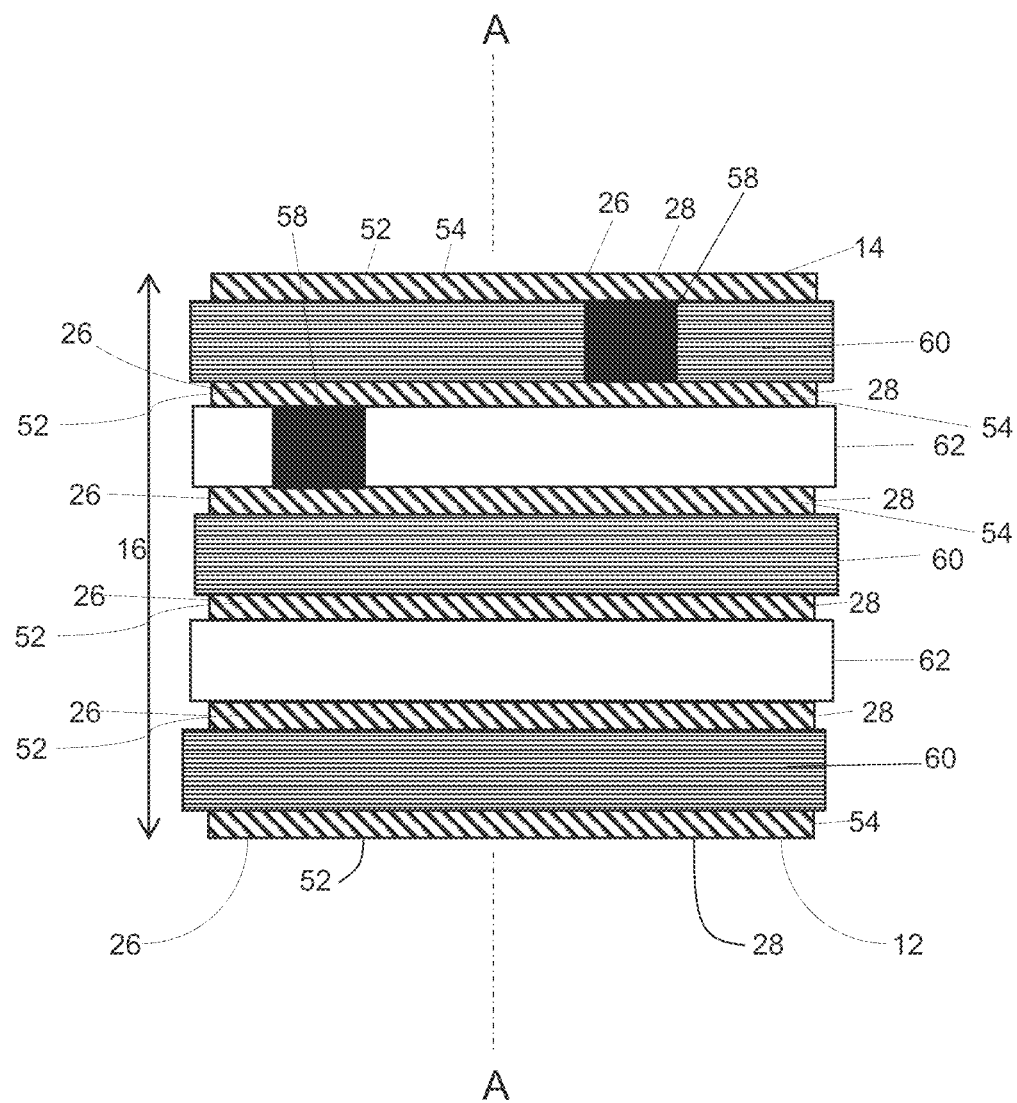
FIG. 5 is a cross-sectional front view of an embodiment of the second coil of the antenna.
Figure 6:
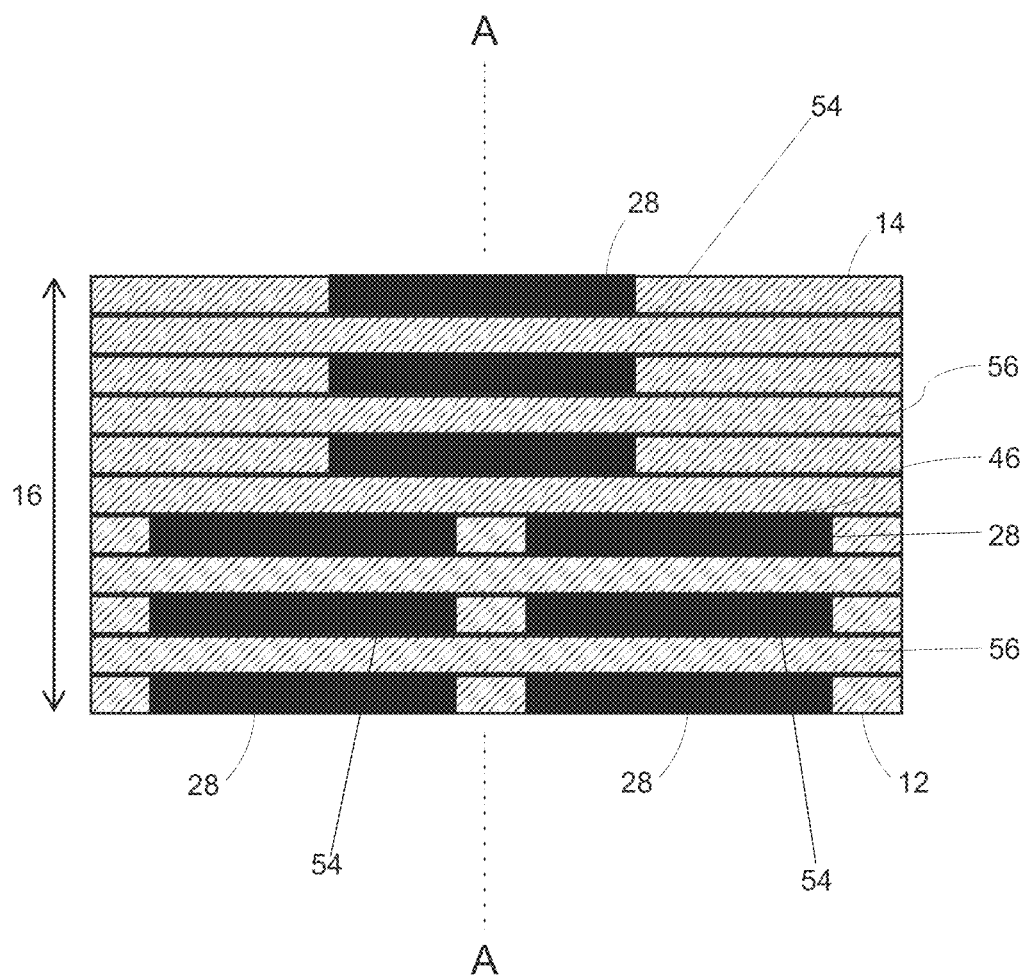
FIG. 6 is a cross-sectional front view of an embodiment of the second coil of the antenna.

Alternatively, as illustrated in FIGS. 4A-4D, 5, and 6, the first and second coils 20, 22 may be embedded within the thickness of the substrate 18 in various ways. In an embodiment, as shown in FIGS. 4A-4D, the first coil 20 comprises multiple electrically conductive layers 52 that are formed within the thickness of the substrate 18. In addition, the second coil 22 comprises multiple electrically conductive layers 54. As shown in FIGS. 4A, 4C and 4D, a three turn, two layer first coil 20 is formed within the thickness of the substrate 18. As illustrated, a first layer 52 of filars 46 is positioned proximal to the distal end 14 and the second layer of filars is positioned proximate the proximal end 12. An electrically non-conductive layer 56 separates the first and second layers 52, 54 (FIG. 6). At least one via 58 may extend through the electrically non-conductive layer 56 to connect at least two layers 52, 54 of the filars of the first or second coil 20, 22.

In an embodiment, at least one of the first and second coils 20, 22 of the antenna 10 may be constructed of alternating electrically conductive and electrically non-conductive layers. In a preferred embodiment, the electrically conductive layers that comprise the coils 20, 22 are composed of an electrically conductive material, such as copper. In an embodiment, as shown in FIGS. 4A-4D, 5 and 6, each of the electrically conductive layers that comprise the first and second coils 20, 22 respectively, is separated by an electrically non-conductive layer 56 comprising a non-conductive material. Each of the non-conductive layers 56 is positioned between the conductive layers 52, 54 of the coils 20, 22 within the thickness of the substrate 18.

In an alternate embodiment, as illustrated in FIG. 5, each of the conductive layers 52, 54 of the first and second coils 20, 22 may be constructed such that they are separated by alternating first and second layers 60, 62 of an adhesive or pre-preg material and a dielectric material. Examples of dielectric materials may include but are not limited to paper, a polymeric material such as polyimide, acrylic or Kapton, fiberglass, polyester, polyether imide, polytetrafluoroethylene, polyethylene, polyetheretherketone (PEEK), polyethylene napthalate, fluoropolymers, copolymers, a ceramic material such as alumina, composites thereof, or a combination thereof.

The conductive layers 52, 54 of at least one of the first and second coils 20, 22 that reside within the substrate 18 may comprise filars or portions of filars. Alternatively, the conductive layers 52, 54 that comprise the first and second coils 20, 22 may be constructed having a multi-layer-multi-turn construction in which each layer of the first and/or second coils 20, 22 comprises a layer of conductive material sandwiched between non-conductive layers. Examples of multi-layer-multi-turn constructions are provided in U.S. Pat. Nos. 8,610,530, 8,692,642, 8,860,545, 8,823,481 and 9,208,942, all to Singh et al. which are assigned to the assignee of the present application and are incorporated herein by reference.

In addition, the at least one via 56 may be provided to establish an electrical connection between the various conductive layers 52, 54 that comprise at least one of the first and second coils 20, 22. In a preferred embodiment, the at least one via provides an electrical connection between filars or portions of filars that comprise an inductor coil or coils at different substrate layers. As defined herein a "via" is an electrical connection pathway through and/or between two or more substrate layers, wherein the electrical connection itself passes through the plane of one or more adjacent layers. Vias may be constructed as throughbores in which the interior throughbore surface is coated or plated with a conductive material, as through holes through all layers, as blind vias exposed only to one side of the structure, as buried vias connecting internal layers without being exposed to either surface, and as thermal vias to carry heat away when required. These vias be either be "empty" or filled with electrically and/or thermally conductive materials. A via may comprise a wire, an electrically or thermally conductive fill, and an electrically or thermally conductive trace.

In an embodiment, the respective first and second coils 20, 22 may comprise multiple conductive layers. As shown, the first and second coils 20, 22 may comprise at least one conductive layer that resides within at least a portion of the thickness of the substrate 18. In an embodiment, the first coil 20 may be positioned closer to the distal surface 14 of the antenna 10. The distal surface 14 of the antenna 10 being positioned facing a second antenna that is configured to receive or transmit electrical energy. This preferred orientation of the first coil 20 with respect to the substrate 18 allows for increased mutual inductance between the respective spaced apart transmitting and receiving antennas. However, the first coil 20 may be positioned closer to the proximal end 14 of the antenna 10 within the thickness of the substrate 18.

Figure 7:
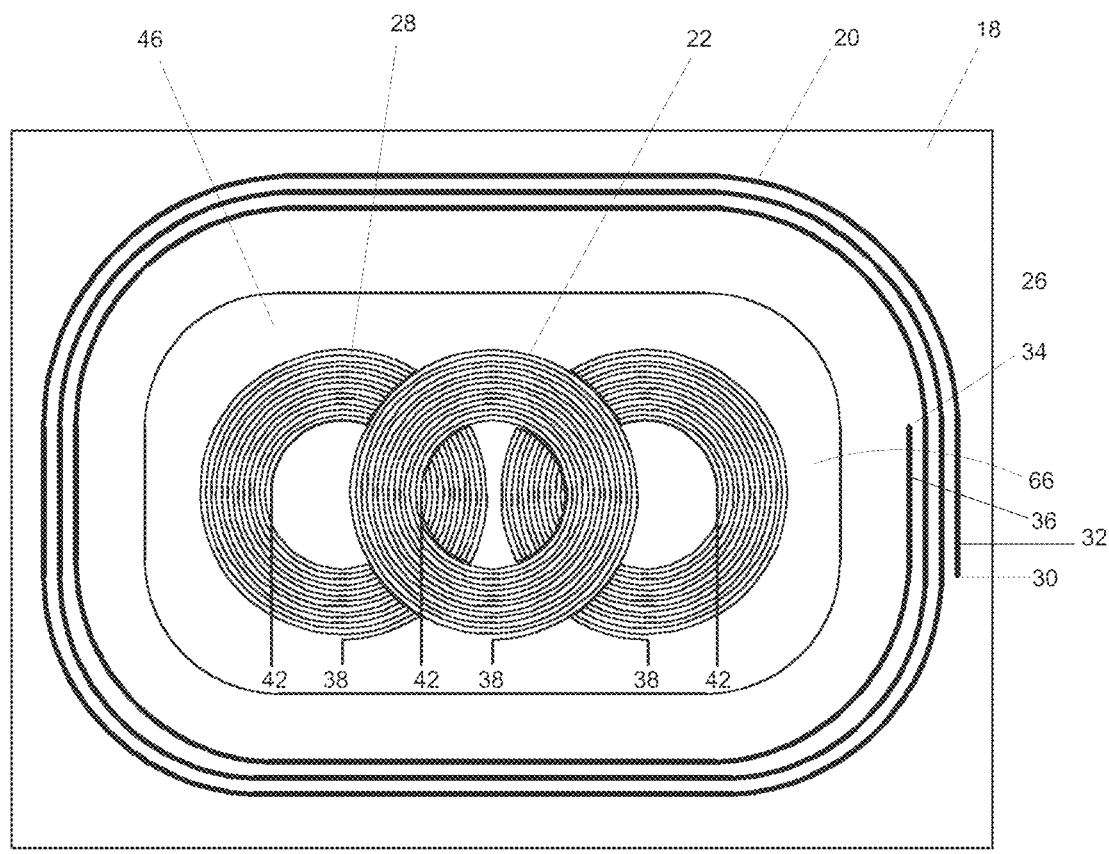
FIG. 7 is a top view of an embodiment in which a second coil array is positioned within a cavity of the antenna substrate.

In an alternative embodiment, as illustrated in FIG. 7, the antenna 10 of the present application may be constructed such that at least one second coil 22 resides within a cavity 66 formed with the thickness of the substrate 18. In an embodiment, the second coil 22 comprises a conductive filar, such a litz wire, that is wound in a coil form. In a separate embodiment, the second coil 22 can be positioned on another substrate that is placed within the cavity. In yet another embodiment, the second coil 22 may be positioned atop the substrate 18 that houses the first coil 20. As shown, the antenna 10 comprises three separate second coils 22 that form the second coil array 46. Each of the second coils 22 that comprise the array 46 is positioned in a stacked orientation within the cavity 66. In a preferred embodiment, as illustrated in FIG. 8, the second coil array terminal ends are received within the second coil control unit 50 that is incorporated within the antenna system assembly. The terminal ends 30, 34 of the first coil 20 are received within the separate first coil control unit 48. In addition, the antenna 10 of the present application may comprise a central control unit 68 (FIG. 8) that controls the operation of the first and second coils 20, 22. In a preferred embodiment, the first, second and central control units 48, 50, 68 are positioned at the proximal end of the antenna 10.

In addition, as illustrated in FIG. 7, the antenna 10 is constructed with the first coil 20 that is positioned circumferentially around the second coil array 46. In an embodiment, the first coil 20 comprises a filar that is positioned on the surface of the substrate 18. Alternatively, the filar of the first coil 20 may be positioned at least partially within the thickness of the substrate 18. The respective terminal ends 30, 34 of the first coil 20 are received within the first control unit 48 that is incorporated within the antenna 10. Preferably, the first control unit 48 is positioned at the proximal end 12 of the antenna 10.

As will be described herein, the multi-mode antenna 10 of the present disclosure is preferably designed to exhibit a high quality factor (QF) of at least 10, to achieve efficient reception/transfer of electrical power and/or an electrical data signal. In an embodiment, the first and second coils 20, 22 exhibit a quality factor (QF) that is greater than 10. In general, the quality factor of the antenna is increased by reducing the intrinsic resistive losses within the antenna, particularly at operating frequencies of at least 100 kHz.

The quality factor is the ratio of energy stored by a device to the energy lost by the device. Thus, the QF of an antenna is the rate of energy loss relative to the stored energy of the antenna. A source device carrying a time-varying current, such as an antenna, possesses energy which may be divided into three components: 1) resistive energy ($W_{res}$), 2) radiative energy ($W_{rad}$), and 3) reactive energy ($W_{res}$). In the case of antennas, energy stored is reactive energy and energy lost is resistive and radiative energies, wherein the antenna quality factor is represented by the equation $Q=W_{red}/(W_{res}+W_{rad})$.

In near field communications, radiative and resistive energies are released by the device, in this case the antenna, to the surrounding environment. When energy must be transferred between devices having limited power stores, e.g., battery powered devices having size constraints, excessive power loss may significantly reduce the devices' performance effectiveness. As such, near-field communication devices are designed to minimize both resistive and radiative energies while maximizing reactive energy. In other words, near-field communications benefit from maximizing Q.

By example, the efficiency of energy and/or data transfer between devices in an inductively coupled system is based on the quality factor of the antenna in the transmitter ($Q_1$), the quality factor of the antenna in the receiver ($Q_2$), and the coupling coefficient between the two antennas ($\kappa$). The efficiency of the energy transfer varies according to the following relationship which asymptotically reaches about 100 percent efficiency: eff$\alpha\kappa^2 Q_1 Q_2$. A higher quality factor indicates a lower rate of energy loss relative to the stored energy of the antenna. Conversely, a lower quality factor indicates a higher rate of energy loss relative to the stored energy of the antenna. The coupling coefficient (κ) expresses the degree of magnetic field coupling that exists between two antennas.

Further, by example, the quality factor of an inductive antenna varies according to the following relationship:

$$Q = \frac{2\pi f L}{R}$$

where f is the frequency of operation, L is the inductance, and R is the total resistance (ohmic+radiative). As the quality factor is inversely proportional to the resistance, a higher resistance translates into a lower quality factor. Thus, the antenna of the present disclosure is designed to decrease the electrical resistance and, therefore, increase the quality factor.

Specifically, the multi-mode antenna 10 of the present disclosure is designed with a plurality of materials that are strategically positioned within the antenna 10 to shield at least portions of the first and second coils 20, 22 from various undesirable magnetic and/or electrical interferences of the fields with objects and surfaces internal or external of the antenna 10. These materials are designed to minimize these interferences by limiting the interaction of the fields generated by the antenna with these extraneous objects and surfaces, thus enhancing the quality factor and mutual inductance between adjacent antennas 10. In addition, the antenna 10 of the present application is designed with a gap 70 that is strategically positioned within the structure of the antenna 10 between the first coil 20 and an opposed shielding material 84. As illustrated, the gap 70 extends parallel to the longitudinal axis A-A between a proximal surface of the first coil 20 and a distal surface of the shielding material positioned directly opposed from the first coil 20 and adjacent the antenna proximal end 12. This strategically placed gap is designed to enhance the quality factor of the coil 20.

In a preferred embodiment, the various materials or structures prevent the magnetic fields generated by the first and second coils 20, 22 from interacting with the first, second and central control units 48, 50, 68 that are positioned proximal of the coils 20, 22. As a result of this interference between the magnetic fields of the coils 20, 22 and the respective control units 48, 50, 68, an increase in the effective electrical resistance within the conductive filars occurs (as inductive loading) and ultimately results in a decreased antenna quality factor. This may also lead to heating of the components in the units 48, 50 and 68 and, in some cases damage. One such preferred shielding material is a ferrite material which typically has a relatively high permeability (W) that effectively shields the inductive coils 20, 22 of the antenna 10 from adjacently positioned components, circuits, and other antennas. Thus, by providing shielding between the inductive coils 20, 22 and the control unit circuits, the loading effect on the inductive coil is reduced and, in turn, the quality factor of the antenna is increased. In addition, shielding the inductive coils 20, 22 increases the mutual inductance between transmitting and receiving antennas which could allow for increased separation distance therebetween. In an embodiment, ferrite materials having a loss tangent (tan δ)<1, more preferably a loss tangent (tan δ)<0.67, are utilized as shielding materials.

The shielding material preferably has the primary function of providing a low reluctance path to magnetic field lines thereby reducing the interaction of the magnetic fields with other metallic objects, especially objects (e.g. batteries, circuit boards) placed behind the coil assembly. A second function of the shielding material is preferably to boost the inductance of the coil and, simultaneously, to increase the coupling between the transmitter coil assembly and the receiver coil assembly. The latter directly affects the efficiency of power transfer. The third ancillary benefit is that it may also improve the quality factor of the coil antenna if the loss tangent of the magnetic material is sufficiently small. As defined herein, "reluctance" is the resistance to a magnetic flux.

FIGS. 9A-9D are cross-sectional views that illustrate various embodiments in which an inductor coil having an electrically conductive trace of a multi-mode antenna of the present disclosure may be constructed using materials that shield the conductive traces, i.e., wires of the coils 20, 22 from undesirable magnetic fields. Such shielding materials may include, but are not limited to, zinc comprising ferrite materials such as manganese-zinc, nickel-zinc, copper-zinc, magnesium-zinc, and combinations thereof. These and other ferrite material formulations may be incorporated within a polymeric material matrix so as to form a flexible ferrite substrate. Examples of such materials may include but are not limited to, FFSR and FFSX series ferrite materials manufactured by Kitagawa Industries America, Inc. of San Jose Calif. and Flux Field Directional RFIC material, manufactured by 3M™ Corporation of Minneapolis Minn. An antenna cover 81 composed of a polymeric material is positioned at the antenna distal end 10.

Figure 9A:
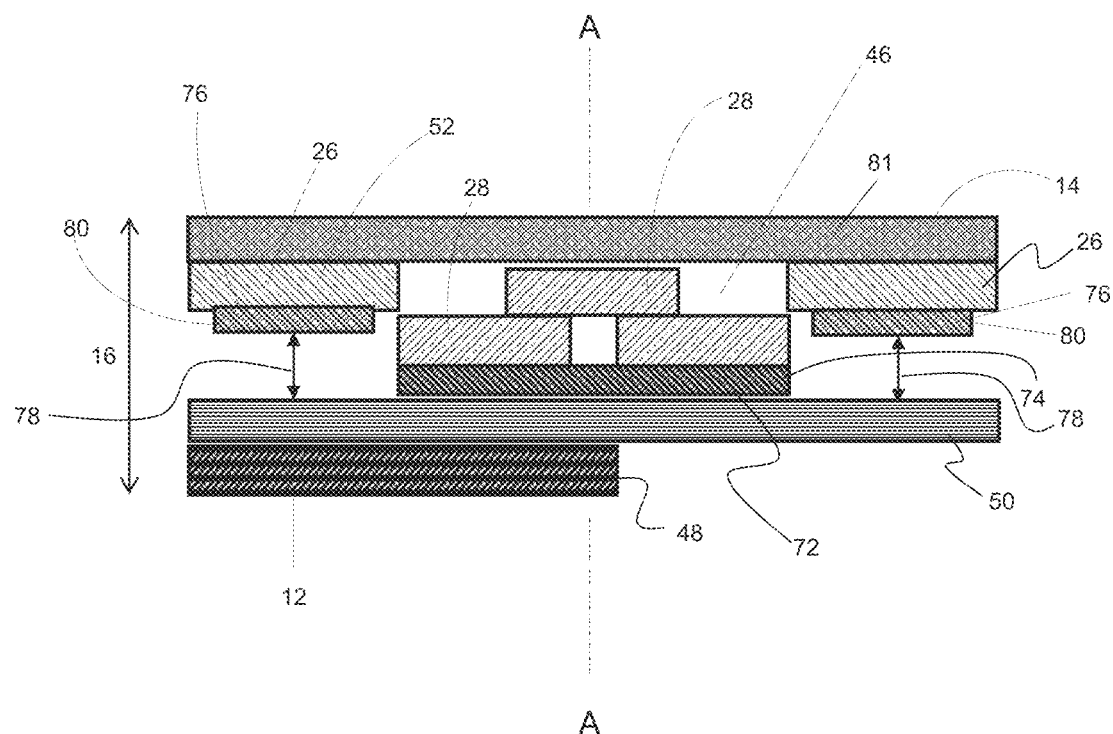
FIGS. 9A-9D are cross-sectional front views of different embodiments of various shielding material positioned within the antenna.

FIG. 9A illustrates a cross-sectional view of an embodiment of the antenna 10 shown in FIGS. 1 and 7. As shown, the antenna 10 comprises various materials that are positioned at locations adjacent to the first and second coil 20, 22 that act as shields to the coils 20, 22. As shown in the embodiment of FIG. 9A, a first shielding material 72 is positioned directly beneath the second coil array 46. More specifically, the first shielding material 72 is positioned between the second coil array 46 and the second control unit 50. In a preferred embodiment, the first shielding material comprises a ferrite material comprising nickel, zinc and copper. As illustrated, the first material 72 has μ' between 100 and 200 and a tan δ that is less than 0.3 at the operating frequency. In an embodiment, the first shield material has a thickness 74 that ranges from 0.2 mm to about 2 mm. In a preferred embodiment, the thickness 74 of the first shielding material 72 may range from about 2 mm to about 7 mm.

In addition, a second shielding material 76 extends proximally from the proximal end of the first coil 20. In a preferred embodiment, the second shielding material 76 is either a nickel-zinc ferrite material or a nickel-copper-zinc ferrite material having a μ' between 100 and 200 and a tan δ that is less than 0.3 at the operating frequency. A gap 78 of about 1 mm to 6 mm extends between the second material 76 and the second control unit 50. In an embodiment, the second material 76 has a thickness 80 that ranges from 0.1 mm to about 1 mm. In a preferred embodiment, the thickness 74 of the first material 72 may range from about 0.2 mm to about 1 mm. As constructed, the embodiment of the antenna 20, shown in FIG. 9A has a first coil 20 that exhibits an inductance of about 8.9 nH, an electrical resistance of about 8.3Ω and a quality factor of about 46.

Figure 9B:
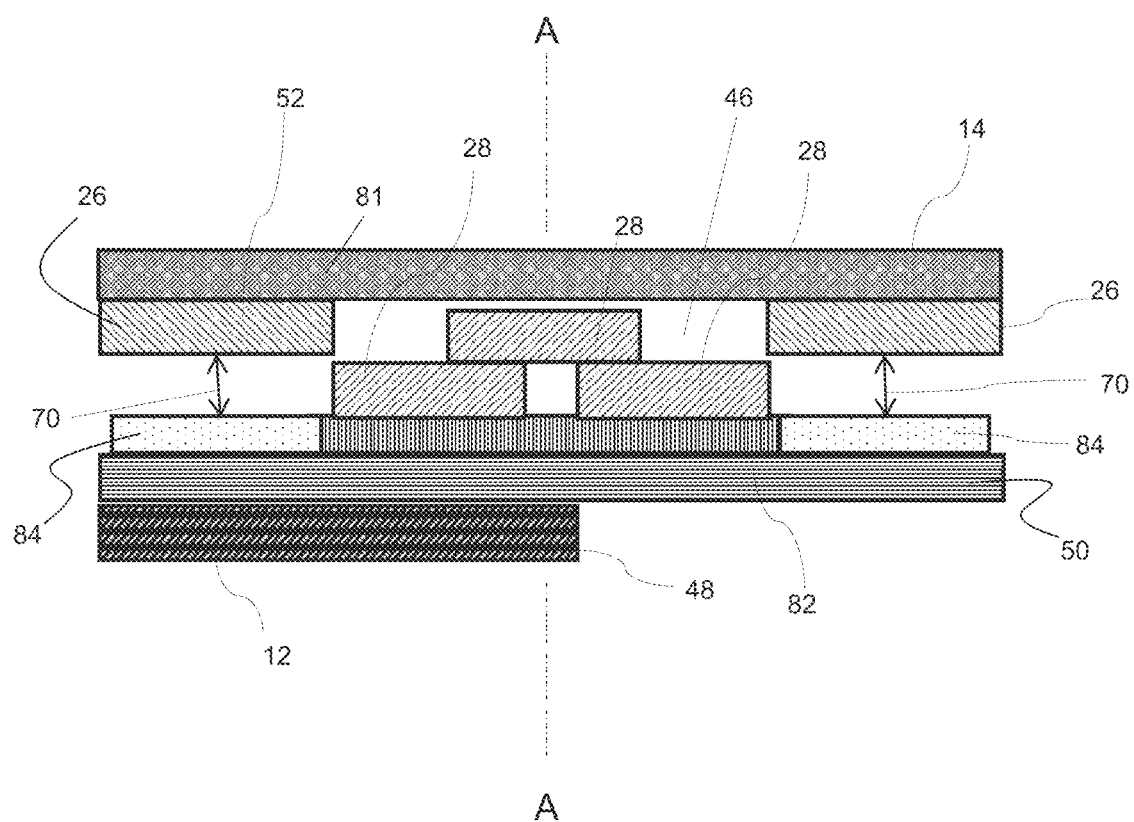

FIG. 9B illustrates a cross-sectional view of an alternative embodiment of the antenna 10 of the present invention. As shown, the antenna 10 comprises a first material 82 that is positioned between the proximal end of the second coil array 46 and the second control unit 50. In addition, a second material 84 is positioned in contact with the second control unit 50 in direct opposition to the second coil array 46. The gap 70 of about 1 mm spans along longitudinal axis A-A between a second material 84 and the proximal end of the first coil 20.

In a preferred embodiment, as shown in FIG. 9B, the first material 82 comprises a ferrite material composed of Ni—Zn—Cu having a µ' of about 100-250 and a tan δ that is less than 0.33 the operating frequency. The second material 84 preferably comprises a permeability electromagnetic interference (EMI) absorbing material comprising a material with a relatively high permeability and an elastomeric material a µ' of about 20 to 60 and a tan δ less than about 0.15. The thickness of the first and second materials 82, 84 preferably ranges from about 0.2 mm to about 0.6 mm. The embodiment of the inductive coil 20 of the antenna 10 shown in FIG. 9B exhibits an inductance of about 5.7 nH, an electrical resistance of about 3.9Ω and a quality factor of about 62, and improvement of about 35% over the embodiment shown in FIG. 9A.

Figure 9C:
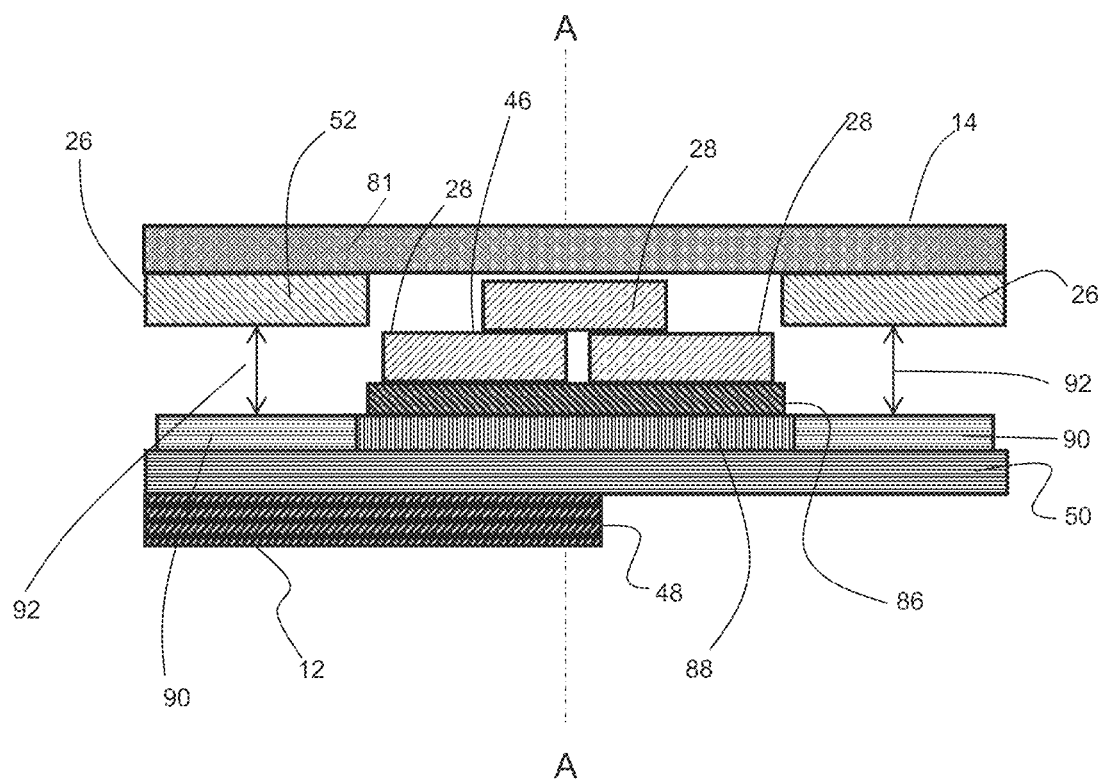
Figure 9D:
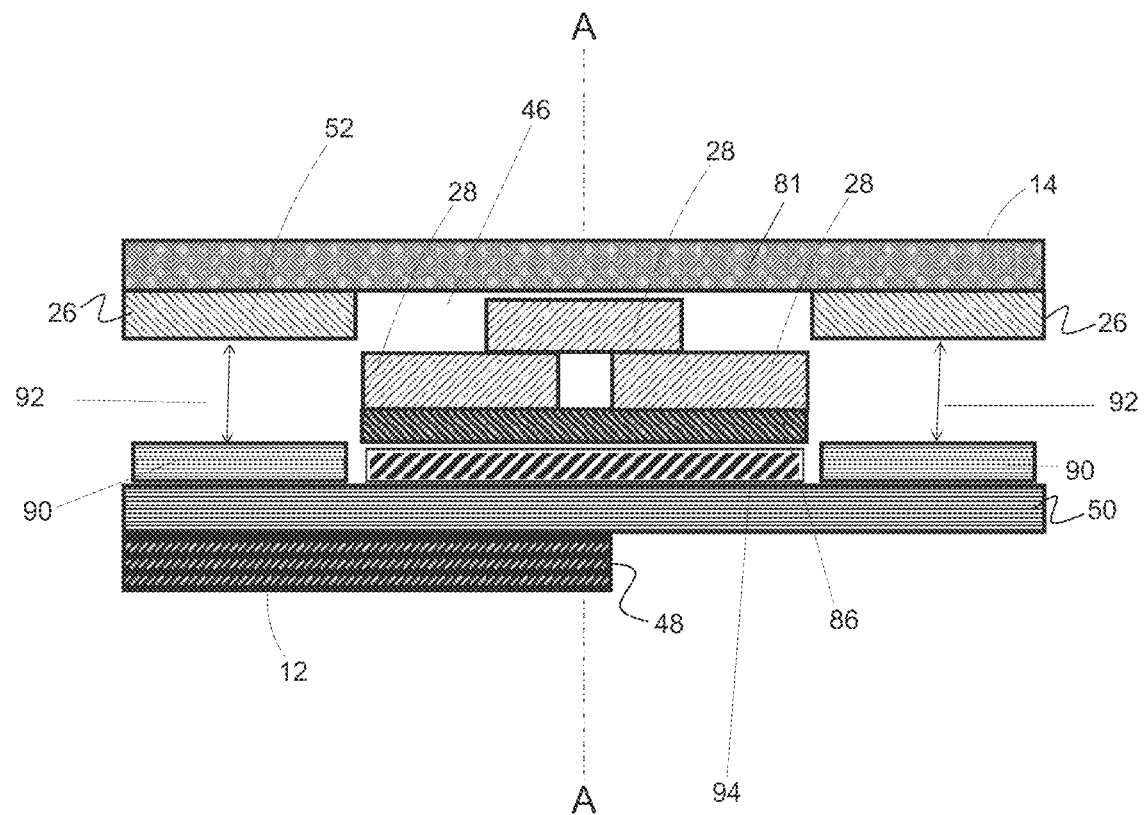

FIGS. 9C and 9D are cross-sectional views of an alternative embodiment of the antenna 10 of the present application. As shown, the antenna 10 comprises a first material 86 that is positioned directly beneath the second coil array 46. A second material 88 is preferably positioned between the first material 86 and the second control unit 50. In a preferred embodiment, the first material comprises a ferrite material composed of a nickel-zinc-copper ferrite having a of about 100-250 and a tan δ less than 0.33 at the operating frequency. The second material 88 is preferably composed of a non-magnetic material having a dielectric constant as small as possible (i.e. about 1. Examples of the second material 88 include but are not limited to air or a polymeric material. The second material 88 acts as a spacer between the first material and the second control unit 50. A third material 90 is positioned opposed from the first coil 20 and adjacent to opposed first and second ends of the second material 88 that extends lengthwise along a distal surface of the second coil control unit 50. In an embodiment, the third material 90 acts as an absorber of the electromagnetic interference field and may comprise a soft ferrite material composed of manganese zinc or nickel zinc ferrite materials. A gap 92 that ranges from 1 mm to about 3 mm, more preferably 2 mm spans between a proximal end of the first coil 20 and a distal end of the third material 90. The first, second, and third materials 86, 88, 90 are strategically placed to direct the magnetic fields that emanate from the first and second coils 20, 22 in a distal direction towards an adjacent second antenna 10. Thus, the quality factor and mutual inductance between transmitting and receiving antennas 10 is increased. In addition, the first and third materials 86, 90 are designed to shield the first and second coils 20, 22 from interference from the first and second control units 48, 50. The embodiment of the antenna 10, as shown in FIG. 9C, has a first coil 20 that exhibits an inductance of about 5.7 nH, an electrical resistance of about 3.6Ω and a quality factor of about 67. Thus, the embodiment shown in FIG. 9C illustrates how the quality factor of a coil can be significantly increased using specific shielding materials that are strategically positioned within the antenna 10. Furthermore, as illustrated in FIG. 9D, the antenna 10 of the present application may comprise an electromagnet 94 (FIG. 9D). As illustrated, the electromagnet is preferably positioned directly beneath the first, second, or third shielding materials 86, 88, 90. As illustrated in FIG. 9D, the electromagnet 94 is positioned proximal of the first shielding material 86. In an embodiment, the electromagnet 94 may be used to modify the strength of the magnetic fields within the antenna. For example, the electromagnetic may be used to selectively control how magnetic fields are absorbed by at least partially saturating the ferrite materials, as shown, the first shielding material 86, within the antenna 10. This helps increase the strength of the magnetic fields emanating from the first and second coils 20, 22 of the antenna 10.

As shown in the various embodiments, three different such materials, a first material 86, a second material 88, and a third material 90, each having a different permeability, loss tangent, and/or magnetic flux saturation density may be used in the construction of the antenna 10 of the present disclosure. In a preferred embodiment, the first material 86 may comprise at least one of the FFSX series of ferrite materials having a permeability of about 100 to about 120 across a frequency range of at least 100 kHz to 7 MHz. The second material 88 may comprise the RFIC ferrite material having a permeability of about 40 to about 60 or combinations thereof, as previously mentioned. In a preferred embodiment, the first 86 and second 88 materials may comprise a permeability greater than 40. More preferably, the first 86 and second 88 materials may comprise a permeability greater than 100. The magnetic flux saturation density ($B_{sat}$) of at least 300 mT is preferred across all magnetic materials. In an embodiment, the various shielding materials and structures could be used to create a hybrid shielding embodiment. In a hybrid shielding embodiment, the various shielding materials are strategically positioned to improve the performance of the multiple inductor coils which resonate at differing frequencies. Thus, the shielding materials are positioned to enhance the multi-mode operation of the antenna 10. For example, utilizing a ferrite material having an increased permeability of about 100 to 120, such as the FFSX series materials may be used to optimally shield a coil resonating at 6.78 MHz without degrading the performance of the other coil resonating at a lower frequency range of 100 kHz to about 500 kHz. Likewise, utilization of a ferrite material having a lower permeability such as from about 40 to about 60, like the RFIC material, is preferred because it enhances operation of a coil resonating in the lower kHz frequency region without degrading performance of the higher MHz resonating coil.

In addition to the composition of the specific shielding materials, the positioning of the shielding material is also important to the optimal operation of the multi-mode antenna of the present disclosure. For example with reference to FIGS. 9A through 9D, it may be preferred to position the higher permeability ferrite material near the higher resonating coil, such as the relative location of the first material 86 as shown in FIGS. 9A-9D. Similarly, it may be beneficial to position the lower permeability material near the coil that is resonating in the kHz range such as the location of the second material 88.

In addition to utilizing two ferrite materials as previously discussed, it is contemplated that mixtures or compounds of various ferrite materials may be used to further custom tailor the desired permeability. Furthermore, the various layers may be composed of ferrite material mixtures and alloys. It is also noted that FIGS. 9A-9D represents specific embodiments in which ferrite materials may be positioned within the structure of the antenna of the present disclosure. It is contemplated that the various first and second ferrite materials 86, 88 can be interchangeably positioned throughout the structure of the antenna to custom tailor a desired response or create a specific magnetic field profile.

Figure 10:
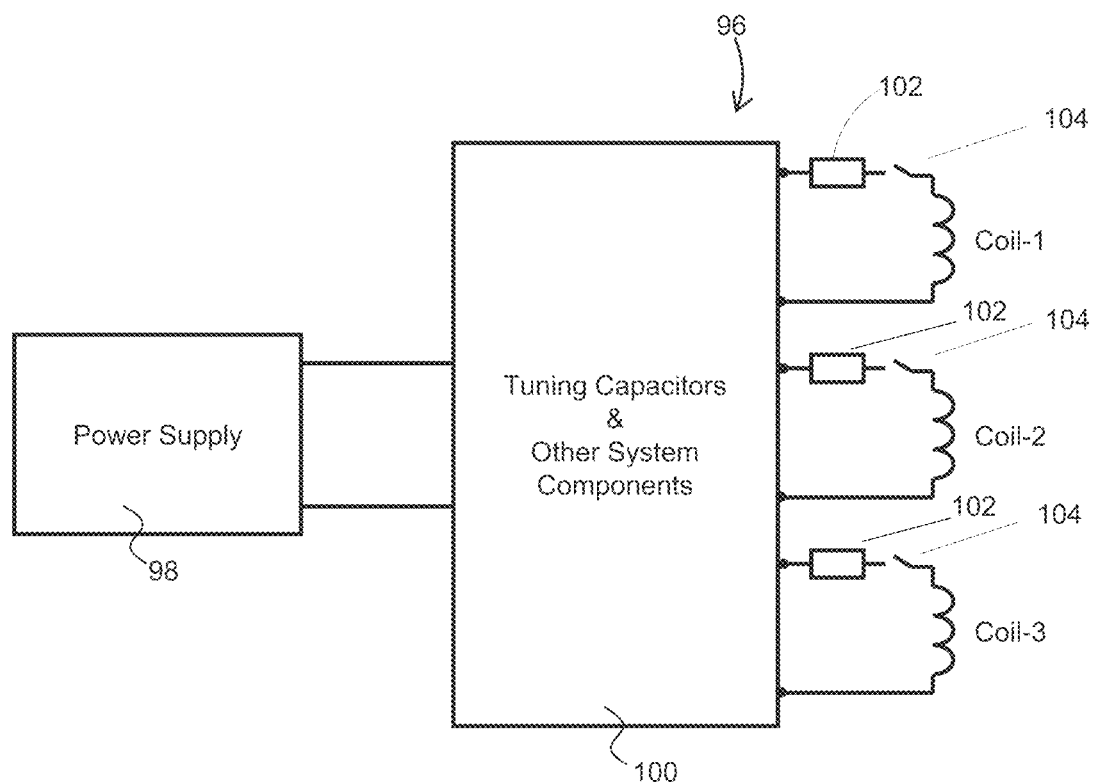
FIG. 10 is a schematic view of the coil selection circuit.

In an embodiment, as illustrated in FIG. 10, the antenna 10 of the present application may comprise a coil selection circuit 96. In a preferred embodiment, the circuit 96 is designed to control the operation of either of the first and second coils 20, 22, respectively, to minimize potential interference caused by the proximity effect between the coils 20, 22. Or alternatively, interference created between adjacently positioned coils from a transmitting, first antenna and a receiving, second antenna. For example, when the outer, first coil 20 is actively transmitting electrical power and the inner, second coil 22 is turned off and not being used, the proximity effect between the adjacently positioned coils may degrade mutual inductance between the adjacently positioned transmitting and receiving antennas. As a result, a loss in the transfer of electrical energy and/or data may occur. The circuit 96 may be incorporated within either of the first, second or central control unit 48, 50, 68 of the antenna 10 of the present application. The coil selection circuit 96 controls the operation of the individual coils 20, 22 of the antenna 10. Specifically, the circuit 96 is configured to create an open circuit of either of the first or second coils 20, 22 with respect to the respective control unit 48, 50, 68. Alternatively, the circuit 96 may increase the electrical impedance within either of the first or second coils 20, 22. For example, establishing the inner, second coil 22 in an open circuit condition or increasing the electrical impedance within the second coil 22 minimizes parasitic current within the coil 22. This increase in electrical impedance may be achieved by utilizing a filter circuit. As a result of the minimized parasitic current, the mutual inductance between adjacently positioned transmitting and receiving antennas is improved.

Tables I and II, shown below, detail mutual inductance measurements taken at various positions with respect to the transmitting antenna. The "Left", "Center", and "Right" positions across the row indicate horizontal positions whereas the "Top", "Center", and "Bottom" positions of the column indicate various vertical positions along the transmitting antenna. Table I details the mutual inductance measurements taken at various positions with respect to the antenna in nH when the first coil 20 of the transmitting antenna is transmitting electrical power and the second coil 22 is operably connected to the antenna but not being used to transmit electrical energy. Table II details the mutual inductance measurements taken at the same positions with respect to the antenna in nano-henry (nH) as Table I when the first coil 20 of the transmitting antenna is transmitting electrical power and the second coil 22 is in an open circuit configuration and is not electrically connected to the antenna 10. As shown in Table II, having the second coil 22 in an open circuit configuration significantly increases the mutual inductance between the transmitting and receiving antennas at each of the various measured positions.

TABLE I

|  | Vertical | | |
| --- | --- | --- | --- |
| Horizontal | Left (nH) | Center (nH) | Right (nH) |
| Top | 300-400 | 200-300 | 300-400 |
| Center | 368 | 290 | 373 |
| Bottom | 361 | 260 | 342 |

TABLE II

|  | Vertical | | |
| --- | --- | --- | --- |
| Horizontal | Left (nH) | Center (nH) | Right (nH) |
| Top | 590 | 715 | 667 |
| Center | 702 | 777 | 628 |
| Bottom | 480 | 545 | 495 |

FIG. 10 illustrates an embodiment of the coil selection circuit 96 of the present application in which each of the second coils 22 of the second coil array 46 are electrically connected. As shown, the circuit 96 comprises a power supply 98 and a plurality of capacitors 100 that are used to tune the operating frequency of the second coil 22 of the antenna 10. In addition, the coil selection circuit 96 may comprise at least one of an electrical filter 102, or a switch 104. If an electrical filter is used, the electrical filter 102 may comprise a low pass filter that allows only the lower frequency signals to pass through while blocking the higher frequency signals, including the operating frequency of the first coil 20. In addition, the electrical filter 102 may comprise a band-stop filter that blocks signals having a frequency band around the operating frequency of the first coil 20. If the switch 104 is utilized, then the switch 104 may be configured to toggle each of the second coils 22 of the second coil array 46 from the control circuit. As illustrated, each of the second coils 22 that comprise the second coil array 46 are electrically connected to the electrical filter 102, the switch 104 or both the electrical filter 102 and the switch 104. In addition, it is contemplated that the first coil 20 may be electrically connected to the coil selection circuit 96.

It is further noted that a microprocessor (not shown) or circuit board (not shown) may be used to control the combination of switches that are turned "on" or "off". In addition, the electrical switch may comprise a multitude of different electrical switches, examples of which may include, but are not limited to, an electrical toggle switch, a rocker switch, a push button switch, an inline switch, switched capacitor networks, and filter networks that utilize inductors and/or capacitors. As defined herein, an "electrical switch" is an electrical component that can either connect or disconnect an electrical current, voltage, signal or combinations thereof, along an electrical pathway. A switch can also divert an electrical current, voltage, signal or combinations thereof, from one electrical conductor to another. An electrical switch that is in an "on" position is defined as allowing an electrical signal or electrical current or voltage to pass therethrough and thus is electrically connected. An electrical switch that is in an "off" position is defined as prohibiting an electrical signal or electrical current or voltage to pass therethrough and thus is electrically disconnected.

In an additional embodiment illustrated in FIGS. 11A through 11D, the first coil 20 of the antenna 10 may be arranged in a "nested loop" configuration in which the first coil 20 is configured to comprise proximal and distal first coil loop segments that reside within the first coil outer perimeter. This nested loop configuration of the first coil 20 increases the mutual inductance between transmitting and receiving antennas 10. More specifically, as shown, the first coil 20 is configured such that portions of the first coil 20 overlap each other, thereby, increasing the surface area of the first coil 20 within a reduced foot print.

Figure 11A:
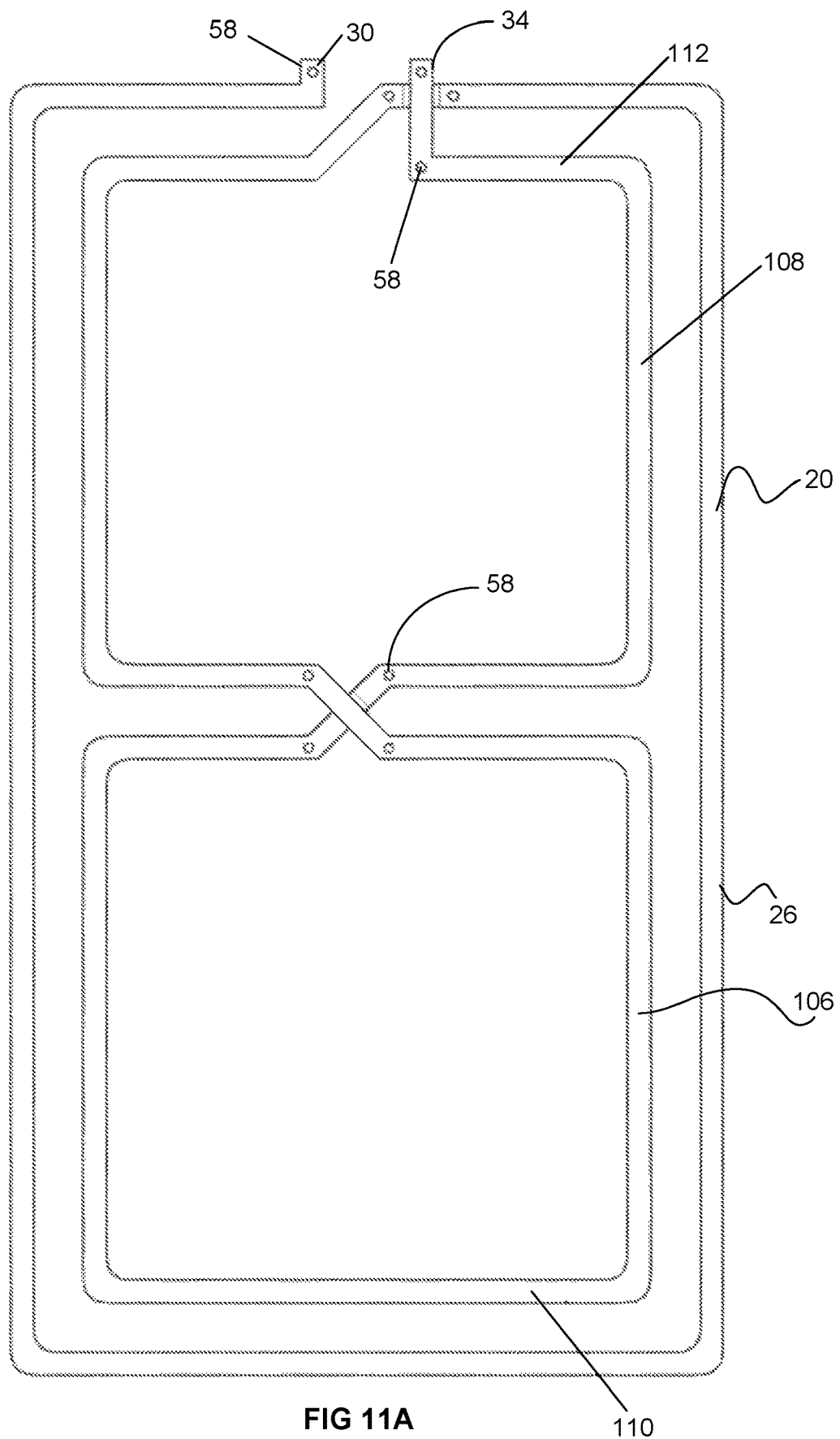
FIGS. 11A-11D are top views of embodiments of a "nested" coil configuration.
Figure 11B:
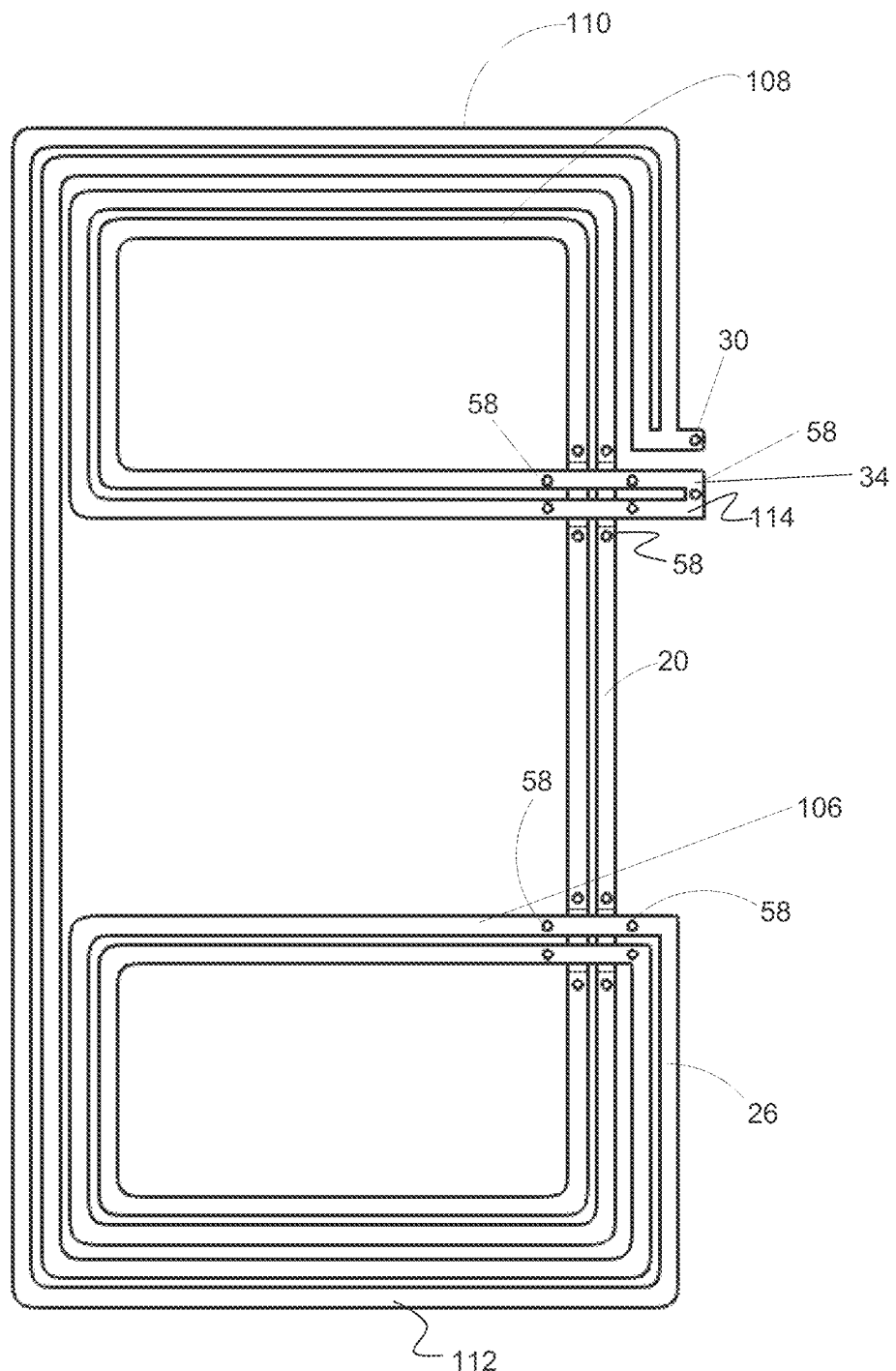
Figure 11C:
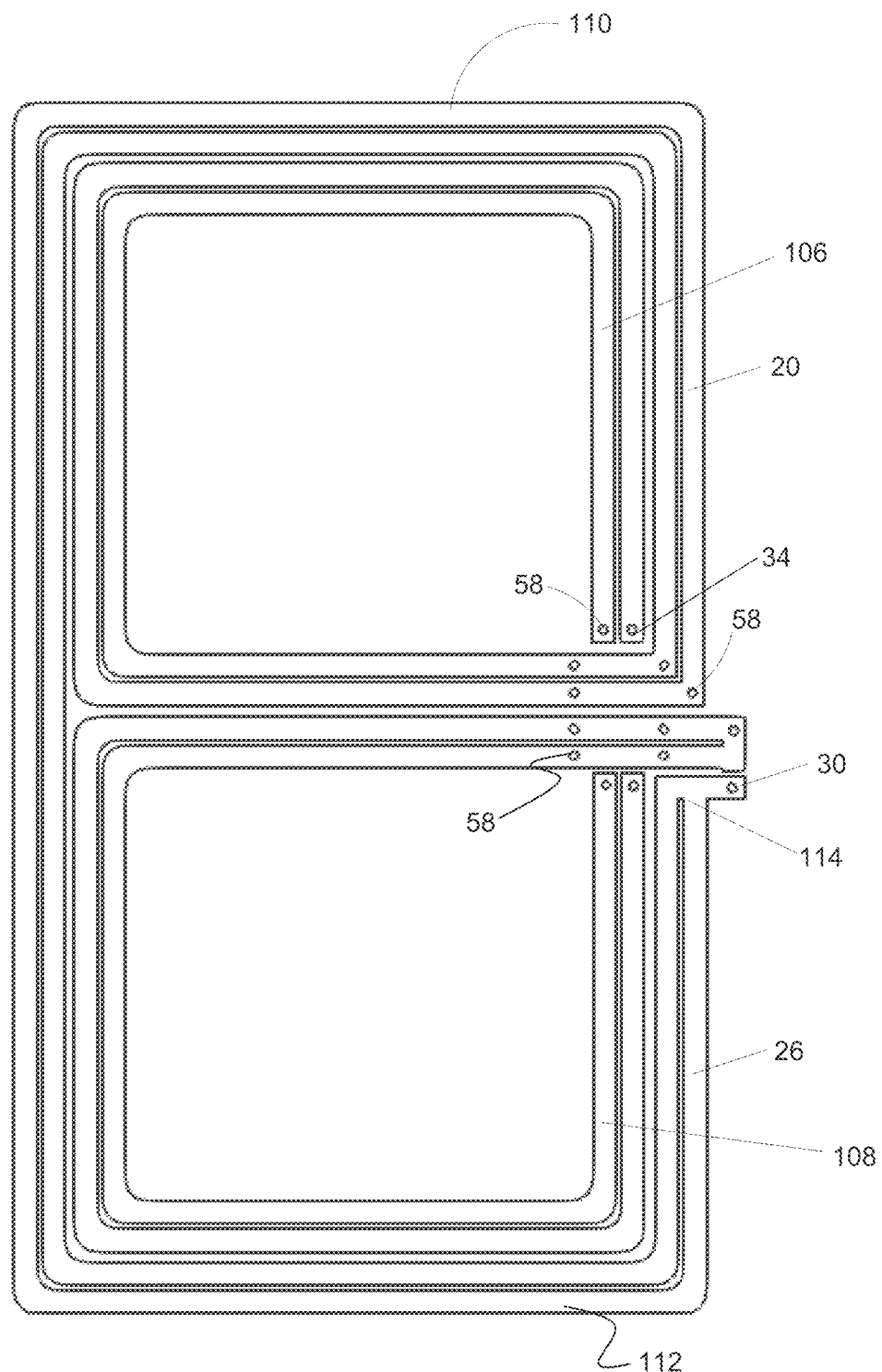

In the embodiment shown in FIGS. 11A through 11D, the first coil 20 comprises left and right first coil sub-segments 106, 108 that are formed of a filar 26 having a continuous electrical connection. As shown, the filar 26 extends from the first terminal 26 at a first coil distal end 110 to a first coil proximal end 112 at which point, the filar 26 comprises a turn that bypasses over a portion of the first coil 20. In an embodiment, as illustrated in FIGS. 11B and 11C, at least two or more traces comprise the filar 26 of the first coil 20. As illustrated in FIGS. 11B and 11C, the filars 26 may be electrically connected in parallel thereby creating a bifilar connection 114 that comprises the first inductor coil 20.

It is noted that two or more adjacent electrically conductive traces or filars 26 that comprise an inductive coil may be connected in parallel. In addition the coil 20, 22 may be construed having a combination of monofilars, bifilars or more. In general, connecting two or more adjacent traces or filars reduces electrical resistance, particularly the equivalent series resistance (ESR) of the antenna, and, as a result, improves the quality factor of the antenna.

Figure 11D:
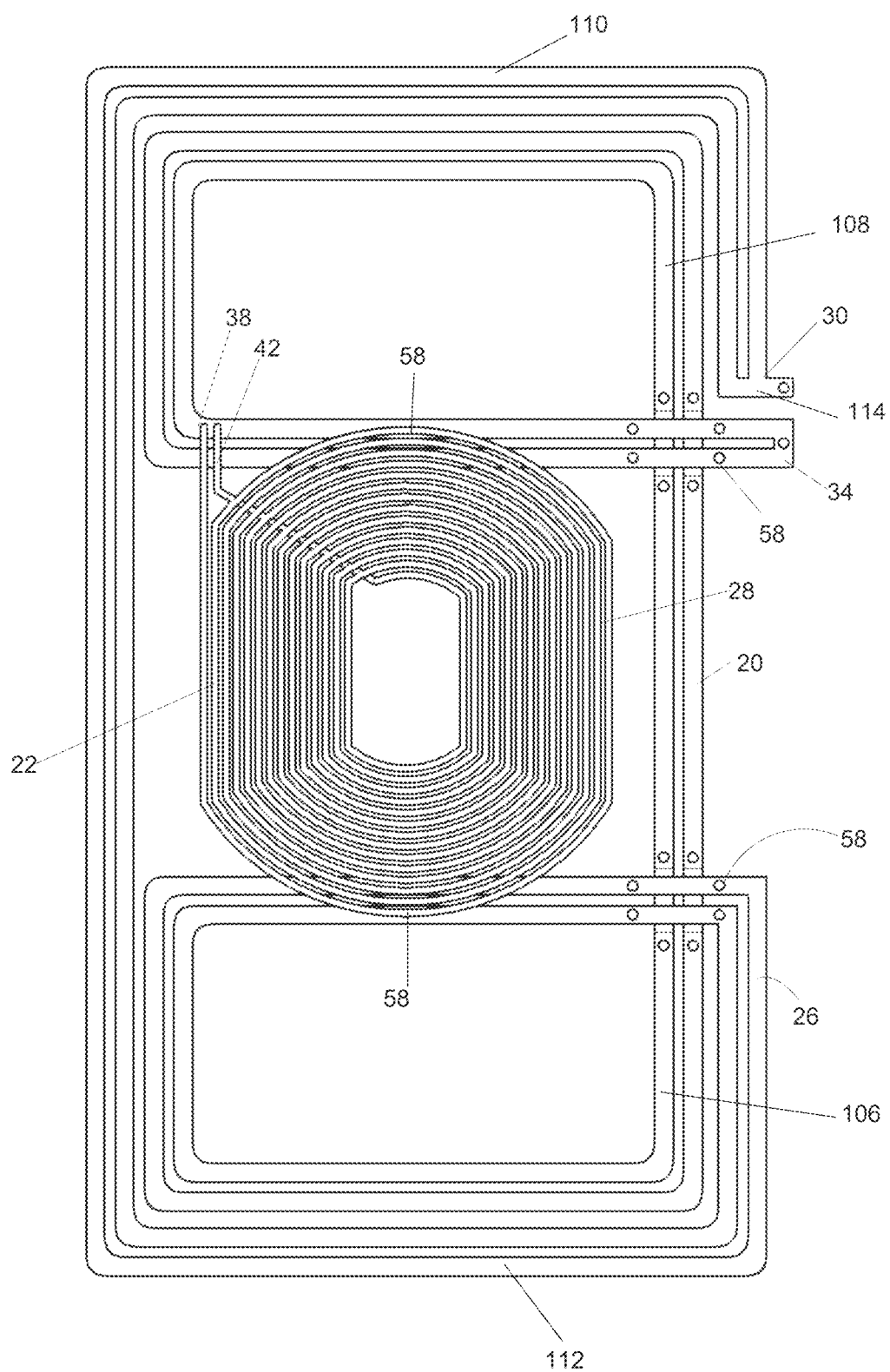

In addition, as illustrated in FIG. 11D, the second coil 22 may be incorporated with the nested first coil embodiment. The second coil 22 or coil array 46 may be positioned within the space between the left and right first coil sections 106, 108. Furthermore, the second coil 22 may be electrically connected to the nested first coil 20. As illustrated in FIG. 11D, the second coil 22 may be positioned above the nested coil embodiment so that a plurality of vias 58 may be used to electrically connect the filars of the respective coils 20, 22.

A via 58 or a plurality of vias 58, may be positioned between two or more layers of first or second coils 20, 22 that comprise the antenna 10 of the present disclosure. In addition, the vias 58 may be used to connect the second coil 22 to the first coil 20, for example within a nested first coil embodiment, as shown in FIG. 11D. More preferably, the at least one via 58 provides a shunted electrical connection between different locations between the inductor coils to minimize electrical resistance which may adversely affect electrical performance and quality factor.

In a preferred embodiment, a plurality of shunted via connections may be positioned between the upper and lower layers of either or both coils 20, 22 to electrically isolate portions thereof, and thus enabling the terminals or portions of filars to electrically bypass other conductive traces of the respective coils. More specifically, to create an electrical "bypass" a plurality of vias 58 may be positioned on respective left and right sides of a filar. The plurality of vias 58 positioned on the respective left and right sides of the filar 26, 28 thus forming electrical paths underneath, or above a separate filar portion, thereby electrically isolating the filar portion.

Figure 12:
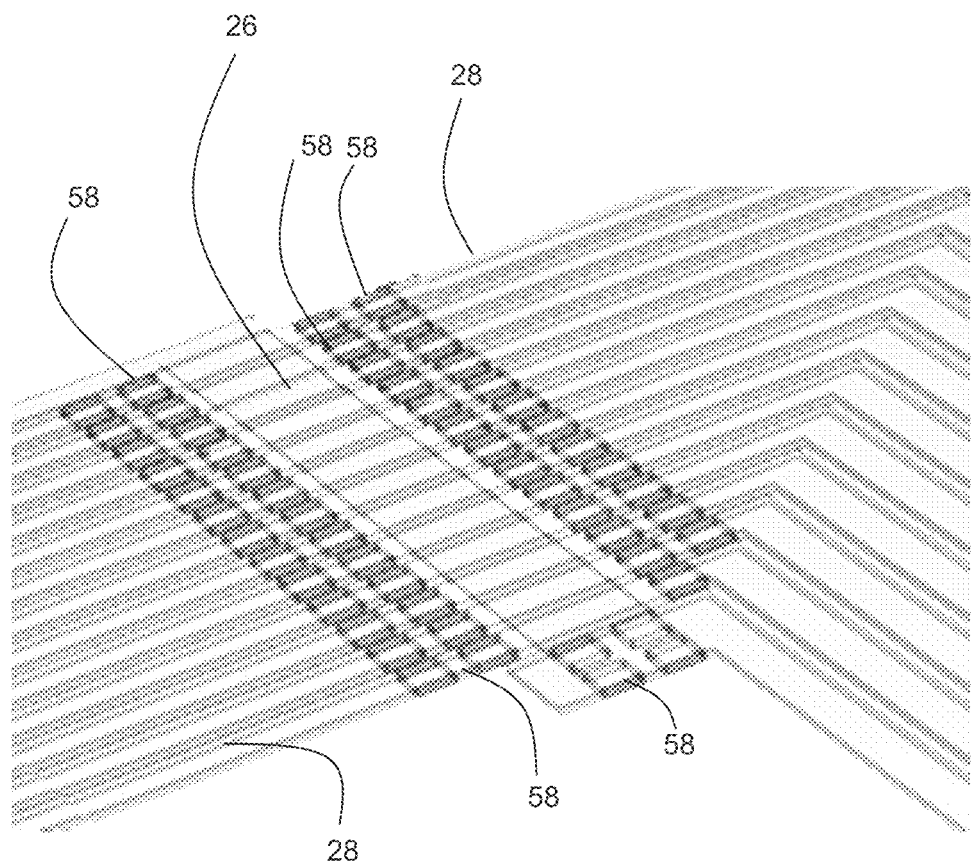
FIG. 12 is a perspective partial view of an embodiment of a shunted via configuration.

FIG. 12 illustrates a magnified view of an example of a plurality of shunted via connections between a portion of a filar 26 that is disposed on an upper coil layer. As shown, a plurality of via connections is shown between the filars that are disposed on the respective left and right sides within a second coil 22. More specifically, as shown in the embodiment of FIG. 12, there are four vias 58 that are positioned along the left and right sides of the filar 26 that is being bypassed. In a preferred embodiment, via connections provide a shunted electrical connection that by may pass under or over a filar. Thus by positioning the plurality of vias 58 adjacent the respective sides of the filar, an electrical connection can be provided that bypasses at least a portion of selected filars, thereby keeping the filar electrically isolated. Furthermore, by providing a plurality of vias 58 positioned along each of the filar tracks that comprise the inductor coil, various electrical connections can be made which can further tailor the inductance and resulting operating frequency of the antenna of the present disclosure. For example, various electrically isolated terminal connections can be positioned throughout the inductor coils 20, 22 thus establishing further customized inductances and operating frequencies, particularly in nested first coil embodiments.

Figure 13A:
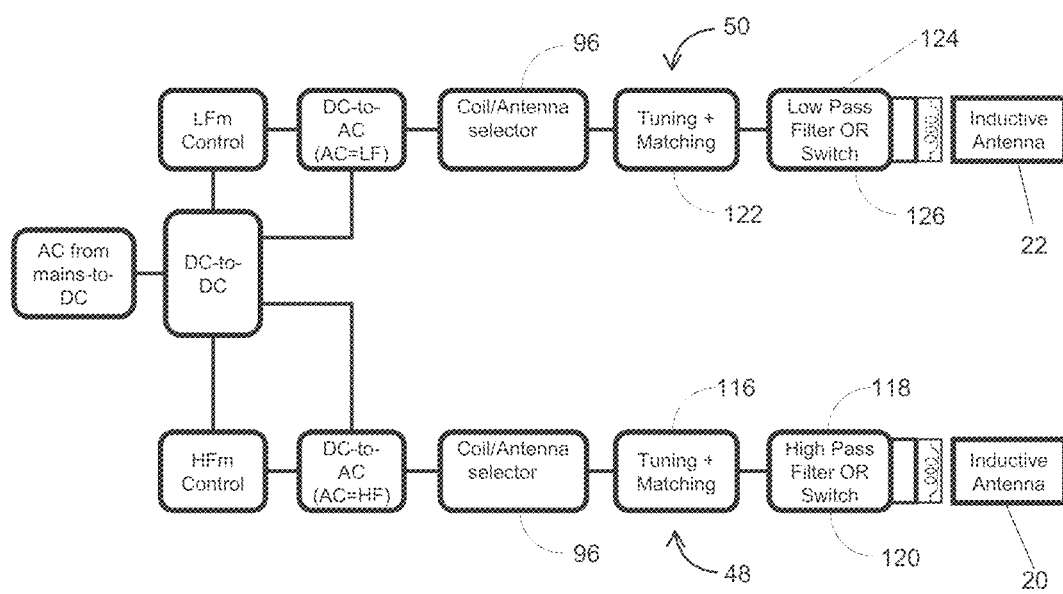
FIGS. 13A-13D show embodiments of the control system of the antenna of the present application.
Figure 13B:
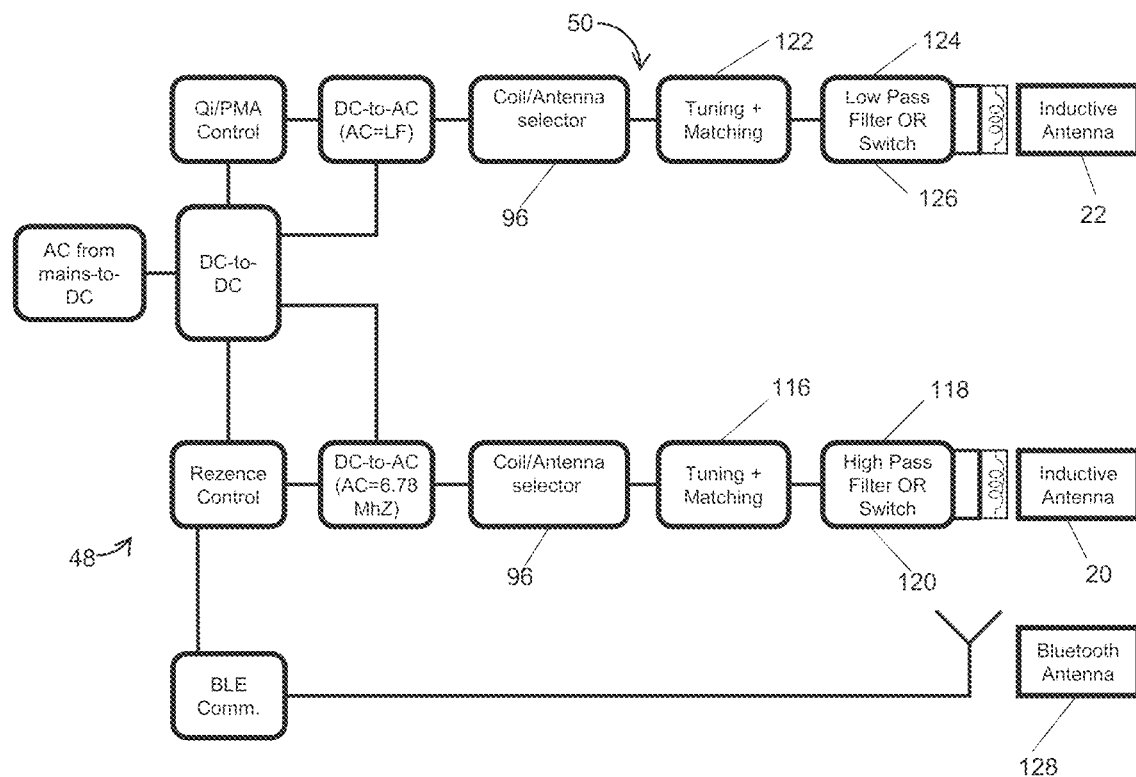
Figure 13C:
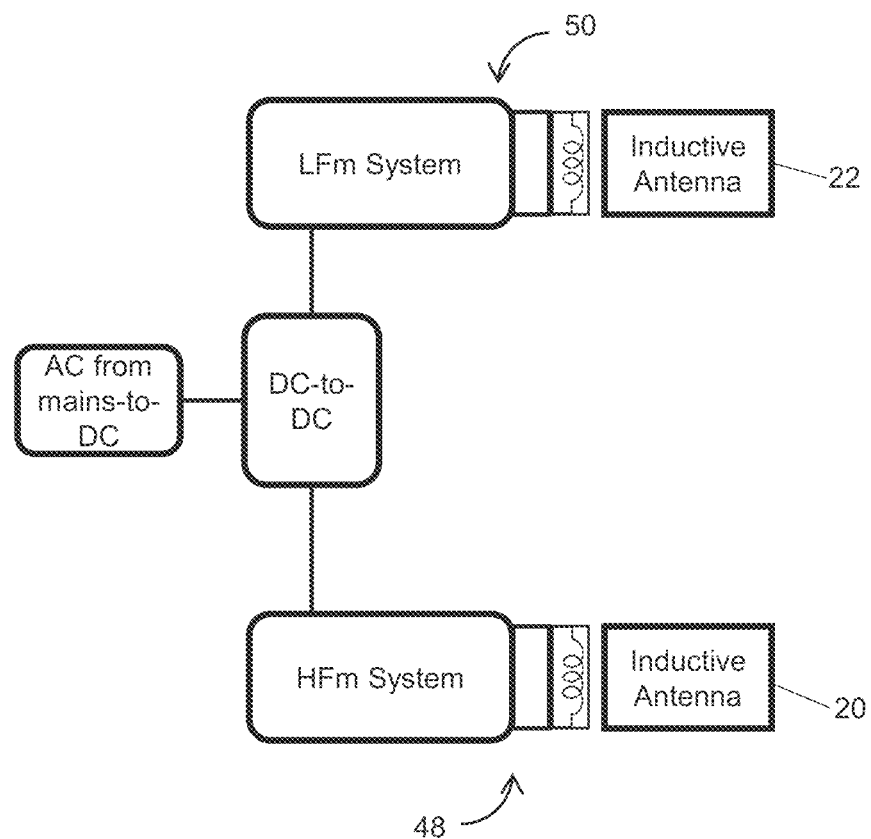
Figure 13D:
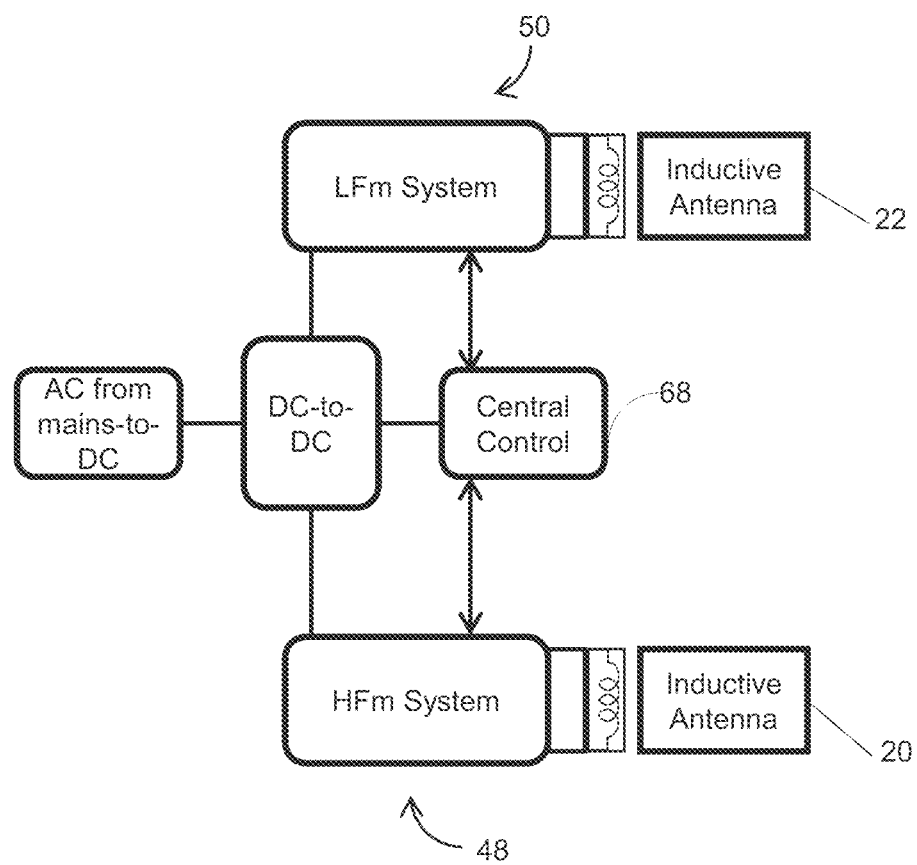

FIGS. 13A through 13D provide a schematic overview of the embodiments of the first, second, and central control units 48, 50, 68. As illustrated in FIGS. 13A and 13B, the first coil control unit 48 comprises a first coil control unit circuit which controls the operation and tuning of the first coil 20. In addition, the first coil control unit 48 comprises an operation frequency tuning and matching circuit 116 which controls the resonant frequency of the first coil 20. In addition, the first control unit 48 may comprise a low pass filter 118 or electrical switch 120 that is used to either electrically connect the first coil 20 to the circuit or, alternatively, establish the first coil 20 in an open circuit configuration. Likewise, the second coil control unit 50 comprises a second coil control unit circuit which controls the operation and tuning of the second coil 22. In addition, the second coil control unit 50 comprises an operation frequency tuning and matching circuit 122 which controls the resonant frequency of the second coil 22. In addition, the control unit 50 may comprise a low pass filter 124 or electrical switch 126 that is used to electrically connect the second coil 22 to the circuit or, alternatively, establish at least one of the second coils 22 in an open circuit configuration. The first and second coil control units 48, 50 may be configured to operate independently, or, alternatively, they may be configured to operate together. The central control unit 68 (FIG. 8) may dynamically configure the operation of both the first and second control units 48, 50 with respect to the first and second coils 20, 22. In an embodiment, the first, second or central control units 48, 50, 68 may comprise a Bluetooth antenna 128 to provide communication within the antenna 10.

The antenna 10 of the present application is configured to communicate with other antennas 10 and devices. In an embodiment, either of a transmitting or receiving antenna 10 may operate by sending a signal such as a ping that is received by the other of the transmitting or receiving antenna 10. After the signal is received, a handshaking protocol is established in which information regarding the configurations of the respective devices is shared. Information that is shared between the devices during the handshaking process helps determine an optimal operation configuration.

For example, a first multi-mode transmitting device capable of transmitting energy in either or both a first mode (A4WP) or a second mode (Qi) is positioned next to a single mode device configured to receive energy in either the first or second modes. In this embodiment, the two devices perform a handshake in which the devices identify themselves and exchange information about their respective configurations. After the handshake protocol is complete, the first and second devices operate in a power transfer mode in which energy is transferred utilizing either of the second device's transfer modes.

In a second example, first and second multi-mode devices, both of which are capable of transferring energy in the first mode (A4WP) or the second mode (Qi), are positioned in close proximity to one another. In an embodiment, the first and second control units 48, 50 of the respective multi-mode devices begin to each send a signal that is received by the other of the two devices. A microcontroller (not shown) incorporated within either of the first or second devices, decides to transfer energy in either or both the first or second energy transfer modes. In an embodiment, the microcontroller may be programmed with specific conditions, such as, transmission frequency, amount of energy, or time, in which either of the first or second energy transfer modes are preferentially selected. Alternatively, the devices could be configured to always transmit energy in a specific mode, such as the first or second mode.

In a third example, first and second multi-mode devices, configured to transmit energy in either or both of the first and second modes are positioned adjacent to each other. However, the second device is further configured to only operate in one mode at a time. In this example, both devices send a signal and perform a handshake therebetween. A microcontroller (not shown) incorporated within either of the first or second devices, decides to transfer energy in either or both the first or second energy transfer modes. When the mode of the second device changes, after a period of time, a second handshake between devices is performed and again the microprocessor decides which mode in which to transmit energy therebetween. This process may be repeated for each change in transfer mode.

It will be appreciated that the multi-mode antenna 10 of the present application may be formed or made by any suitable techniques and with any suitable materials. For example, the antenna coils 20, 22 may comprise suitable metals or metal containing compounds and/or composites, conductive polymers, conductive inks, solders, wires, fibers, filaments, ribbons, layered metal combinations and combinations thereof to be used as conductive materials. Suitable fabrication techniques may be used to place conductors on/in a substrate, including, but not limited to, printing techniques, photolithography techniques, chemical or laser etching techniques, laser cladding, laser cutting, physical or chemical vapor deposition, electrochemical deposition, molecular beam epitaxy, atomic layer deposition, stamping, chemical processing, and combinations thereof. It may also be suitable to fabricate the multi-mode single-structure antenna with wire-winding techniques leveraging magnet wires, coated wires, litz wires or other wires used by those skilled in the art. Electrical property enhancement, i.e., enhancement of electrical conductivity and substrate dielectric constant may also be used to achieve the desired properties for a specific application. For example, enhancement of electrical conductivity may be achieved through ion implantation, doping, furnace annealing, rapid thermal annealing, UV processing and combinations thereof.

Thus, it is contemplated that the antenna of the present disclosure is capable of being tuned to different frequencies or inductances by connecting different terminals or electrical points positioned along at least the first and second coils 20, 22. It is further contemplated that the various shielding materials that are strategically positioned within the antenna enhance quality factor and mutual inductance between adjacently positioned transmitting and receiving antennas. It is appreciated that various modifications to the inventive concepts described herein may be apparent to those of ordinary skill in the art without departing from the spirit and scope of the present disclosure as defined by the appended claims.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. An antenna, comprising:
a) a substrate having a thickness that extends between proximal and distal substrate surfaces;
b) a first conductive wire forming a first coil having $N_1$ number of turns, wherein the first coil is disposed in the substrate, wherein the first coil comprises a first coil sub-segment and a second coil sub-segment formed of a filar, wherein the filar comprises a turn bypassing over a portion of the first coil;
c) a second conductive wire forming a second coil having $N_2$ number of turns, wherein the second coil is disposed in the substrate, and wherein at least a portion of the second coil is positioned within an inner perimeter formed by the first coil;
d) wherein at least one of the first conductive wire and the second conductive wire forming the first coil and the second coil respectively comprises two or more filars electrically connected in parallel, and wherein at least one via between at least a portion of the two or more filars provides the parallel electrical connection between the two or more filars;
e) a first ferrite material positioned adjacent to the first coil or spaced apart from the first coil, wherein the first ferrite material is selected from a group of material compositions consisting of manganese-zinc, nickel-zinc, copper-zinc, magnesium-zinc, nickel-copper-zinc, and combinations thereof, wherein the first ferrite material comprises a first permeability;
f) a second ferrite material positioned adjacent to the second coil, wherein the second ferrite material comprises a second permeability that differs from the first permeability;
g) at least one control unit, wherein the first coil or the second coil are electrically connected to the at least one control unit; and
h) wherein a first inductance is generatable by the first coil and a second inductance, different than the first inductance, is generatable by the second coil.

2. The antenna of claim 1, further comprising a central control unit electrically connected to the at least one control unit.

3. The antenna of claim 1, further comprising a coil selection circuit electrically connected to at least one of the first and second coils, wherein the coil selection circuit comprises an electrical filter, an electrical switch, or a combination thereof.

4. The antenna of claim 1, wherein $N_2$ is greater than $N_1$.

5. The antenna of claim 1, further comprising an electromagnet, wherein the electromagnet is positioned adjacent to the first or second coil.

6. The antenna of claim 1, wherein the first conductive wire crosses a portion of the first coil.

7. The antenna of claim 1, wherein a plurality of first vias are positioned along a right side of a first portion of the first conductive wire and a plurality of second vias are positioned along a left side of the first portion of the first conductive wire, wherein the respective opposing first and second vias are electrically connected to a second portion of the first conductive wire, wherein the second portion of the first conductive wire is disposed above or below the first portion of the first conductive wire, thereby establishing a conductive electrical path therebetween that bypasses the first portion of the first conductive wire.

8. The antenna of claim 1, wherein a cavity extends through the distal substrate surface and part way through the substrate thickness, and wherein at least a portion of the second coil resides within the cavity.

9. The antenna of claim 1, wherein the first and second coils are capable of exhibiting a quality factor greater than 10 at a frequency.

10. The antenna of claim 1, wherein an electrical signal selected from a group consisting of a data signal, an electrical voltage, an electrical current, and combinations thereof is receivable by at least one of the first and second coils.

11. The antenna of claim 1, wherein an electrical signal selected from a group consisting of a data signal, an electrical voltage, an electrical current, and combinations thereof is transmittable by at least one of the first and second coils.

12. The antenna of claim 1, wherein the substrate comprises material composed of an electrically insulative material selected from a group consisting of a polyimide, an acrylic, fiberglass, polyester, polyether imide, polytetrafluoroethylene, polyethylene, polyetheretherketone (PEEK), polyethylene napthalate, fluoropolymers, copolymers, a ceramic material, a ferrite material, and combinations thereof.

13. The antenna of claim 1, wherein the antenna is capable of receiving or transmitting within a frequency band selected from a group consisting of about 100 kHz to about 250 kHz, about 250 kHz to about 500 kHz, 6.78 MHz, 13.56 MHz, and combinations thereof.

14. The antenna of claim 1, wherein the antenna is capable of receiving or transmitting at frequencies of at least 100 kHz.

15. The antenna of claim 1, wherein the second ferrite material comprises manganese-zinc, nickel-zinc, copper-zinc, magnesium-zinc, and combinations thereof.

16. The antenna of claim 1, wherein the second conductive wire crosses a portion of the second coil.

* * * * *